(12) United States Patent
Jeon et al.

(10) Patent No.: US 12,631,918 B2
(45) Date of Patent: May 19, 2026

(54) DISPLAY APPARATUS

(71) Applicant: SAMSUNG ELECTRONICS CO., LTD., Suwon-si (KR)

(72) Inventors: Dukjin Jeon, Suwon-si (KR); Ajeong Kang, Suwon-si (KR); Sunghee Wi, Suwon-si (KR); Youngmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/197,569

(22) Filed: May 2, 2025

(65) Prior Publication Data

US 2025/0271701 A1 Aug. 28, 2025

Related U.S. Application Data

(63) Continuation of application No. 18/794,841, filed on Aug. 5, 2024, now Pat. No. 12,313,938, which is a (Continued)

(30) Foreign Application Priority Data

Sep. 18, 2023 (KR) ........................ 10-2023-0124295

(51) Int. Cl.
*G02F 1/00* (2006.01)
*G02F 1/1335* (2006.01)
*G02F 1/13357* (2006.01)

(52) U.S. Cl.
CPC .. *G02F 1/133608* (2013.01); *G02F 1/133603* (2013.01); *G02F 1/133612* (2021.01)

(58) Field of Classification Search
None
See application file for complete search history.

(56) References Cited

U.S. PATENT DOCUMENTS 8,305,516 B2 11/2012 Cho et al.
9,041,303 B2 5/2015 Yoon et al.
(Continued)

FOREIGN PATENT DOCUMENTS

CN 100401534 C 7/2008
CN 111047993 A 4/2020
(Continued)

OTHER PUBLICATIONS

International Search Report (PCT/ISA/210) issued by the International Searching Authority on Nov. 12, 2024 in corresponding International Application No. PCT/KR2024/010104.
(Continued)

*Primary Examiner* — Gerald J Sufleta, II
(74) *Attorney, Agent, or Firm* — Sughrue Mion, PLLC

(57) ABSTRACT

A display apparatus includes: a display panel; a plurality of light sources configured to emit light to the display panel; and a light source board on which the plurality of light sources are mounted, the light source board including: a board body extending in a first direction; and a plurality of board bars connected to a side of the board body that is in a second direction different from the first direction, the plurality of board bars spaced apart from each other along the first direction, wherein each of the plurality of board bars includes: a central extending portion extending in the second direction; a plurality of first protrusions protruding from a first side of the central extending portion; and a plurality of second protrusions protruding from a second side of the central extending portion, opposite to the first side.

13 Claims, 23 Drawing Sheets

Related U.S. Application Data continuation of application No. PCT/KR2024/010104, filed on Jul. 15, 2024.

(56) References Cited

U.S. PATENT DOCUMENTS

| | | | |
|---|---|---|---|
| 2003/0072153 A1* | 4/2003 | Matsui | H05K 1/0281 |
| | | | 362/800 |
| 2005/0184952 A1* | 8/2005 | Konno | G09G 3/3648 |
| | | | 345/102 |
| 2005/0272277 A1 | 12/2005 | Toyota et al. | |
| 2007/0242477 A1* | 10/2007 | Yoo | H05K 1/0206 |
| | | | 362/612 |
| 2010/0165240 A1* | 7/2010 | Cho | G02F 1/133603 |
| | | | 349/61 |
| 2013/0050990 A1 | 2/2013 | Shiraishi | |
| 2014/0362325 A1 | 12/2014 | Lee | |
| 2016/0202537 A1 | 7/2016 | Cho | |
| 2016/0223866 A1 | 8/2016 | Lee | |
| 2019/0003660 A1 | 1/2019 | Jang | |
| 2024/0319535 A1 | 9/2024 | Kim | |

FOREIGN PATENT DOCUMENTS

| | | | | |
|---|---|---|---|---|
| JP | 2009-76576 A | | | 4/2009 |
| JP | 2009152636 A | * | | 7/2009 |
| KR | 10-2009-0073458 A | | | 7/2009 |
| KR | 10-2010-0080024 A | | | 7/2010 |
| KR | 10-1014222 B1 | | | 2/2011 |
| KR | 10-2014-0118440 A | | | 10/2014 |
| KR | 10-2015-0038787 A | | | 4/2015 |
| KR | 10-2016-0147229 A | | | 12/2016 |

OTHER PUBLICATIONS

Written Opinion (PCT/ISA/237) issued by the International Searching Authority on Nov. 12, 2024 in corresponding International Application No. PCT/KR2024/010104.

U.S. Appl. No. 18/794,841, filed Aug. 5, 2024.

* cited by examiner 1000B (1000)    15    1000B (1000)    1000A (1000)    1000A (1000)

1000B (1000)    1000B (1000)    1000A (1000)    1000A (1000)

+Z

+Y

DISPLAY APPARATUS

CROSS-REFERENCE TO RELATED APPLICATIONS

This application is a Continuation of U.S. application Ser. No. 18/794,841, filed on Aug. 5, 2024, which is a bypass continuation application of International Application No. PCT/KR2024/010104, filed on Jul. 15, 2024, which claims priority to Korean Application No. 10-2023-0124295, filed on Sep. 18, 2023, the disclosures of which are incorporated by reference herein in their entireties.

BACKGROUND

1. Field

The present disclosure relates to a display apparatus.

2. Brief Description of Background Art

A display apparatus is a kind of an output apparatus that converts obtained or stored electrical information into visual information and displays the visual information to a user, and the display apparatus is used in various fields, such as a home or a workplace.

The display apparatus includes a monitor apparatus connected to a personal computer or a server computer, a portable computer device, a navigation terminal device, a general television apparatus, an Internet Protocol television (IPTV), a portable terminal device, such as a smart phone, a tablet PC, a personal digital assistant (PDA) or a cellular phone, various display apparatuses used to reproduce images, such as advertisements or movies in an industrial field, or various kinds of audio/video systems.

The display apparatus includes a light source module to convert electrical information into visual information, and the light source module includes a plurality of light sources to independently emit light.

Each of the plurality of light sources includes a light emitting diode (LED) or an organic light emitting diode (OLED). For example, the LED or the OLED may be mounted on a circuit board or a substrate.

SUMMARY

According to embodiments of the present disclosure, a display apparatus including an improved structure to increase the luminance uniformity is provided.

According to embodiments of the present disclosure, a display apparatus including an improved structure to reduce product costs or manufacturing costs is provided.

According to embodiments of the present disclosure, a display apparatus including an improved structure to simplify a manufacturing process is provided.

Technical problems that are solved and solutions that are achieved by embodiments of the present disclosure are not limited to the above-mentioned technical problems and solutions, and other technical problem that are solved and solutions that are achieved not mentioned will be clearly understood by those skilled in the art to which the disclosure belongs from the following description.

According to embodiments of the present disclosure, a display apparatus may include: a display panel; a plurality of light sources configured to emit light to the display panel; and a light source board on which the plurality of light sources are mounted, the light source board including: a board body extending in a first direction; and a plurality of board bars connected to a side of the board body that is in a second direction different from the first direction, the plurality of board bars spaced apart from each other along the first direction, wherein each of the plurality of board bars includes: a central extending portion extending in the second direction; a plurality of first protrusions protruding from a first side of the central extending portion with respect to the first direction toward an outside of the central extending portion, and arranged along the second direction, wherein first side light sources from among the plurality of light sources are on the plurality of first protrusions; and a plurality of second protrusions protruding from a second side of the central extending portion, opposite to the first side, with respect to the first direction toward the outside of the central extending portion, and arranged along the second direction, wherein second side light sources from among the plurality of light sources are on the plurality of second protrusions.

DETAILED DESCRIPTION

Figure 1:
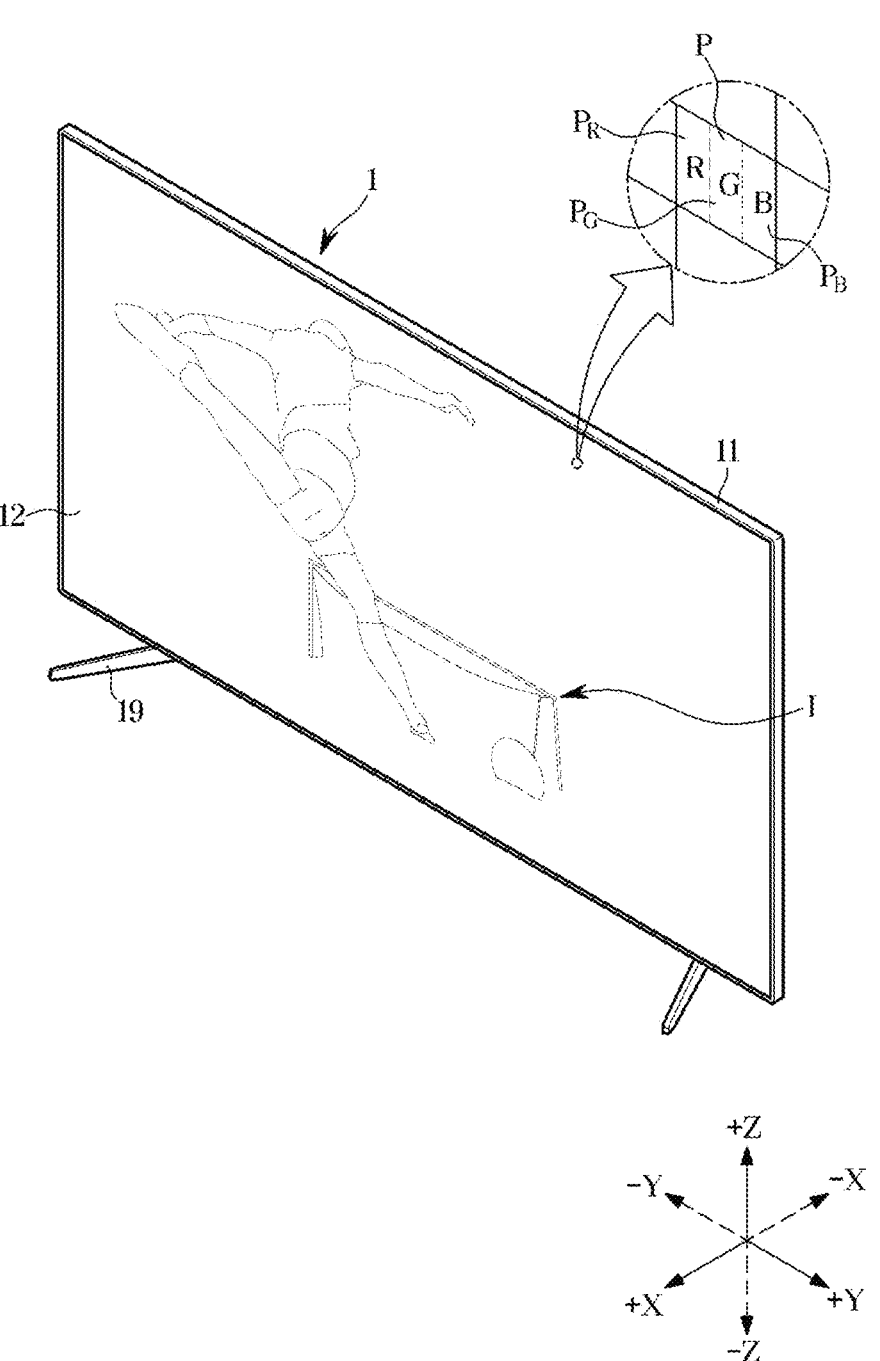
FIG. 1 is a view of a display apparatus according to an embodiment of the present disclosure.

The various non-limiting embodiments that are described in the present disclosure and the terms used therein are not intended to limit embodiments of the present disclosure to specific forms, and the disclosure should be understood to include various modifications, equivalents, and/or alternatives to the corresponding embodiments.

In addition, the same reference numerals or signs shown in the drawings of the disclosure indicate elements or components performing substantially the same function.

A singular expression may include a plural expression unless otherwise indicated herein or clearly contradicted by context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

Terms such as "unit," "module," and "member" may be embodied as hardware or software. According to embodiments, a plurality of a "unit," "module," and "member" may be implemented as a single component or a single "unit," "module," and "member" and may include a plurality of components.

Also, the terms used herein are used to describe the example embodiments and are not intended to limit and/or restrict the present disclosure. The singular forms "a," "an" and "the" are intended to include the plural forms as well, unless the context clearly indicates otherwise. In this disclosure, the terms "including," "having," and the like are used to specify features, numbers, steps, operations, elements, components, or combinations thereof, but do not preclude the presence or addition of one or more of the features, numbers, steps, operations, elements, components, or combinations thereof.

It will be understood that, although the terms "first," "second," "third," etc., may be used herein to describe various elements, the elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

When an element (e.g., a first element) is referred to as being "(functionally or communicatively) coupled," or "connected" to another element (e.g., a second element), the first element may be connected to the second element, directly (e.g., wired), wirelessly, or through a third element.

When an element is said to be "connected," "coupled," "supported" or "contacted" with another element, this includes not only when elements are directly connected, coupled, supported, or contacted, but also when elements are indirectly connected, coupled, supported, or contacted through a third element.

Throughout the description, when an element is "on" another element, this includes not only when the element is in contact with the other element, but also when there is another element between the two elements.

In the following detailed description, the terms of "up and down direction," "front and rear direction" and the like may be defined by the drawings, but the shape and the location of the element is not limited by the term. For example, the terms "front" and "rear" below may each be defined based on the X direction shown in the drawings. The terms "upward" and "downward" below may each be defined based on the Z direction shown in the drawing. The terms "left direction" and "right direction" below may be defined based on the Y direction shown in the drawing. The term "vertical direction" below may refer to the Z direction shown in the drawings, and the term "horizontal direction" below may refer to the Y direction shown in the drawings.

Hereinafter, non-limiting example embodiments of the present disclosure will be described in detail with reference to the accompanying drawings.

FIG. 1 is a view of a display apparatus according to an embodiment of the present disclosure.

Referring to FIG. 1, a display apparatus 1 according to an embodiment of the present disclosure is a device that processes an image signal received from an outside and visually displays the processed image. Hereinafter a case in which the display apparatus 1 is a television is shown, but embodiments of the present disclosure are not limited thereto. For example, the display apparatus 1 may be implemented in various forms, such as a monitor, a portable multimedia device, and a portable communication device, which are a type of computer output device, and the display apparatus 1 is not limited in the type thereof as long as the display apparatus is configured to visually display an image.

The display apparatus 1 may be a large format display (LFD) installed outdoors, such as a roof of a building or a bus stop. The outdoor is not limited to the outside of a building, and thus the display apparatus 1 according to an embodiment may be installed in any places as long as the display apparatus is accessed by a large number of people, even indoors, such as subway stations, shopping malls, movie theaters, companies, and stores.

FIG. 1 illustrates a flat display apparatus with a flat screen as an example of the display apparatus 1, but embodiments of the present disclosure are not limited thereto. Therefore, the display apparatus according to an embodiment of the present disclosure may be a curved display apparatus or a bendable or flexible display apparatus in which a flat state and a curved state are variable. Further, a configuration of an embodiment of the present disclosure may be applied to display apparatus of various shapes regardless of a screen size or ratio of the display apparatus.

The display apparatus 1 may receive content data including video signals and audio signals from various content sources and output video and audio corresponding to the video signals and the audio signals. For example, the display apparatus 1 may receive content data through a broadcast reception antenna or cable, receive content data from a content playback device, or receive content data from a content providing server of a content provider.

The display apparatus 1 may display an image corresponding to video data and output sound corresponding to audio data. For example, the display apparatus 1 may restore a plurality of image frames included in video data and continuously display the plurality of image frames. Further, the display apparatus 1 may restore an audio signal included in the audio data and continuously output sound according to the audio signal As illustrated in FIG. 1, the display apparatus 1 may include a main body 11, and a screen 12 provided to display an image I.

The display apparatus 1 may be installed on an indoor or outdoor floor or furniture in a standing manner, or may be installed on a wall or inside a wall in a wall-mounted manner. For example, the display apparatus 1 may include a support leg 19 provided in a lower portion of the main body 11 to allow the display apparatus 1 to be installed on the indoor or outdoor floor or furniture in the standing manner.

The main body 11 may form an appearance of the display apparatus 1. A component configured to allow the display apparatus 1 to display the image I and to perform various functions may be provided in the main body 11.

The display apparatus 1 may be configured to display the image I. Particularly, the screen 12 may be formed on a front surface of the main body 11, and the display apparatus 1 may display the image I on the screen 12. For example, the screen 12 may display a still image or a moving image. Further, the screen 12 may display a two-dimensional plane image or a three-dimensional image using binocular parallax of the user.

A plurality of pixels P may be formed on the screen 12. The image I displayed on the screen 12 may be formed by a combination of the lights emitted from the plurality of pixels P. For example, the image I may be formed on the screen 12 by combining light emitted from the plurality of pixels P as a mosaic.

Each of the plurality of pixels P may emit different brightness and different color of light. Particularly, the plurality of pixels P may include sub-pixels, respectively, and the sub-pixels may include a red sub pixel PR emitting red light, a green sub pixel PG emitting green light, and a blue sub pixel PB emitting blue light. For example, the red light may represent a light beam having a wavelength of approximately 620 nm (nanometers, one billionth of a meter) to 750 nm, the green light may represent a light beam having a wavelength of approximately 495 nm to 570 nm, and the blue light may represent a light beam having a wavelength of approximately 450 nm to 495 nm.

By combining the red light of the red sub pixel PR, the green light of the green sub pixel PG and the blue light of the blue sub pixel PB, each of the plurality of pixels P may emit different brightness and different color of light.

Figure 2:
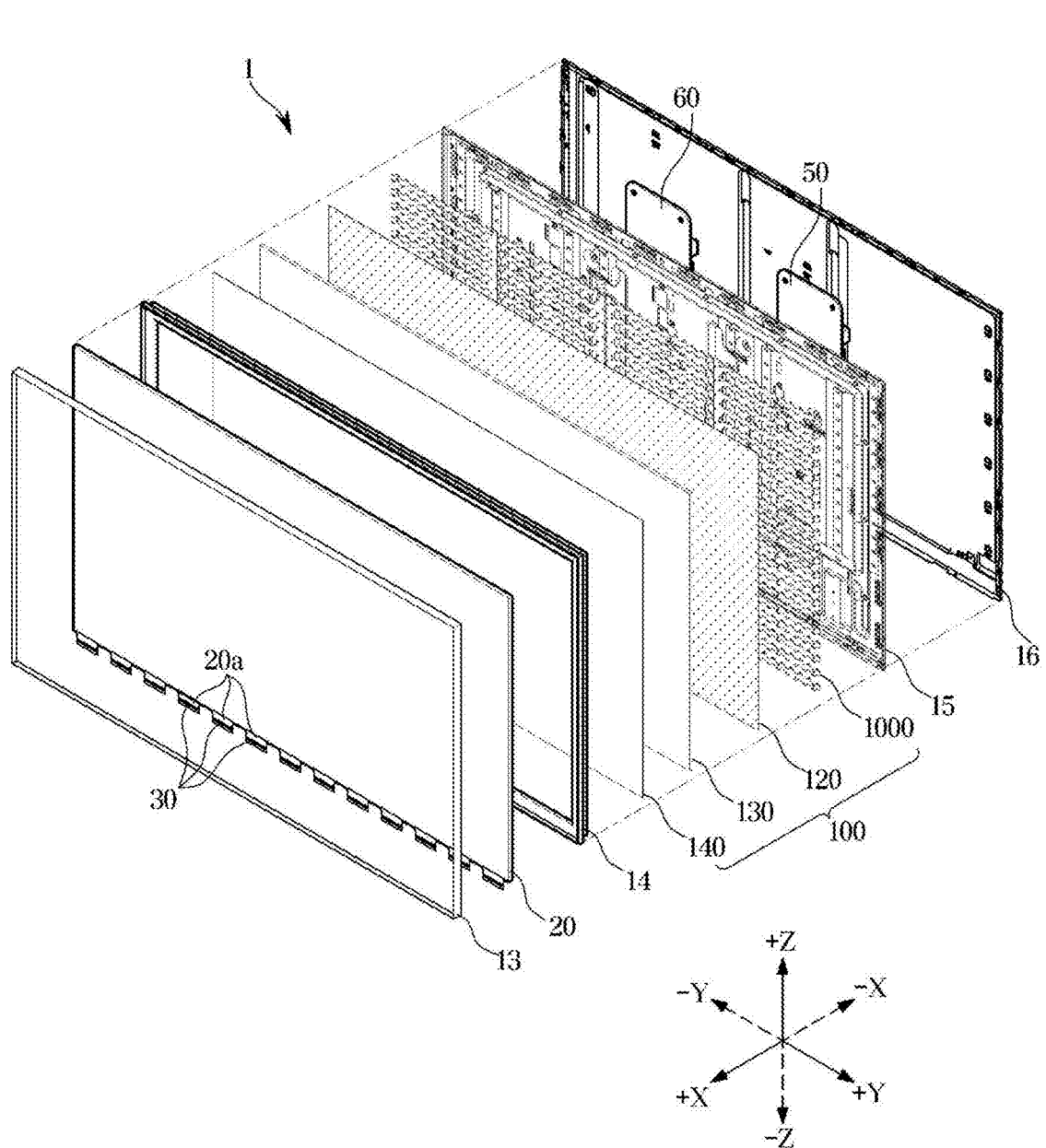
FIG. 2 is an exploded view of the display apparatus according to an embodiment of the present disclosure.

FIG. 2 is an exploded view of the display apparatus according to an embodiment of the present disclosure.

Referring to FIG. 2, various components for generating an image I on the screen 12 may be disposed inside the main body 11 of the display apparatus 1 according to an embodiment of the present disclosure.

For example, the display apparatus 1 may include a display panel 20. The display panel 20 may be disposed on the main body 11. The display panel 20 may be provided to display the image I. The screen 12 described in FIG. 1 may be formed on a front surface of the display panel 20.

For example, the display panel 20 may have a substantially rectangular shape. Particularly, the display panel 20 may have a shape in which a length of the horizontal side and a length of the vertical side are different from each other. That is, the display panel 20 may be provided to have a long side and a short side. The display panel 20 may be provided in a rectangular plate shape. However, embodiments of the present disclosure are not limited thereto, and the display panel 20 may be provided in the shape of a square plate in which the lengths of the long and short sides are approximately equal.

The display panel 20 may be provided in various sizes. The ratio between the long side and the short side of the display panel 20 is not limited to general cases such as 16:9 and 4:3, and may be provided at any ratio.

In the display apparatus 1 according to an embodiment of the present disclosure, the display panel 20 may be composed of a non-self luminous display such as a liquid crystal display (LCD).

A cable 20a configured to transmit image data to the display panel 20, and a display driver integrated circuit (DDI) (hereinafter referred to as a driver IC 30) configured to process digital image data and output an analog image signal may be provided at one side of the display panel 20.

The cable 20a may electrically connect a control assembly 50 and/or a power assembly 60 to the driver IC 30, and may also electrically connect the driver IC 30 to the display panel 20. The cable 20a may include a flexible flat cable or a film cable that is bendable.

The driver IC 30 may receive image data and power from the control assembly 50 and/or the power assembly 60 through the cable 20a. The driver IC 30 may provide the image data and driving current to the display panel 20 through the cable 20a.

In addition, the cable 20a and the driver IC 30 may be integrally implemented as a film cable, a chip on film (COF), or a tape carrier package (TCP). In other words, the driver IC 30 may be arranged on the cable 20b. However, embodiments of the present disclosure are not limited thereto, and the driver IC 30 may be arranged on the display panel 20.

A structure of the display panel 20 will be described later.

The display apparatus 1 may include a backlight unit 100 configured to emit light toward the display panel 20. The backlight unit 100 may be disposed in the main body 11. The backlight unit 100 may be arranged at the rear of the display panel 20 to emit light toward the front side on which the display panel 20 is located. Particularly, the backlight unit 100 may be provided as a surface light source. The display panel 20 may block or pass light emitted from the backlight unit 100.

The backlight unit 100 may include a point light source configured to emit monochromatic light or white light. The backlight unit 100 may refract, reflect, and scatter light in order to convert light, which is emitted from the point light source, into uniform surface light. The backlight unit 100 may refract, reflect, and scatter light emitted from the point light source, thereby emitting uniform surface light toward the front side.

As illustrated in FIG. 2, the backlight unit 100 may include a light source module 1000. The light source module 1000 may generate and emit light. Particularly, the light source module 1000 may be configured to emit monochromatic light or white light.

Figure 4:
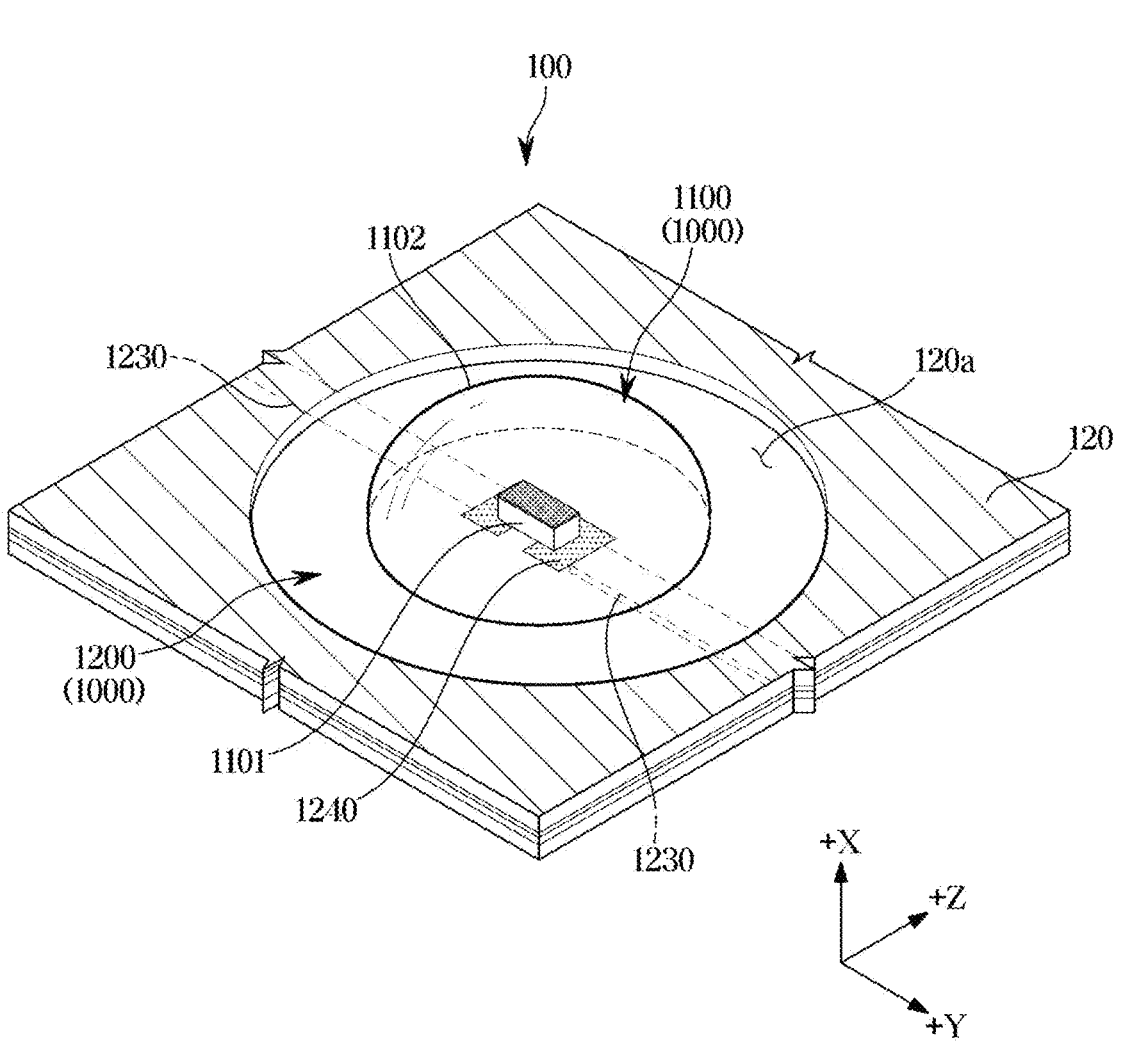
FIG. 4 is an enlarged view of a light source and a reflective sheet of the display apparatus according to an embodiment of the present disclosure.

The light source module 1000 may include a plurality of light sources 1100 configured to emit light, and a light source board 1200 on which the plurality of light sources 1100 is mounted (refer to, for example, FIG. 4).

The light source module 1000 will be described later.

As illustrated in FIG. 2, the backlight unit 100 may include a reflective sheet 120 provided to reflect light. The reflective sheet 120 may reflect light forward or in a direction close to the front.

For example, the reflective sheet 120 may be attached to a front surface of the light source module 1000. Particularly, the reflective sheet 120 may be attached to a front surface of the light source board 1200.

For example, in front of the reflective sheet 120, the light source module 1000 (particularly, referring to FIG. 4, the light source 1100 of the light source module 1000) may emit light in various directions. The light emitted from the light source module 1000 may not only be emitted toward a diffuser plate 130, which will be described later, but may also be emitted from the light source module 1000 toward the reflective sheet 120. The reflective sheet 120 may reflect the light, which is emitted toward the reflective sheet 120, toward the diffuser plate 130.

Further, while the light emitted from the light source module 1000 passes through various objects such as the diffuser plate 130 and an optical sheet 140, a portion of the light may be reflected from a surface of the diffuser plate 130 and the optical sheet 140. The reflective sheet 120 may reflect the light, which is reflected as described above, forward again.

As illustrated in FIG. 2, the backlight unit 100 may include the diffuser plate 130 provided to uniformly diffuse light. The diffuser plate 130 may be provided in front of the light source module 1000 and the reflective sheet 120. The diffuser plate 130 may evenly disperse the light emitted from the light source module 1000 and then emit the light forward.

As illustrated in FIG. 2, the backlight unit 100 may include the optical sheet 140 provided to further improve the luminance uniformity of the emitted light. The optical sheet 140 may be provided to refract and scatter light emitted from the front of the diffuser plate 130. For example, the optical sheet 140 may include various types of sheets, such as a diffusion sheet, a prism sheet, a reflective polarizing sheet, and a quantum dot sheet.

The display apparatus 1 may include the control assembly 50 configured to control the operation of the backlight unit 100 and the display panel 20, and the power assembly 60 configured to supply power to the backlight unit 100 and the display panel 20. The control assembly 50 and the power assembly 60 may be disposed in the main body 11.

For example, the control assembly 50 may include a control circuit configured to control an operation of the display panel 20 and the backlight unit 100. The control circuit may process image data received from an external content source, transmit image data to the display panel 20, and transmit dimming data to the backlight unit 100.

For example, the power assembly 60 may include a power circuit configured to supply power to the display panel 20 and the backlight unit 100 so as to allow the backlight unit 100 to emit surface light and to allow the display panel 20 to block or pass the light emitted from the backlight unit 100.

The control assembly 50 and the power assembly 60 may be implemented as a printed circuit board and various circuits mounted on the printed circuit board. For example, the power circuit may include a capacitor, a coil, a resistance element, a processor, and a power circuit board on which the capacitor, the coil, the resistance element, and the processor are mounted. Further, the control circuit may include a memory, a processor, and a control circuit board on which the memory and the processor are mounted.

The display apparatus 1 may include a display case provided to support various components of the main body 11 of the display apparatus 1. In other words, various components of the main body 11 may be accommodated inside the display case. The display case may form the external appearance of the display apparatus 1.

For example, the display case may support the display panel 20. For example, the display case may support the backlight unit 100. For example, the display case may support the control assembly 50. For example, the display case may support the power assembly 60.

For example, the display apparatus 1 may include a top chassis 13. The top chassis 13 may be provided to support a front surface or side surfaces of the display panel 20. For example, the top chassis 13 may be provided in a substantially quadrangle frame shape.

The top chassis 13 may support the front surface of the display panel 20 by forming a bezel that is disposed to face the front of the display apparatus 1. However, when the display apparatus 1 is a bezel-less type display apparatus with a very narrow or no bezel, the top chassis 13 may be provided to support only the side surface of the display panel 20. Alternatively, when a bottom chassis 15 supports the side surface of the display panel 20, the display apparatus 1 may not include the top chassis 13.

For example, the display apparatus 1 may include the bottom chassis 15. The bottom chassis 15 may cover the rear of the display panel 20. The bottom chassis 15 may be coupled to the rear of the top chassis 13. The bottom chassis 15 may support various components of the display apparatus 1, such as the backlight unit 100, the control assembly 50, and the power assembly 60.

The bottom chassis 15 may be formed to have a substantially flat plate shape, but is not limited thereto. The bottom chassis 15 may be formed of a material with high thermal conductivity to dissipate heat generated from the light source 1100 to the outside. For example, the bottom chassis 15 may be formed of a metal material such as aluminum or stainless steel (SUS), or a plastic material such as acrylonitrile butadiene styrene (ABS).

For example, the display apparatus 1 may include a middle mold 14. The middle mold 14 may be disposed between the top chassis 13 and the bottom chassis 15. For example, the middle mold 14 may support at least some components of the backlight unit 100.

For example, the display apparatus 1 may include a rear cover 16. The rear cover 16 may be disposed at the rear of the bottom chassis 15 and provided to cover the bottom chassis 15 and various components mounted on the rear of the bottom chassis 15 (e.g., the control assembly 50, the power assembly 60, etc.).

Meanwhile, unlike FIG. 2, the display case of the display apparatus 1 according to an embodiment of the present disclosure may not include some of the top chassis, the middle mold, the bottom chassis, and the rear cover.

The configuration of the display apparatus 1 described above with reference to FIG. 2 is only an example for describing the display apparatus according to an embodiment of the present disclosure, and embodiments of the present disclosure are not limited thereto. The display apparatus according to an embodiment of the present disclosure may be provided to include various configurations to perform the function of providing images on a screen.

Figure 3:
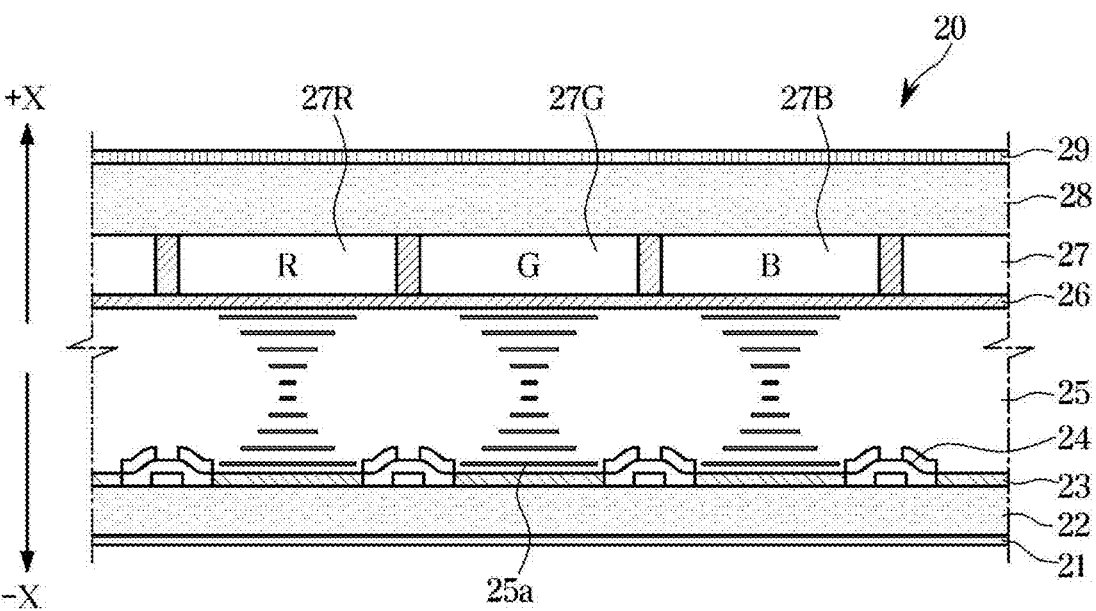
FIG. 3 is a cross-sectional view of a liquid crystal panel of the display apparatus according to an embodiment of the present disclosure.

FIG. 3 is a cross-sectional view of a liquid crystal panel of the display apparatus according to an embodiment of the present disclosure.

Referring to FIG. 3, the display panel 20 included in the display apparatus 1 according to an embodiment of the present disclosure may be composed of a liquid crystal display (LCD) panel, and configured to block or transmit light emitted from the backlight unit 100. The image I may be formed in front of the display panel 20 by an operation in which the display panel 20 blocks or transmits the light emitted from the backlight unit 100.

The front surface of the display panel 20 may form the screen 12 of the display apparatus 1 described above, and the plurality of pixels P may be provided in the display panel 20. In the display panel 20, the plurality of pixels P may independently block or transmit light of the backlight unit 100, and the light transmitted through the plurality of pixels P may form the image I displayed on the screen 12.

For example, as shown in FIG. 3, the display panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the thin film transistor 24, the liquid crystal layer 25, the common electrode 26, and the color filter 27. The first and second transparent substrates 22 and 28 may be formed of tempered glass or transparent resin.

The first polarizing film 21 and the second polarizing film 29 may be provided on the outside of the first transparent substrate 22 and the second transparent substrate 28.

Each of the first polarizing film 21 and the second polarizing film 29 may transmit a specific light beam and block other light beams. For example, the first polarizing film 21 may transmit a light beam having a magnetic field vibrating in a first direction and block other light beams. In addition, the second polarizing film 29 may transmit a light beam having a magnetic field vibrating in a second direction and block other light beams. In this case, the first direction and the second direction may be perpendicular to each other. Accordingly, a polarization direction of the light transmitted through the first polarizing film 21 and a vibration direction of the light transmitted through the second polarizing film 29 may be perpendicular to each other. As a result, generally, light may not pass through the first polarizing film 21 and the second polarizing film 29 at the same time.

The color filter 27 may be provided on an inner side of the second transparent substrate 28.

The color filter 27 may include a red filter 27R transmitting red light, a green filter 27G transmitting green light, and a blue filter 27B transmitting blue light. The red filter 27R, the green filter 27G, and the blue filter 27B may be disposed in parallel with each other. A region, in which the color filter 27 is formed, may correspond to the pixel P described above. A region, in which the red filter 27R is formed, may correspond to the red sub-pixel PR, a region, in which the green filter 27G is formed, may correspond to the green sub-pixel PG, and a region, in which the blue filter 27B is formed, may correspond to the blue sub-pixel PB.

The pixel electrode 23 may be provided on an inner side of the first transparent substrate 22, and the common electrode 26 may be provided on an inner side of the second transparent substrate 28.

The pixel electrode 23 and the common electrode 26 may be formed of a metal material through which electricity is conducted, and the pixel electrode 23 and the common electrode 26 may generate an electric field to change the arrangement of liquid crystal molecules 25a forming the liquid crystal layer 25 to be described below.

The pixel electrode 23 and the common electrode 26 may be formed of a transparent material, and may transmit light incident from the outside. For example, the pixel electrode 23 and the common electrode 26 may include indium tin oxide (ITO), indium zinc oxide (IZO), silver nanowire (Ag nano wire), carbon nanotube (CNT), graphene, or poly (3,4-ethylenedioxythiophene) (PEDOT). The thin film transistor (TFT) 24 may be provided at an inner side of the second transparent substrate 28.

The TFT 24 may transmit or block a current flowing through the pixel electrode 23. For example, an electric field may be formed or removed between the pixel electrode 23 and the common electrode 26 in response to turning on (closing) or turning off (opening) the TFT 24.

The TFT 24 may be formed of poly-silicon, and may be formed by semiconductor processes, such as lithography, deposition, and ion implantation.

The liquid crystal layer 25 may be formed between the pixel electrode 23 and the common electrode 26, and the liquid crystal layer 25 may be filled with the liquid crystal molecules 25a.

Liquid crystals represent an intermediate state between a solid (crystal) and a liquid. Most of the liquid crystal materials are organic compounds, and the molecular shape is in the shape of an elongated rod, and the orientation of molecules is in an irregular state in one direction, but in a regular state in other directions. As a result, the liquid crystal has both the fluidity of the liquid and the optical anisotropy of the crystal (solid).

In addition, liquid crystals also exhibit optical properties according to changes in an electric field. For example, in the liquid crystal, the orientation of molecules forming the liquid crystal may change according to a change in an electric field. When an electric field is generated in the liquid crystal layer 25, liquid crystal molecules 25a of the liquid crystal layer 25 may be disposed along the direction of the electric field. When the electric field is not generated in the liquid crystal layer 25, the liquid crystal molecules 25a may be disposed irregularly or disposed along an alignment layer. As a result, the optical properties of the liquid crystal layer 25 may vary depending on the presence or absence of the electric field passing through the liquid crystal layer 25.

The structure of the display panel 20 described above with reference to FIG. 3 is only an example of a structure of the display panel of the display apparatus according to an embodiment of the present disclosure, and embodiments of the present disclosure are not limited thereto.

FIG. 4 is an enlarged view of a light source and a reflective sheet of the display apparatus according to an embodiment of the present disclosure.

Referring to FIG. 4, the display apparatus 1 according to an embodiment of the present disclosure may include the plurality of light sources 1100 and the light source board 1200 on which the light sources 1100 are mounted. The plurality of light sources 1100 and the light source board 1200 may form the light source module 1000 of the backlight unit 100.

FIG. 4 illustrates one light source 1100 among the plurality of light sources 1100 included in the light source module 1000, and a description of structure and function of the light source 1100 described below with reference to FIG. 4 may be commonly applied to each of the plurality of light sources 1100.

The light source 1100 may be configured to emit light. The light source 1100 may be configured to emit light toward the display panel 20. The light source 1100 may employ an element configured to emit monochromatic light (light of a specific wavelength, e.g., blue light) or white light (e.g., light of a mixture of red light, green light, and blue light) in various directions by receiving power. For example, the light source 1100 may include a light emitting diode (LED).

The light source board 1200 may fix the plurality of light sources 1100 to prevent a change in the position of the light source 1100. Further, the light source board 1200 may supply power, which is for the light source 1100 to emit light, to the light source 1100.

The light source board 1200 may fix the plurality of light sources 1100 and may be configured with synthetic resin or tempered glass or a printed circuit board (PCB) on which a conductive power supply line for supplying power to the light source 1100 is formed.

The light source 1100 may be disposed on the front surface of the light source board 1200. The front surface of the light source board 1200 may refer to one surface of the light source board 1200 facing the display panel 20. That is, the light source 1100 may be mounted on the light source board 1200 to face forward and emit light forward.

The reflective sheet 120 may be disposed in front of the light source board 1200. As described above, the reflective sheet 120 may be coupled to the front surface of the light source board 1200. At this time, the reflective sheet 120 may include a plurality of through holes 120a formed at positions corresponding to each of the plurality of light sources 1100 of the light source module 1000. As shown in FIG. 4, the light source 1100 may pass through the through hole 120a and protrude toward the front of the reflective sheet 120. As a result, the light source 1100 and a portion of the light source board 1200 may be exposed toward the front of the reflective sheet 120 through the through hole 120a. With this configuration, the light source 1100 may emit light in front of the reflective sheet 120.

The reflective sheet 120 may reflect light, which is emitted from the light source 1100 toward the reflective sheet 120, toward the diffuser plate 130.

A process, in which the light emitted from the plurality of light sources 1100 or the light reflected by the reflective sheet 120 travels toward the display panel 20, is as described above.

Hereinafter a structure of the light source 1100 and the light source board 1200 will be described.

The light source 1100 may include a light emitting diode 1101. The light emitting diode 1101 may include a P-type semiconductor and an N-type semiconductor for emitting light by recombination of holes and electrons. In addition, the light emitting diode 1101 may be provided with a pair of electrodes for supplying hole and electrons to the P-type semiconductor and the N-type semiconductor, respectively.

The light emitting diode 1101 may be configured to convert electrical energy into optical energy. In other words, the light emitting diode 1101 may emit light having a maximum intensity at a predetermined wavelength based on the supplied power. For example, the light emitting diode 1101 may emit blue light having a peak value at a wavelength indicating blue color (e.g., a wavelength between 430 nm and 495 nm).

For example, a multilayer reflective structure, in which a plurality of insulation layers having different refractive indices is alternately laminated, may be provided on the front surface of the light emitting diode 1101. For example, the multilayer reflective structure may be provided with a Distributed Bragg Reflector (DBR).

For example, the light emitting diode 1101 may be directly attached to the light source board 1200 in a Chip On Board (COB) method. In other words, the light source 1100 may include the light emitting diode 1101 to which a light emitting diode chip or a light emitting diode die is directly attached to the light source board 1200 without an additional packaging.

The light source module 1000 may be manufactured in such a way that the flip-chip type light emitting diode 1101 is attached to the light source board 1200 in a chip-on-board method. Accordingly, it is possible to reduce the size of the light source 1100.

The light source board 1200 may include a power supply line 1230 provided to supply power to the light source 1100. The power supply line 1230 may be provided to supply an electrical signal and/or power from the control assembly 50 and/or the power assembly 60 to the light source 1100. For example, the power supply line 1230 may be provided to supply power to the light emitting diode 1101, which may be a flip chip type light emitting diode.

For example, the light source board 1200 may be formed by alternately laminating an insulation layer that is non-conductive and a conduction layer that is conductive.

A line or pattern, through which power and/or electrical signals pass, may be formed on the conduction layer of the light source board 1200. The conduction layer may be formed of various materials having an electrical conductivity. For example, the conduction layer may be formed of various metal materials, such as copper (Cu), tin (Sn), aluminum (Al), or an alloy thereof. The power supply line 1230 may be implemented by the line or pattern formed on the conduction layer of the light source board 1200.

A dielectric of the insulation layer of the light source board 1200 may insulate between lines or patterns of the conduction layer. The insulation layer may be formed of a dielectric for electrical insulation, such as FR-4.

For example, a protection layer configured to prevent or suppress damage caused by an external impact and/or damages caused by a chemical action (e.g., corrosion, etc.) and/or damage caused by an optical action, to the light source board 1200 may be formed on an outer surface of the light source board 1200. For example, the protection layer of the light source board 1200 may include a photo solder resist (PSR).

The power supply line 1230 may be covered by the protection layer of the light source board 1200, so as to be prevented from being exposed to the outside.

For example, the light source board 1200 may include a power supply pad 1240 provided to be electrically connected to the power supply line 1230 to supply power to the flip chip type light emitting diode 1101. The power supply line 1230 may be electrically connected to the light emitting diode 1101 through the power supply pad 1240.

For example, a window may be formed in the protection layer of the light source board 1200 to expose a portion of the power supply line 1230 to the outside. The power supply pad 1240 may be electrically connected to a portion of the power supply line 1230 exposed to the outside of the light source board 1200.

For example, various electrically conductive adhesive materials such as solder and electrically conductive epoxy adhesives may be applied between the electrode of the light emitting diode 1101 and the power supply pad 1240.

The light source 1100 may include an optical dome 1102. The optical dome 1102 may cover the light emitting diode 1101. The optical dome 1102 may prevent or suppress damages to the light emitting diode 1101 caused by an external mechanical action and/or damage to the light emitting diode 1101 caused by a chemical action.

The optical dome 1102 may have a dome shape formed in such a way that a sphere is cut into a surface not including the center thereof, or may have a hemispherical shape in such a way that a sphere is cut into a surface including the center thereof. A vertical cross section of the optical dome 1102 may be a bow shape or a semicircle shape.

The optical dome 1102 may be formed of silicone or epoxy resin. For example, the molten silicon or epoxy resin may be discharged onto the light emitting diode 1101 through a nozzle, and the discharged silicon or epoxy resin may be cured, thereby forming the optical dome 1102.

The optical dome 1102 may be optically transparent or translucent. Light emitted from the light emitting diode 1101 may be emitted to the outside by passing through the optical dome 1102.

In this case, the optical dome 1102, that is dome-shaped, may refract light like a lens. For example, light emitted from the light emitting diode 1101 may be refracted by the optical dome 1102 and thus may be dispersed.

The structure of the light source module 1000 such as the light source 1100 and the light source board 1200 described with reference to FIG. 4 is only an example of the structure of the light source module of the display apparatus according to an embodiment of the present disclosure, and embodiments of the present disclosure are not limited thereto.

Figure 5:
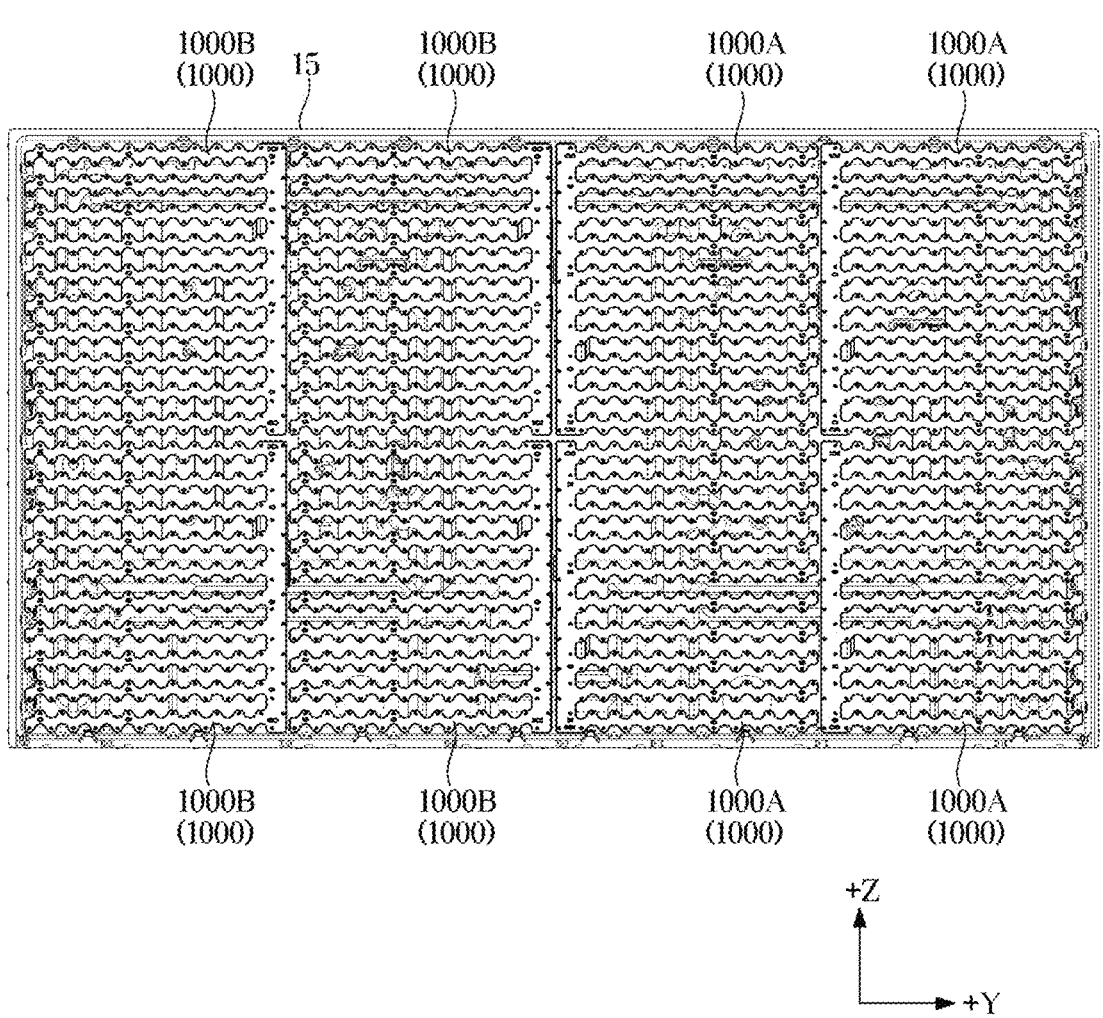
FIG. 5 is a view illustrating a light source board and a bottom chassis of the display apparatus according to an embodiment of the present disclosure.

FIG. 5 is a diagram illustrating a light source board and a bottom chassis of the display apparatus according to an embodiment of the present disclosure.

Referring to FIG. 5, the display apparatus 1 according to an embodiment of the present disclosure may include a plurality of light source modules 1000.

The plurality of light source modules 1000 may be disposed in front of the bottom chassis 15 (+X direction). For example, the plurality of light source modules 1000 may each be mounted on the bottom chassis 15. That is, the plurality of light source modules 1000 may each be fixed to the bottom chassis 15 and supported by the bottom chassis 15.

For example, the plurality of light source modules 1000 may be formed in shapes that correspond to each other. In other words, each of the plurality of light source modules 1000 may have substantially the same structure.

For example, as shown in FIG. 5, a light source module 1000A located on the right side (+Y direction side) of the display apparatus 1 among the plurality of light source modules 1000 and a light source module 1000B located on the left side (−Y direction side) of the display apparatus 1 among the plurality of light source modules 1000 may be arranged to be symmetrical around at least one line extending in the first direction (Z direction) or the second direction (Y direction). As shown in FIG. 5, a light source module 1000A located on the right side (+Y direction side) of the display apparatus 1 among the plurality of light source modules 1000 and a light source module 1000B located on the left side (−Y direction side) of the display apparatus 1 among the plurality of light source modules 1000 may be arranged to be rotated 180 degrees from each other about the X-axis. According to this arrangement, the plurality of light source modules 1000 may be arranged to be left and right symmetrical with respect to the horizontal center of the display apparatus 1, and provided to allow both sides of luminance to be uniform with respect to the horizontal center of the display apparatus 1.

As the plurality of light source modules 1000 is designed to have almost the same shape as each other, waste of components may be prevented and efficiency of the manufacturing process may be improved, thereby reducing product costs or manufacturing cost.

However, embodiments of the present disclosure are not limited thereto, and at least some of the plurality of light source modules 1000 may be formed to have different shapes.

FIG. 5 illustrates an example in which the display apparatus 1 includes eight light source modules 1000, but the number of light source modules 1000 included in the display apparatus 1 is not limited to the number shown in FIG. 5. For example, the number of light source modules 1000 included in the display apparatus 1 may be more or less than the number shown in FIG. 5. Alternatively, the display apparatus 1 may include a single light source module 1000 that is integrally formed.

Hereinafter the structure of one light source module 1000 among the plurality of light source modules 1000 will be described in detail. In an embodiment, the structure of one light source module 1000 described below may be correspondingly applied to each of the plurality of light source modules 1000.

Figure 6:
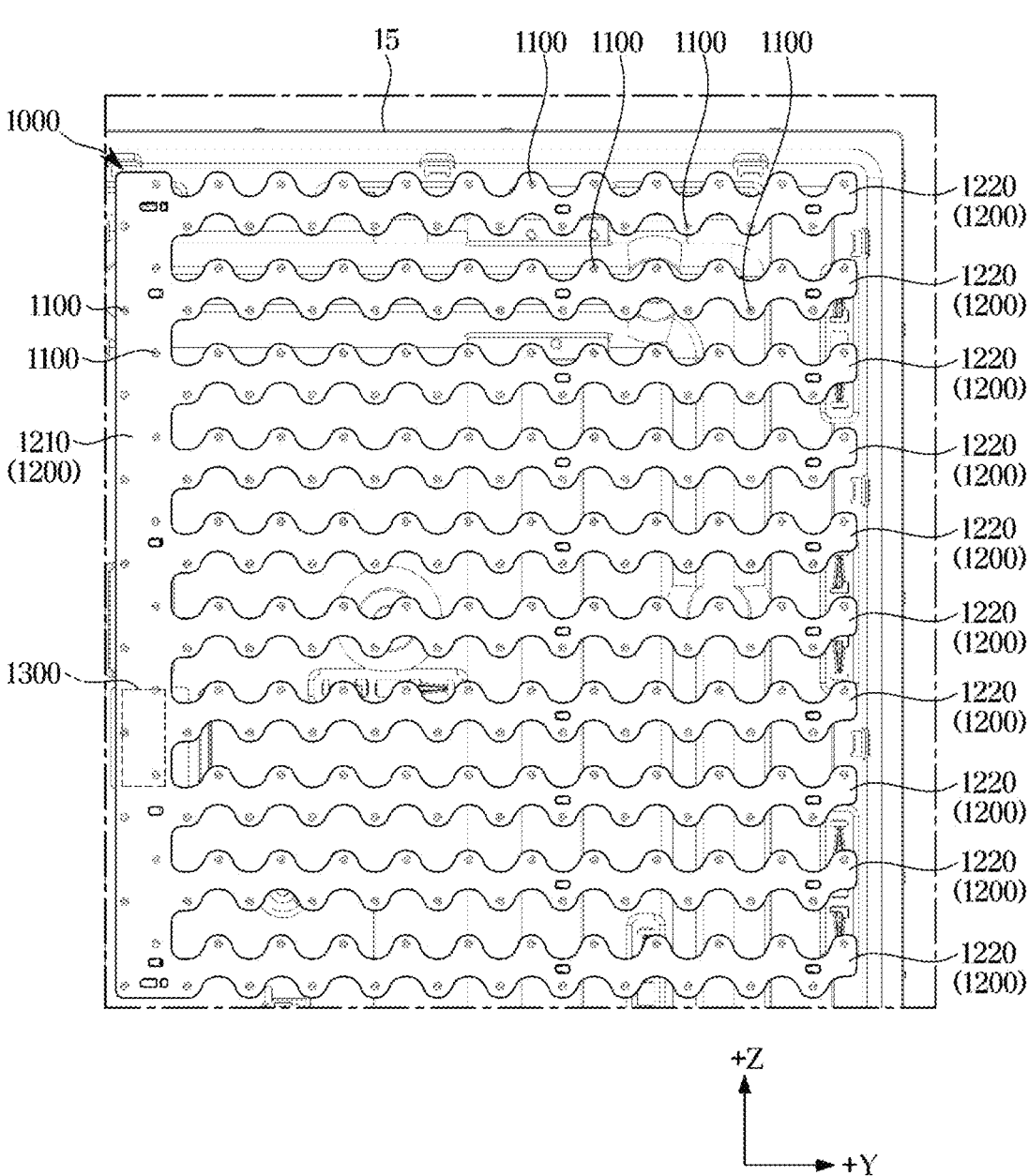
FIG. 6 is an enlarged view of a portion of the light source board and the bottom chassis of the display apparatus according to an embodiment of the present disclosure.

FIG. 6 is an enlarged view of a portion of the light source board and the bottom chassis of the display apparatus according to an embodiment of the present disclosure.

Referring to FIG. 6, the light source module 1000 of the display apparatus 1 according to an embodiment of the present disclosure may include a plurality of board bars 1220.

The board bar 1220 may be a configuration forming at least a portion of the light source board 1200 described above and may be a configuration including a printed circuit board extending in one direction.

At least some of the plurality of light sources 1100 may be mounted on the plurality of board bars 1220, respectively. At least some of the plurality of light sources 1100 may be mounted on a front surface of the plurality of board bars 1220. The front surface of the plurality of board bars 1220 refers to one surface of the plurality of board bars 1220 with respect to the direction in which the plurality of board bars 1220 faces the display panel 20.

The plurality of board bars 1220 may be composed of a printed circuit board on which the light source 1100 is mounted and the above-described power supply line 1230, etc. are provided.

The plurality of board bars 1220 may be arranged to be spaced apart from each other. The plurality of board bars 1220 may be arranged to be spaced apart from each other along the first direction (Z direction). For example, the first direction (Z direction) in which the plurality of board bars 1220 is spaced apart from each other may be substantially parallel to the vertical direction (i.e., up and down direction) of the display apparatus 1. The plurality of board bars 1220 may be arranged in parallel with each other at positions spaced apart from each other.

Each of the plurality of board bars 1220 may be formed to have a substantially bar shape. Particularly, each of the plurality of board bars 1220 may have a width in the first direction (Z direction) and may be elongated in a second direction (Y direction) different from the first direction (Z direction). That is, each of the plurality of board bars 1220 may have a shape in which a length in the second direction (Y direction) is greater than the width in the first direction (Z direction).

For example, a width direction of each of the plurality of board bars 1220 may be substantially parallel to the vertical direction (i.e., up and down direction) of the display apparatus 1. For example, a direction in which each of the plurality of board bars 1220 extends may be substantially parallel to the horizontal direction (i.e., left and right direction) of the display apparatus 1.

For example, the direction in which each of the plurality of board bars 1220 extends may be parallel to the long side direction of the display apparatus 1. For example, the width direction of each of the plurality of board bars 1220 may be parallel to the short side direction of the display apparatus 1.

The direction in which the plurality of board bars 1220 is spaced apart from each other may be parallel to each width direction. In other words, the plurality of board bars 1220 may be arranged to be spaced apart from each other along the first direction (Z direction) corresponding to each width direction.

Each of the plurality of board bars 1220 may extend in a direction different from the direction in which the plurality of board bars 1220 is spaced apart from each other. Particularly, each of the plurality of board bars 1220 may extend in a direction (e.g., the second direction (Y direction)) perpendicular to the direction in which the plurality of board bars 1220 is spaced apart from each other (e.g., the first direction (Z direction)). That is, the above-described first and second directions may be perpendicular to each other.

Alternatively, the direction in which the plurality of board bars 1220 is arranged to be spaced apart from each other and the direction in which each of the plurality of board bars 1220 extends may have a predetermined angle, but the angle may not be exactly vertical.

For example, the plurality of board bars 1220 may be arranged to allow a distance between the plurality of board bars 1220 in the first direction (Z direction) to be equal. In other words, the distance in the first direction (Z direction) between a pair of board bars 1220 adjacent to each other among the plurality of board bars 1220 may be approximately the same. Accordingly, the luminance uniformity of the display apparatus 1 may be improved.

For example, the plurality of board bars 1220 may be formed to have shapes that correspond to each other. For example, the widths of the plurality of board bars 1220 in the first direction (Z direction) may correspond to each other. For example, the lengths of the plurality of board bars 1220 extending in the second direction Y may correspond to each other. For example, the plurality of board bars 1220 may be formed in sizes corresponding to each other.

Each of the plurality of board bars 1220 may be mounted on the bottom chassis 15. As each of the plurality of board bars 1220 is mounted on the bottom chassis 15 and maintains a fixed position, the plurality of light sources 1100 mounted on the plurality of board bars 1220 may be stably disposed at each designed position The reflective sheet 120 may be attached to the front surface of each of the plurality of board bars 1220.

The light source module 1000 of the display apparatus 1 may include a board body 1210. The board body 1210 may be a configuration forming at least a portion of the light source board 1200 described above and may be a configuration including a printed circuit board.

The plurality of board bars 1220 may be connected to the board body 1210. The plurality of board bars 1220 may be supported by the board body 1210. For example, the plurality of board bars 1220 may be connected to one side of the board body 1210.

The plurality of board bars 1220 may extend from the board body 1210. For example, each of the plurality of board bars 1220 may extend from the board body 1210 to the second direction (Y direction). For example, each of the plurality of board bars 1220 may extend from one side of the board body 1210 to the second direction (Y direction).

For example, the board body 1210 may extend along the first direction (Z direction). For example, the board body 1210 may have a shape in which a length in the first direction (Z direction) is greater than a width in the second direction (Y direction). In this case, as the board body 1210 extends along the direction in which the plurality of board bars 1220 is arranged, the board body 1210 may have a structure in which a greater number of board bars 1220 are connected. Further, in this case, as the plurality of board bars 1220 extends from one side, which is in the second direction (Y direction) corresponding to the width direction (i.e., relatively short direction), of the board body 1210, the plurality of board bars 1220 may have a shape that is extends longer.

For example, the plurality of board body 1210 may be mounted on the bottom chassis 15. As the board body 1210 is mounted on the bottom chassis 15 and maintains a fixed position, the plurality of light sources 1100 mounted on the plurality of board body 1210 may be stably disposed at each designed position. Further, as the board body 1210 is mounted on the bottom chassis 15, the plurality of board bars 1220 connected to the board body 1210 may be more stably supported by the board body 1210.

For example, some of the plurality of light sources 1100 may be mounted on the board body 1210. Some of the plurality of light sources 1100 may be mounted on the front surface of the board body 1210. The front surface of the board body 1210 refers to one surface of the board body 1210 with respect to the direction in which the board body 1210 faces the display panel 20.

The board body 1210 may be composed of a printed circuit board on which the light source 1100 is mounted and the power supply line 1230 described above is provided.

The reflective sheet 120 may be attached to the front surface of the board body 1210. For example, a reflective sheet 120 formed as a single piece may be attached to the front surface of the board body 1210 and the plurality of board bars 1220. In this case, the luminance uniformity due to the light reflected by the reflective sheet 120 may be improved, and the process of attaching the reflective sheet 120 to the front surface of the board body 1210 and the plurality of board bars 1220 may be simplified. However, embodiments of the present disclosure are not limited thereto, and the plurality of reflective sheets 120, which is distinct from each other, may be attached to the front surfaces of the board body 1210 and the plurality of board bars 1220.

The display apparatus 1 may include a connector 1300. The connector 1300 may be electrically connected to the plurality of light sources 1100. The connector 1300 may be electrically connected to the light source board 1200. The connector 1300 may be electrically connected to various electronic components mounted on the light source board 1200, such as the plurality of light sources 1100, along the power supply line 1230 provided on the light source board 1200. Accordingly, the connector 1300 may transmit the electrical signal transmitted from the control assembly 50 to various electronic components mounted on the light source board 1200, such as the plurality of light sources 1100. The connector 1300 may transmit power supplied from the power assembly 60 to various electronic components mounted on the light source board 1200, such as the plurality of light sources 1100. In other words, the light source module 1000 may be electrically connected to the control assembly 50 and/or the power assembly 60 through the connector 1300.

For example, the connector 1300 may be mounted on the board body 1210. Particularly, the connector 1300 may be mounted on a rear surface of the board body 1210 facing the bottom chassis 15.

As described above, the reflective sheet 120 may be attached to the front surface of the board body 1210. Thus, in a comparative embodiment, when the connector 1300 is mounted on the front surface of the board body 1210, a portion of the reflective sheet 120, which is in a position corresponding to the mounting position of the connector 1300, may interfere with the connector 1300, and the luminance uniformity of the display apparatus 1 may deteriorate. However, in an embodiment of the present disclosure, as the connector 1300 is mounted on the rear surface of the board body 1210, it is possible to prevent the reduction of the luminance uniformity of the display apparatus 1.

For example, the board body 1210 and the plurality of board bars 1220 may be formed integrally with each other. In other words, the board body 1210 and the plurality of board bars 1220 may be connected to each other to form a light source board 1200 that is an integrated light source board. The light source board 1200 may be composed of a printed circuit board including the board body 1210 and the plurality of board bars 1220. Alternatively, the board body 1210 and the plurality of board bars 1220 may be separate parts that are not integrally formed with each other and connected through an assembly process.

The structure of the light source module 1000, such as the board body 1210 and the board bar 1220, described above with reference to FIG. 6 is only an example, and embodiments of the present disclosure are not limited thereto.

FIG. 6 illustrates an embodiment in which each of the plurality of board bars 1220 extends from the board body 1210 to the right direction (+Y direction), but is not limited thereto. Alternatively, the plurality of board bars 1220 may extend from the board body 1210 to the left direction (−Y direction)

In addition, FIG. 6 illustrates an embodiment in which the board body 1210 extends in the vertical direction (Z direction) of the display apparatus 1, but is not limited thereto. Alternatively, the board body 1210 may extend in the horizontal direction (Y direction).

In addition, FIG. 6 illustrates an embodiment in which each of the plurality of board bars 1220 extends in the horizontal direction (Y direction) from one side, which is in the horizontal direction (Y direction), of the board body 1210, but is not limited thereto. Alternatively, each of the plurality of board bars 1220 may extend in the vertical direction (Z direction) from one side, which is in the vertical direction (Z direction), of the board body 1210. In this case, the plurality of board bars 1220 may be arranged to be spaced apart from each other in the horizontal direction (Y direction).

In addition, according to embodiments, the first direction that is the width direction of each of the plurality of board bars 1220, or the first direction in which the plurality of board bars 1220 is spaced apart from each other, or the first direction in which the board body 1210 extends or the second direction in which each of the plurality of board bars 1220 extends may not be parallel to either the vertical direction (Z direction) or the horizontal direction (Y direction) of the display apparatus 1.

However, hereinafter for convenience of description, an example embodiment will be described in which the first direction is parallel to the vertical direction (Z direction) of the display apparatus 1, and the second direction is parallel to the horizontal direction (Y direction) of the display apparatus 1.

Figure 7:
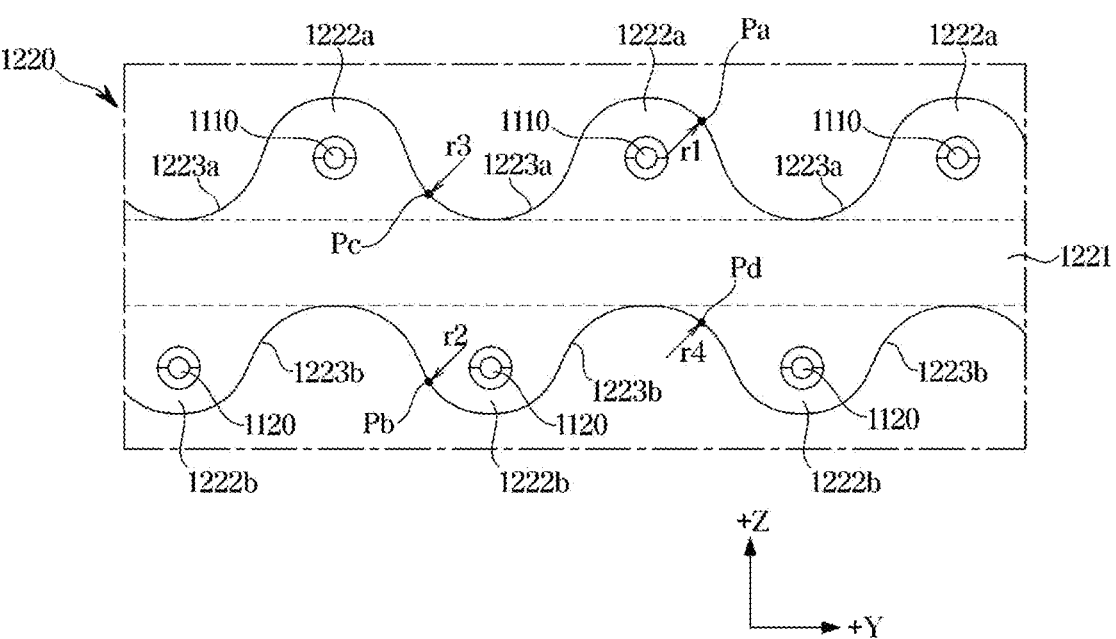
FIG. 7 is an enlarged view of a portion of the light source board of the display apparatus according to an embodiment of the present disclosure.
Figure 8:
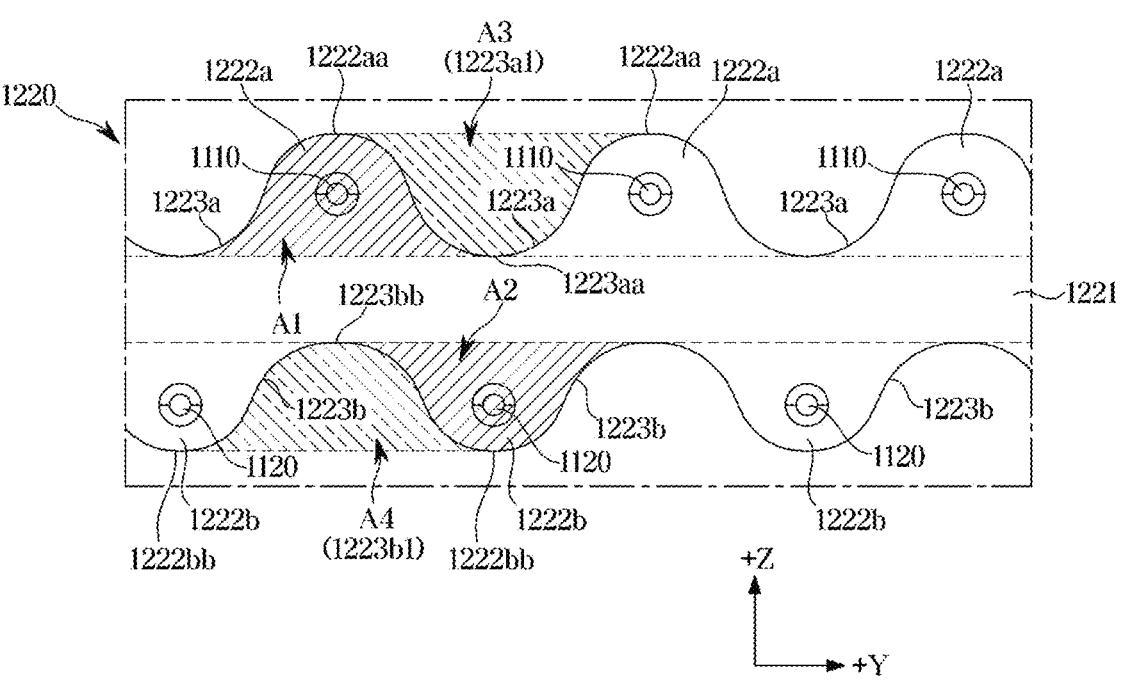
FIG. 8 is an enlarged view of a portion of the light source board of the display apparatus according to an embodiment of the present disclosure.

FIG. 7 is an enlarged view of a portion of the light source board of the display apparatus according to an embodiment of the present disclosure. FIG. 8 is an enlarged view of a portion of the light source board of the display apparatus according to an embodiment of the present disclosure.

A structure of one board bar 1220 among the plurality of board bars 1220 described with reference to FIG. 6 will be described with reference to FIGS. 7 and 8. The structure of the board bar 1220 shown in FIGS. 7 and 8 may be applied correspondingly to a structure of each of the plurality of board bars 1220.

Referring to FIGS. 7 and 8, the board bar 1220 of the display apparatus 1 according to an embodiment of the present disclosure may include a central extending portion 1221 extending in one direction and protrusions (e.g., first protrusions 1222a and second protrusions 1222b) protruding from the central extending portion 1221. The central extending portion 1221 and the first protrusions 1222a and the second protrusions 1222b may form a part of the light source board 1200 as a part of the board bar 1220.

The central extending portion 1221 may extend in the second direction (Y direction). A width direction of the central extending portion 1221 may be parallel to the first direction (Z direction). The central extending portion 1221 may have a shape in which an extension length in the second direction (Y direction) is greater than a width in the first direction (Z direction).

The central extending portion 1221 may be provided in a central portion of the board bar 1220. The central extending portion 1221 may include a region that passes through the center of the board bar 1220 and extends in the second direction (Y direction).

For example, as shown in FIGS. 7 and 8, the central extending portion 1221 may include a substantially rectangular bar-shaped region.

The board bar 1220 may include a plurality of first protrusions 1222a protruding from one side of the central extending portion 1221. Each of the plurality of first protrusions 1222a may protrude from one side of the central extending portion 1221 to the first direction (Z direction). Each of the plurality of first protrusions 1222a may protrude from one side of the central extending portion 1221 toward the outside of the central extending portion 1221. Each of the plurality of first protrusions 1222a may extend from the central extending portion 1221 to the first direction (Z direction). For example, each of the plurality of first protrusions 1222a may extend upward from an upper side of the central extending portion 1221.

For example, the first protrusion 1222a may be connected to the central extending portion 1221 and formed as one piece.

The plurality of first protrusions 1222a may be arranged along the second direction (Y direction). For example, the plurality of first protrusions 1222a may be arranged in such a way that positions thereof in the first direction (Z direction) (i.e., the vertical height of the display apparatus 1) correspond to each other.

For example, the plurality of first protrusions 1222a may be arranged at equal intervals along the second direction (Y direction).

For example, the plurality of first protrusions 1222a may be formed to have shapes that correspond to each other (e.g., may have a same shape as each other). For example, lengths of each of the plurality of first protrusions 1222a protruding from the central extending portion 1221 to the first direction (Z direction) may correspond to each other.

Some of the plurality of light sources 1100 mounted on the board bar 1220 may be mounted on the plurality of first protrusions 1222a. Hereinafter the light source mounted on each of the plurality of first protrusions 1222a will be referred to as a first side light source 1110. For example, a single first side light source 1110 may be mounted on a single first protrusion 1222a, but embodiments of the present disclosure are not limited thereto.

The plurality of first side light sources 1110 may be disposed at positions spaced apart from the central extending portion 1221 to the first direction (Z direction). As shown in FIGS. 7 and 8, the plurality of first side light sources 1110 may be arranged to be biased upward from the central extending portion 1221

The plurality of first side light sources 1110 may be arranged along the second direction (Y direction). For example, the plurality of first side light sources 1110 may be arranged in such a way that positions thereof in the first direction (Z direction) correspond to each other.

For example, the plurality of first side light sources 1110 may be arranged at equal intervals along the second direction (Y direction).

The board bar 1220 may include a plurality of second protrusions 1222b protruding from the other side of the central extending portion 1221. The plurality of second protrusions 1222b may protrude from the other side of the central extending portion 1221 to the first direction (Z direction). The other side of the central extending portion 1221 refers to a side different from the one side of the central extending portion 1221 on which the first protrusion 1222a protrudes. For example, the plurality of second protrusions 1222b may protrude in a direction, which is opposite to a protruding direction of the first protrusion 1222a, from the other side of the central extending portion 1221 that is opposite to the one side of the central extending portion 1221, on which the first protrusion 1222a protrudes. Each of the plurality of second protrusions 1222b may protrude to the outside of the central extending portion 1221 from the other side of the central extending portion 1221.

Each of the plurality of second protrusions 1222b may extend from the central extending portion 1221 to the first direction (Z direction). For example, each of the plurality of second protrusions 1222b may extend downward from the lower side of the central extending portion 1221.

For example, the second protrusion 1222b may be connected to the central extending portion 1221 and formed as one piece.

The plurality of second protrusions 1222b may be arranged along the second direction (Y direction). For example, the plurality of second protrusions 1222b may be arranged in such a way that positions thereof in the first direction (Z direction) (i.e., the vertical height of the display apparatus 1) correspond to each other.

For example, the plurality of second protrusions 1222b may be arranged at equal intervals along the second direction (Y direction).

For example, the plurality of second protrusions 1222b may be formed to have shapes that correspond to each other (e.g., may have a same shape as each other). For example, lengths of each of the plurality of second protrusions 1222b protruding from the central extending portion 1221 to the first direction (Z direction) may correspond to each other.

For example, the length, at which each of the plurality of first protrusions 1222a protrudes from the central extending portion 1221, and the length, at which each of the plurality of second protrusions 1222b protrudes from the central extending portion 1221, may be approximately equal to each other.

Some of the plurality of light sources 1100 mounted on the board bar 1220 may be mounted on the plurality of second protrusions 1222b. Hereinafter the light source mounted on each of the plurality of second protrusions 1222b will be referred to as a second side light source 1120. For example, a single second side light source 1120 may be mounted on a single second protrusion 1222b, but is not limited thereto.

The plurality of second side light sources 1120 may be disposed at positions spaced apart from the central extending portion 1221 to the first direction (Z direction). As shown in FIGS. 7 and 8, the plurality of second side light sources 1120 may be arranged to be biased downward from the central extending portion 1221.

The plurality of second side light sources 1120 may be arranged along the second direction (Y direction). For example, the plurality of second side light sources may be arranged in such a way that positions thereof in the first direction (Z direction) correspond to each other.

For example, the plurality of second side light sources 1120 may be arranged at equal intervals along the second direction (Y direction).

Some regions of the central extending portion 1221, in which the plurality of first protrusions 1222a protrudes, and other regions of the central extending portion 1221, in which the plurality of second protrusions 1222b extends, may intersect with respect to the second direction (Y direction). In other words, the first protrusion 1222a and the second protrusion 1222b may be alternating in the second direction (Y direction). In a single board bar 1220, the plurality of first protrusions 1222a and the plurality of second protrusions 1222b may be arranged not to be parallel to each other in the first direction (Z direction).

With this configuration, the first side light source 1110 and the second side light source 1120 may be arranged to be alternating along the second direction (Y direction). In a single board bar 1220, the plurality of light sources 1100 may be arranged in such a way that the first side light source 1110 disposed on one side in the first direction (Z direction) and the second side light source 1120 disposed on the other side are arranged to alternate along the second direction (Y direction). Accordingly, the luminance uniformity by the plurality of light sources 1100 may be improved. That is, in a single board bar 1220, the plurality of light sources 1100 may be arranged in a zigzag pattern.

Because the plurality of light sources 1100 is arranged in each of board bars 1220 as mentioned above, a distance between the light sources 1100 adjacent to each other in the pair of board bars 1220 among the plurality of board bars

1220 may be reduced, and the luminance and the luminance uniformity of the display apparatus 1 may be improved.

The board bar 1220 may include a plurality of first recess portions 1223a. Each of the plurality of first recess portions 1223a may be formed between a pair of first protrusions 1222a adjacent to each other among the plurality of first protrusions 1222a. That is, the first recess portion 1223a may be defined as a partial region of the board bar 1220 formed between the pair of first protrusions 1222a adjacent to each other.

The plurality of first recess portions 1223a may be provided on one side of the central extending portion 1221 with respect to the first direction (Z direction). For example, the plurality of first recess portions 1223a may be provided on the upper side of the central extending portion 1221.

The plurality of first recess portions 1223a may be formed to have a shape that is concavely recessed in the inner direction of the central extending portion 1221 in comparison with the plurality of first protrusions 1222a.

The plurality of first recess portions 1223a may be arranged along the second direction (Y direction). For example, the plurality of first recess portions 1223a may be arranged in such a way that positions thereof in the first direction (Z direction) (i.e., the vertical height of the display apparatus 1) correspond to each other.

For example, the plurality of first recess portions 1223a may be arranged at equal intervals along the second direction (Y direction).

For example, the plurality of first recess portions 1223a may be formed to have shapes that correspond to each other (e.g., may have a same shape as each other).

The board bar 1220 may include a plurality of second recess portions 1223b. Each of the plurality of second recess portions 1223b may be formed between a pair of second protrusions 1222b adjacent to each other among the plurality of second protrusions 1222b. That is, the second recess portion 1223b may be defined as a partial region of the board bar 1220 formed between the pair of second protrusions 1222b adjacent to each other.

The plurality of second recess portions 1223b may be provided on the other side of the central extending portion 1221 with respect to the first direction (Z direction). The other side of the central extending portion 1221 refers to the side different from the one side of the central extending portion 1221 in which the first recess portion 1223a is provided. For example, the plurality of second recess portions 1223b may be provided on the lower side of the central extending portion 1221.

The plurality of second recess portions 1223b may be formed to have a shape that is concavely recessed in the inner direction of the central extending portion 1221 in comparison with the plurality of second protrusions 1222b.

The plurality of second recess portions 1223b may be arranged along the second direction (Y direction). For example, the plurality of second recess portions 1223b may be arranged in such a way that positions thereof in the first direction (Z direction) (i.e., the vertical height of the display apparatus 1) correspond to each other.

For example, the plurality of second recess portions 1223b may be arranged at equal intervals along the second direction (Y direction).

For example, the plurality of second recess portions 1223b may be formed to have shapes that correspond to each other (e.g., may have a same shape as each other).

Some regions of the central extending portion 1221, in which the plurality of first recess portions 1223a is provided, and other regions of the central extending portion 1221, in which the plurality of second recess portions 1223b is provided, may intersect with respect to the second direction (Y direction). In other words, the first recess portion 1223a and the second recess portions 1223b may be arranged to alternate. In a single board bar 1220, the plurality of first recess portions 1223a and the plurality of second recess portions 1223b may be arranged not to be parallel to each other in the first direction (Z direction).

For example, each of the plurality of first protrusions 1222a may be arranged in parallel with one second recess portion 1223b that is the closest among the plurality of second recess portions 1223b, with respect to the first direction (Z direction). That is, the plurality of first protrusions 1222a and the plurality of second recess portions 1223b may be arranged in parallel with each other in the first direction (Z direction).

Further, each of the plurality of second protrusions 1222b may be arranged in parallel with one first recess portion 1223a that is the closest among the plurality of first recess portions 1223a, with respect to the first direction (Z direction). That is, the plurality of second protrusions 1222b and the plurality of first recess portions 1223a may be arranged in parallel with each other in the first direction (Z direction).

Accordingly, the board bar 1220 may have an overall shape that extends in a zigzag pattern.

A shape of an edge of each of the plurality of first recess portions 1223a may be different from a shape of an edge of each of the plurality of first protrusions 1222a. In other words, a shape of an outer surface of each of the plurality of first recess portions 1223a may be different from a shape of an outer surface of each of the plurality of first protrusions 1222a.

For example, a curvature of the edge of each of the plurality of first recess portions 1223a may be different from a curvature of the edge of each of the plurality of first protrusions 1222a. In other words, a curvature of an outer surface of each of the plurality of first recess portions 1223a may be different from a curvature of an outer surface of each of the plurality of first protrusions 1222a.

Further, the shape of the edge of each of the plurality of first recess portions 1223a may be different from a shape of an edge of each of the plurality of second protrusions 1222b. In other words, the shape of the outer surface of each of the plurality of first recess portions 1223a may be different from a shape of an outer surface of each of the plurality of second protrusions 1222b.

For example, the curvature of the edge of each of the plurality of first recess portions 1223a may be different from a curvature of the edge of each of the plurality of second protrusions 1222b. In other words, the curvature of the outer surface of each of the plurality of first recess portions 1223a may be different from a curvature of the outer surface of each of the plurality of second protrusions 1222b.

A shape of an edge of each of the plurality of second recess portions 1223b may be different from the shape of the edge of each of the plurality of second protrusions 1222b. In other words, a shape of an outer surface of each of the plurality of second recess portions 1223b may be different from the shape of the outer surface of each of the plurality of second protrusions 1222b.

For example, a curvature of the edge of each of the plurality of second recess portions 1223b may be different from the curvature of each edge of the plurality of second protrusions 1222b. In other words, a curvature of the outer surface of each of the plurality of second recess portions 1223b may be different from the curvature of the outer surface of each of the plurality of second protrusions 1222b.

Further, the shape of the edge of each of the plurality of second recess portions 1223*b* may be different from the shape of the edge of each of the plurality of first protrusions 1222*a*. In other words, the shape of the outer surface of each of the plurality of second recess portions 1223*b* may be different from the shape of the outer surface of each of the plurality of first protrusions 1222*a*.

For example, the curvature of the edge of each of the plurality of second recess portions 1223*b* may be different from the curvature of the edge of each of the plurality of first protrusions 1222*a*. In other words, the curvature of the outer surface of each of the plurality of second recess portions 1223*b* may be different from the curvature of the outer surface of each of the plurality of first protrusions 1222*a*.

The "edge of the first protrusion 1222*a*" or "outer surface of the first protrusion 1222*a*" refers to an outer edge of a portion, in which the first protrusion 1222*a* is provided, of the board bar 1220, as a portion of the outer edge of the board bar 1220. The "edge of the first protrusion 1222*a*" may be used to correspond to terms such as "outline of the first protrusion 1222*a*" or "profile of the first protrusion 1222*a*."

The "edge of the second protrusion 1222*b*" or "outer surface of the second protrusion 1222*b*" refers to an outer edge of a portion, in which the second protrusion 1222*b* is provided, of the board bar 1220, as a portion of the outer edge of the board bar 1220. The "edge the second protrusion 1222*b*" may be used to correspond to terms such as "outline of the second protrusion 1222*b*" or "profile of the second protrusion 1222*b*."

The "edge of the first recess portion 1223*a*" or the "outer surface of the first recess portion 1223*a*" refers to an outer edge of a portion, in which the first recess portion 1223*a* is provided, of the board bar 1220, as a portion of the outer edge of the board bar 1220. In other words, the "edge of the first recess portion 1223*a*" or "outer surface of the first recess portion 1223*a*" refers to an outer edge disposed between outer edges of the pair of first protrusions 1222*a* adjacent to each other, as a portion of an outer edge of the board bar 1220. The "edge of the first recess portion 1223*a*" may be used to correspond to terms such as "outline of the first recess portion 1223*a*" or "profile of the first recess portion 1223*a*."

The "edge of the second recess portion 1223*b*" or the "outer surface of the second recess portion 1223*b*" refers to an outer edge of a portion, in which the second recess portion 1223*b* is provided, of the board bar 1220, as a portion of the outer edge of the board bar 1220. In other words, the "edge of the second recess portion 1223*b*" or "outer surface of the second recess portion 1223*b*" refers to an outer edge disposed between outer edges of the pair of second protrusions 1222*b* adjacent to each other, as a portion of an outer edge of the board bar 1220. The "edge of the second recess portion 1223*b*" may be used to correspond to terms such as "outline of the second recess portion 1223*b*" or "profile of the second recess portion 1223*b*."

In addition, the meaning of the expression "the shape of the edge or outer surface of the first recess portions 1223*a* and the second recess portions 1223*b* is different from the shape of the edge or inner surface of the first protrusion portions 1222*a* and the second protrusion portions 1222*b*" described above does not mean that the first protrusion portions 1222*a* and the second protrusion portions 1222*b* have a protruding shape and the first recess portions 1223*a* and the second recess portions 1223*b* have a recessed shape and thus the shapes thereof are different from each other, but means that the shapes of the lines along each edge are different from each other.

Referring to FIGS. 7 and 8, as for the edge of each of the plurality of first protrusions 1222*a* and the edge of each of the plurality of second recess portions 1223*b*, curvatures at points corresponding to each other with respect to the first direction (Z direction) may be different from each other. For example, a first point Pa may be defined on one first protrusion 1222*a* among the plurality of first protrusions 1222*a* and a second point Pd may be defined on one second protrusion 1222*b* among the plurality of second protrusions 1222*b*. The first point Pa and the second point Pd may be positioned to correspond to each other in the first direction (Z direction). A curvature at the first point Pa (radius of curvature r1) and a curvature at the second point Pd (radius of curvature r4) may be different from each other. In other words, the first point Pa may be defined on an edge spaced apart by a predetermined distance in the second direction (Y direction) from an outer end portion 1222*aa*, which most protrudes in the first direction (Z direction), of the plurality of first protrusions 1222*a*, and the second point Pd may be defined on an edge spaced apart by the same distance in the second direction (Y direction) from an inner end portion 1223*bb*, which is closest to the central extending portion 1221 in the first direction (Z direction), of the plurality of second recess portions 1223*b*. The curvature at the first point Pa (radius of curvature r1) and the curvature at the second point Pd (radius of curvature r4) may be different from each other.

As for the edge of each of the plurality of second protrusions 1222*b* and the edge of each of the plurality of first recess portions 1223*a*, curvatures at points corresponding to each other with respect to the first direction (Z direction) may be different from each other. For example, a third point Pb may be defined on one second protrusion 1222*b* among the plurality of second protrusions 1222*b* and a fourth point Pc may be defined on one first recess portion 1223*a* among the plurality of first recess portions 1223*a*. The third point Pb and the fourth point Pc may be positioned to correspond to each other in the first direction (Z direction). A curvature at the third point Pb (radius of curvature r2) and a curvature at the fourth point Pc (radius of curvature r3) may be different from each other. In other words, the third point Pb may be defined on an edge spaced apart by a predetermined distance in the second direction (Y direction) from an outer end portion 1222*bb*, which most protrudes in the first direction (Z direction), of the plurality of second protrusions 1222*b*, and the fourth point Pc may be defined on an edge spaced apart by the same distance in the second direction (Y direction) from an inner end portion 1223*aa*, which is closest to the central extending portion 1221 in the first direction (Z direction), of the plurality of first recess portions 1223*a*. The curvature at the third point Pb (radius of curvature r2) and the curvature at the fourth point Pc (radius of curvature r3) may be different from each other.

In addition, the first point Pa may be defined on an edge spaced apart by a predetermined distance in the second direction (Y direction) from the outer end portion 1222*aa*, which most protrudes in the first direction (Z direction), of the plurality of first protrusions 1222*a*, and the fourth point Pc may be defined on an edge spaced apart by the same distance in the second direction (Y direction) from the inner end portion 1223*aa*, which is closest to the central extending portion 1221 in the first direction (Z direction), of the plurality of first recess portions 1223*a*. The curvature at the first point Pa (radius of curvature r1) and the curvature at the fourth point Pc (radius of curvature r3) may be different from each other.

In addition, the third point Pb may be defined on an edge spaced apart by a predetermined distance in the second direction (Y direction) from the outer end portion 1222*bb*, which most protrudes in the first direction (Z direction), of the plurality of second protrusions 1222*b*, and the second point Pd may be defined on an edge spaced apart by the same distance in the second direction (Y direction) from the inner end portion 1223*bb*, which is closest to the central extending portion 1221 in the first direction (Z direction), of the plurality of second recess portions 1223*b*. The curvature at the third point Pb (radius of curvature r2) and the curvature at the second point Pd (radius of curvature r4) may be different from each other.

According to an embodiment shown in FIGS. 7 and 8, the shape of the edge of each of the plurality of first protrusions 1222*a* and the shape of the edge of each of the plurality of second protrusions 1222*b* may correspond to each other. In other words, the shape of the outer surface of each of the plurality of first protrusions 1222*a* and the shape of the outer surface of each of the plurality of second protrusions 1222*b* may correspond to each other (e.g., may have a same shape as each other). Particularly, the edge of each of the plurality of first protrusions 1222*a* and the edge of each of the plurality of second protrusions 1222*b* may have corresponding curvatures (e.g., a same curvature). In other words, the outer surfaces of each of the plurality of first protrusions 1222*a* and the outer surfaces of each of the plurality of second protrusions 1222*b* may have corresponding curvatures (e.g., a same curvature).

In addition, according to an embodiment shown in FIGS. 7 and 8, the shape of the edge of each of the plurality of first recess portions 1223*a* and the shape of the edge of each of the plurality of second recess portions 1223*b* correspond to each other. In other words, the shape of the outer surface of each of the plurality of first recess portions 1223*a* and the shape of the outer surface of each of the plurality of second recess portions 1223*b* may correspond to each other. Particularly, the edge of each of the plurality of first recess portions 1223*a* and the edge of each of the plurality of second recess portions 1223*b* may have corresponding curvatures. In other words, the outer surface of each of the plurality of first recess portions 1223*a* and the outer surface of each of the plurality of second recess portions 1223*b* may have corresponding curvatures.

At this time, the shape of the edge of each of the plurality of first protrusions 1222*a* and the plurality of second protrusions 1222*b* may be different from the shape of the edge of each of the plurality of first recess portions 1223*a* and the plurality of second recess portions 1223*b*. In other words, the shape of the outer surface of each of the plurality of first protrusions 1222*a* and the plurality of second protrusions 1222*b* may be different from the shape of the outer surface of each of the plurality of first recess portions 1223*a* and the plurality of second recess portions 1223*b*. Particularly, as shown in FIGS. 7 and 8, the curvature of the edge of each of the plurality of first protrusions 1222*a* and the plurality of second protrusions 1222*b* may be different from the curvature of the edge of each of the plurality of first recess portions 1223*a* and the plurality of second recess portions 1223*b*. In other words, the curvature of the outer surface of each of the plurality of first protrusions 1222*a* and the plurality of second protrusions 1222*b* may be different from the curvature of the outer surface of each of the plurality of first recess portions 1223*a* and the plurality of second recess portions 1223*b*.

As the shape of the first protrusions 1222*a* and the second protrusions 1222*b* of the board bar 1220 and the shape of the first recess portions 1223*a* and the second recess portions 1223*b* are different from each other, the efficiency of the process for manufacturing the light source board 1200 may be improved. For example, when performing a process of manufacturing a plurality of light source boards 1200A and 1200B from one board material 1200M, as described later with reference to FIGS. 16 to 19, the board bars 1220A and 1220B included in the different light source boards 1200A and 1200B may be more easily separated in the state in which the shape of the first protrusions 1222*a* and the second protrusions 1222*b* and the shape of the first recess portions 1223*a* and the second recess portions 1223*b*, which are arranged side by side, are different from each other, in comparison with the state in which the shape of the first protrusions 1222*a* and the second protrusions 1222*b* and the shape of the first recess portions 1223*a* and the second recess portions 1223*b* are the same. Accordingly, the manufacturing cost of the product may be reduced.

Particularly, the curvature of the edge of each of the plurality of first protrusions 1222*a* may be greater than the curvature of the edge of each of the plurality of first recess portions 1223*a*. In other words, the radius of curvature r1 of the edge of each of the plurality of first protrusions 1222*a* may be less than the radius of curvature r3 of the edge of each of the plurality of first recess portions 1223*a*.

Referring to FIGS. 7 and 8, the curvature at the first point Pa on the first protrusion 1222*a* may be less than the curvature at the fourth point Pc on the first recess portion 1223*a*. For example, a distance in the second direction (Y direction) from the outer end portion 1222*aa* of the first protrusion 1222*a* to the first point Pa may correspond to a distance in the second direction (Y direction) from the inner end portion 1223*aa* of the first recess portion 1223*a* to the fourth point Pc.

Particularly, when the first point Pa on the first protrusion 1222*a* is located adjacent to the outer end portion 1222*aa* on the edge of the first protrusion 1222*a*, and the fourth point Pc on the first recess portion 1223*a* is adjacent to the inner end portion 1223*aa* on the edge of the first recess portion 1223*a*, the absolute value of the radius of curvature at the first point Pa may be less than or equal to the absolute value of the curvature at the fourth point Pc.

The curvature of the edge of each of the plurality of first protrusions 1222*a* may be greater than the curvature of the edge of each of the plurality of second recess portions 1223*b*. In other words, the radius of curvature r1 of the edge of each of the plurality of first protrusions 1222*a* may be less than the radius of curvature r4 of the edge of each of the plurality of second recess portions 1223*b*.

Referring to FIGS. 7 and 8, the curvature at the first point Pa on the first protrusion 1222*a* may be less than the curvature at the second point Pd on the second recess portion 1223*b*. For example, a distance in the second direction (Y direction) from the outer end portion 1222*aa* of the first protrusion 1222*a* to the first point Pa may correspond to a distance in the second direction (Y direction) from the inner end portion 1223*bb* of the second recess portion 1223*b* to the second point Pd.

Particularly, when the first point Pa on the first protrusion 1222*a* is located adjacent to the outer end portion 1222*aa* on the edge of the first protrusion 1222*a*, and the second point Pd on the second recess portion 1223*b* is adjacent to the inner end portion 1223*bb* on the edge of the second recess portion 1223*b*, the absolute value of the radius of curvature at the first point Pa may be less than or equal to the absolute value of the curvature at the second point Pd.

The curvature of the edge of each of the plurality of second protrusions 1222*b* may be greater than the curvature of the edge of each of the plurality of second recess portions 1223*b*. In other words, the radius of curvature r2 of the edge of each of the plurality of second protrusions 1222*b* may be less than the radius of curvature r4 of the edge of each of the plurality of second recess portions 1223*b*.

Referring to FIGS. 7 and 8, the curvature at the third point Pb on the second protrusion 1222*b* may be less than the curvature at the second point Pd on the second recess portion 1223*b*. For example, a distance in the second direction (Y direction) from the outer end portion 1222*bb* of the second protrusion 1222*b* to the third point Pb may correspond to (e.g., be the same as) a distance in the second direction (Y direction) from the inner end portion 1223*bb* of the second recess portion 1223*b* to the second point Pd.

Particularly, when the third point Pb on the second protrusion 1222*b* is located adjacent to the outer end portion 1222*bb* on the edge of the second protrusion 1222*b*, and the second point Pd on the second recess portion 1223*b* is adjacent to the inner end portion 1223*bb* on the edge of the second recess portion 1223*b*, the absolute value of the radius of curvature at the third point Pb may be less than or equal to the absolute value of the curvature at the second point Pd.

The curvature of the edge of each of the plurality of second protrusions 1222*b* may be greater than the curvature of the edge of each of the plurality of first recess portions 1223*a*. In other words, the radius of curvature r2 of the edge of each of the plurality of second protrusions 1222*b* may be less than the radius of curvature r3 of the edge of each of the plurality of first recess portions 1223*a*.

Referring to FIGS. 7 and 8, the curvature at the third point Pb on the second protrusion 1222*b* may be less than the curvature at the fourth point Pc on the first recess portion 1223*a*. For example, a distance in the second direction (Y direction) from the outer end portion 1222*bb* of the second protrusion 1222*b* to the third point Pb may correspond to a distance in the second direction (Y direction) from the inner end portion 1223*aa* of the first recess portion 1223*a* to the fourth point Pc.

Particularly, when the third point Pb on the second protrusion 1222*b* is located adjacent to the outer end portion 1222*bb* on the edge of the second protrusion 1222*b*, and the fourth point Pc on the first recess portion 1223*a* is adjacent to the inner end portion 1223*aa* on the edge of the first recess portion 1223*a*, the absolute value of the radius of curvature at the third point Pb may be less than or equal to the absolute value of the curvature at the fourth point Pc.

That is, the curvatures of each of the first protrusions 1222*a* and the second protrusions 1222*b* may be greater than the curvatures of each of the first recess portions 1223*a* and the second recess portions 1223*b*. In other words, in the board bar 1220, the radius of curvature of each of the first protrusions 1222*a* and the second protrusions 1222*b* may be less than the radius of curvature of each of the first recess portions 1223*a* and the second recess portions 1223*b*.

When the board bar 1220 includes the above-mentioned structure, the efficiency of the process of manufacturing the light source board 1200 may be improved. For example, when performing the process of manufacturing the plurality of light source boards 1200A and 1200B from the one board material 1200M, as described later with reference to FIGS. 16 to 19, a process of separating the board bars 1220A and 1220B included in the different light source boards 1200A and 1200B may be more simplified in the state in which the curvatures of the first protrusions 1222*a* and the second protrusions 1222*b* arranged side by side are greater than the curvatures of the first recess portions 1223*a* and the second recess portions 1223*b*. Further, when performing the process of manufacturing the plurality of light source boards 1200A and 1200B from the one board material 1200M, it is possible to reduce a portion that is unnecessarily removed. Further, it is possible to prevent waste of materials so as to reduce costs. Accordingly, the manufacturing cost of the product may be reduced.

A detailed description of the method of manufacturing the light source board 1200 through operations of FIGS. 16 to 19 will be described later.

In addition, as the radius of curvature of the first protrusions 1222*a* and the second protrusions 1222*b* of the board bar 1220 decreases, a length protruding from the central extending portion 1221 may increase relative to an area of each of the first protrusions 1222*a* and the second protrusions 1222*b*. As a result, relative to the overall area of the plurality of board bars 1220, a distance between the light sources 1100 adjacent to each other in the pair of board bars 1220 adjacent to each other may be reduced, and the luminance and the luminance uniformity of the display apparatus 1 may be improved.

Further, as the radius of curvature of the first recess portions 1223*a* and the second recess portions 1223*b* of the board bar 1220 increases, a reduced area of a portion corresponding to the first recess portions 1223*a* and the second recess portions 1223*b* of the board bar 1220, relative to a depth in which the first recess portions 1223*a* and the second recess portions 1223*b* are recessed between the pair of protrusions (e.g., the first protrusion 1222*a* or the second protrusion 1222*b*) may be increased.

Meanwhile, FIGS. 7 and 8 illustrate an embodiment in which the edge of each of the plurality of first protrusions 1222*a* and the edge of each of the plurality of second protrusions 1222*b* correspond to each other in shape (e.g., have a same curvature), and the edge of each of the plurality of first recess portions 1223*a* and the edge of each of the plurality of second recess portions 1223*b* correspond to each other in shape (e.g., have a same curvature). In this case, the efficiency may be improved in the product design and manufacturing process. For example, it is possible to simplify the manufacturing process of the light source board 1200 and to easily design the arrangement of the light source board 1200. Further, manufacturing costs may be reduced.

As illustrated in FIG. 8, a first recess region 1223*a*1 may be defined by one first recess portion 1223*a* among the plurality of first recess portions 1223*a* and a pair of first protrusions 1222*a* adjacent to the first recess portion 1223*a*. Particularly, the first recess region 1223*a*1 may be defined by one first recess portion 1223*a* among the plurality of first recess portions 1223*a* and a line connecting the outer end portions 1222*aa* of each of the pair of first protrusions 1222*a* adjacent thereto.

Further, as illustrated in FIG. 8, a second recess region 1223*b*1 may be defined by one second recess portion 1223*b* among the plurality of second recess portions 1223*b* and a pair of second protrusions 1222*b* adjacent to the second recess portion 1223*b*. Particularly, the second recess region 1223*b*1 may be defined by one second recess portion 1223*b* among the plurality of second recess portions 1223*b* and a line connecting the outer end portions 1222*bb* of each of the pair of second protrusions 1222*b* adjacent thereto.

A size A1 of the first protrusion 1222a may be different from a size A3 of the first recess region 1223a1. In other words, the area A1 in which the first protrusion 1222a protrudes from the central extending portion 1221 may be different from the area A3 of the first recess region 1223a1. For example, as shown in FIG. 8, the size A1 of the first protrusion 1222a may be less than the size A3 of the first recess region 1223a1.

The size A1 of the first protrusion 1222a may be different from a size A4 of the second recess region 1223b1. In other words, the area A1 in which the first protrusion 1222a protrudes from the central extending portion 1221 may be different from the area A4 of the second recess region 1223b1. For example, as shown in FIG. 8, the size A1 of the first protrusion 1222a may be less than the size A4 of the second recess region 1223b1.

A size A2 of the second protrusion 1222b may be different from the size A4 of the second recess region 1223b1. In other words, the area A2 in which the second protrusion 1222b protrudes from the central extending portion 1221 may be different from the area A4 of the second recess region 1223b1. For example, as shown in FIG. 8, the size A2 of the second protrusion 1222b may be less than the size A4 of the second recess region 1223b1.

The size A2 of the second protrusion 1222b may be different from the size A3 of the first recess region 1223a1. In other words, the area A2 in which the second protrusion 1222b protrudes from the central extending portion 1221 may be different from the area A3 of the first recess region 1223a1. For example, as shown in FIG. 8, the size A2 of the second protrusion 1222b may be less than the size A3 of the first recess region 1223a1.

For example, the size A1 of the first protrusion 1222a may approximately correspond to the size A2 of the second protrusion 1222b. For example, the size A3 of the first recess region 1223a1 may approximately correspond to the size A4 of the second recess region 1223b1.

That is, the size of each of the first protrusions 1222a and the second protrusions 1222b provided on the board bar 1220 and the size of each of the first recess portions 1223a and the second recess portions 1223b may be different from each other. For example, the size of each of the first protrusions 1222a and the second protrusions 1222b provided on the board bar 1220 may be less than the size of each of the first recess portions 1223a and the second recess portions 1223b.

When the board bar 1220 includes the above-mentioned structure, the efficiency of the process of manufacturing the light source board 1200 may be improved. For example, when performing the process of manufacturing the plurality of light source boards 1200A and 1200B from the one board material 1200M, as described later with reference to FIGS. 16 to 19, the process of separating the board bars 1220A and 1220B included in the different light source boards 1200A and 1200B may be more simplified in the state in which the size of the first protrusions 1222a and the second protrusions 1222b arranged side by side are different from the size of the first recess portions 1223a and the second recess portions 1223b. Further, when performing the process of manufacturing the plurality of light source boards 1200A and 1200B from the one board material 1200M, it is possible to reduce a portion that is unnecessarily removed. Further, it is possible to prevent waste of materials so as to reduce costs. Accordingly, the manufacturing cost of the product may be reduced.

Figure 9:
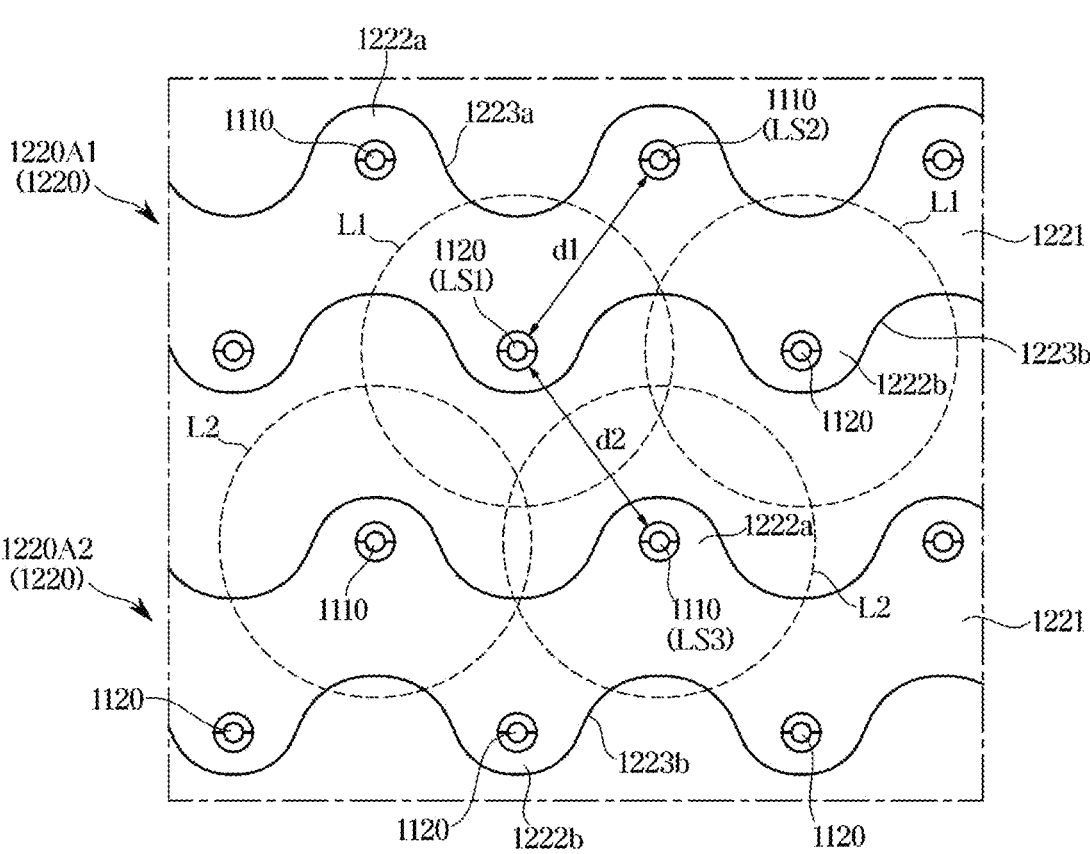
FIG. 9 is an enlarged view of a portion of the light source board of the display apparatus according to an embodiment of the present disclosure.
Figure 9:
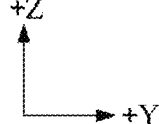

FIG. 9 is an enlarged view of a portion of the light source board of the display apparatus according to an embodiment of the present disclosure.

A pair of board bars (e.g., a first board bar 1220A1 and a second board bar 1220A2) adjacent to each other among the plurality of board bars 1220 included in the light source board 1200 of the display apparatus 1 according to an embodiment of the present disclosure will be described as an example with reference to FIG. 9. The structure of the pair of board bars (e.g., the first board bar 1220A1 and the second board bar 1220A2) described with reference to FIG. 9 may be applied correspondingly to a structure of any pair of board bars 1220 adjacent to each other among the plurality of board bars 1220.

Referring to FIG. 9, the pair of board bars (e.g., the first board bar 1220A1 and the second board bar 1220A2) included in the display apparatus 1 according to an embodiment of the present disclosure may be arranged in parallel with each other in the first direction (Z direction). Hereinafter for convenience of description, among the pair of board bars (e.g., the first board bar 1220A1 and the second board bar 1220A2) based on FIG. 9, the board bar located on the upper side (+Z direction side) is referred to as a first board bar 1220A1 and the board bar located on the lower side (−Z direction side) is referred to as a second board bar 1220A2.

For example, the first board bar 1220A1 and the second board bar 1220A2 may have shapes corresponding to each other (e.g., may have a same shape as each other). Particularly, a plurality of first protrusions 1222a provided on the first board bar 1220A1 and a plurality of first protrusions 1222a provided on the second board bar 1220A2 may have shapes corresponding to each other. Further, a plurality of second protrusions 1222b provided on the first board bar 1220A1 and a plurality of second protrusions 1222b provided on the second board bar 1220A2 may have shapes corresponding to each other. Further, a plurality of first recess portions 1223a provided on the first board bar 1220A1 and a plurality of first recess portions 1223a provided on the second board bar 1220A2 may have shapes corresponding to each other. Further, a plurality of second recess portions 1223b provided in the first board bar 1220A1 and a plurality of second recess portions 1223b provided in the second board bar 1220A2 may have shapes corresponding to each other.

For example, each of the plurality of first protrusions 1222a provided on the first board bar 1220A1 may be arranged in parallel with each of the plurality of first protrusions 1222a provided on the second board bar 1220A2, with respect to the first direction (Z direction).

For example, each of the plurality of second protrusions 1222b provided on the first board bar 1220A1 may be arranged in parallel with each of the plurality of second protrusions 1222b provided on the second board bar 1220A2, with respect to the first direction (Z direction).

For example, each of the plurality of first recess portions 1223a provided on the first board bar 1220A1 may be arranged in parallel with each of the plurality of first recess portions 1223a provided on the second board bar 1220A2, with respect to the first direction (Z direction).

For example, each of the plurality of second recess portions 1223b provided on the first board bar 1220A1 may be arranged in parallel with each of the plurality of second recess portions 1223b provided on the second board bar 1220A2, with respect to the first direction (Z direction).

Particularly, as shown in FIG. 9, the plurality of first protrusions 1222a and the plurality of second recess portions 1223b provided on the first board bar 1220A1, and the plurality of first protrusions 1222*a* and the plurality of second recess portions 1223*b* provided on the second board bar 1220A2 may be arranged in parallel with each other with respect to the first direction (Z direction).

Further, as shown in FIG. 9, the plurality of first recess portions 1223*a* and the plurality of second protrusions 1222*b* provided on the first board bar 1220A1, and the plurality of first recess portions 1223*a* and the plurality of second protrusions 1222*b* provided on the second board bar 1220A2 may be arranged in parallel with each other with respect to the first direction (Z direction).

As shown in FIG. 9, as the light source 1100 (e.g., the first side light source 1110 or the second side light source 1120) is mounted on the first protrusions 1222*a* and the second protrusions 1222*b* of each board bar 1220, a distance between the pair of light sources 1100 adjacent to each other in the pair of board bars (e.g., the first board bar 1220A1 and the second board bar 1220A2) adjacent to each other may be reduced. Accordingly, the luminance and the luminance uniformity of the display apparatus 1 may be improved.

For example, as shown in FIG. 9, among the plurality of light sources 1100 mounted on the first board bar 1220A1, the second side light source 1120 adjacent to the second board bar 1220A2 may be disposed on the plurality of second protrusions 1222*b* protruding from the central extending portion 1221 of the first board bar 1220A1 toward the second board bar 1220A2. In addition, among the plurality of light sources 1100 mounted on the second board bar 1220A2, the first side light source 1110 adjacent to the first board bar 1220A1 may be disposed on the plurality of first protrusions 1222*a* protruding from the central extending portion 1221 of the second board bar 1220A2 toward the first board bar 1220A1. With this structure, a distance between the second side light source 1120 of the first board bar 1220A1 and the first side light source 1110 of the second board bar 1220A2 may be further reduced.

At this time, because an intensity of light output by one light source 1100 based on the supplied power is set within a predetermined range, a profile of light output by one light source 1100 may be provided in a predetermined range corresponding thereto.

In an embodiment of the present disclosure, as the plurality of light sources 1100 is disposed on the first protrusions 1222*a* and the second protrusions 1222*b* in the board bar 1220, profiles of each light output by the light sources 1100 adjacent to each other in the pair of adjacent board bars 1220 may sufficiently overlap with each other. For example, as shown in FIG. 9, a profile L1 of the light output by the second side light source 1120 of the first board bar 1220A1 and a profile L2 of the light output by the first side light source 1110 of the second board bar 1220A2 may overlap each other to a sufficient extent. Accordingly, the luminance uniformity of the display apparatus 1 may be improved.

For example, a separation distance in the first direction (Z direction) between the pair of board bars (e.g., the first board bar 1220A1 and the second board bar 1220A2) may be set to be greater than the width of one board bar 1220 in the first direction (Z direction). For example, a distance in the first direction (Z direction) between the second protrusion 1222*b* of the first board bar 1220A1 and the first recess portion 1223*a* of the second board bar 1220A2 may be greater than a distance in the first direction (Z direction) between the first recess portion 1223*a* and the second protrusion 1222*b* of the first board bar 1220A1. Further, a distance in the first direction (Z direction) between the second recess portion 1223*b* of the first board bar 1220A1 and the first protrusion 1222*a* of the second board bar 1220A2 may be greater than a distance in the first direction (Z direction) between the first protrusion 1222*a* of the first board bar 1220A1 and the second recess portion 1223*b* of the first board bar 1220A1.

With this structure, an amount of material consumed in manufacturing the light source board 1200 may be reduced. For example, when the plurality of board bars 1220 has this structure, it is possible to manufacture the plurality of light source boards 1200A and 1200B from the one board material 1200M, as described later with reference to FIGS. 16 to 19.

As mentioned above, because the protrusions (e.g., the second protrusion 1222*b* of the first board bar 1220A1 and the first protrusion 1222*a* of the second board bar 1220A2), which are adjacent to each other in the pair of board bars (e.g., the first board bar 1220A1 and the second board bar 1220A2), protrude toward each other, instead of the long distance between the pair of board bars (e.g., the first board bar 1220A1 and the second board bar 1220A2), it is possible to reduce the distance between the protrusions. Accordingly, the distance between the light sources 1100 adjacent to each other may be reduced, thereby improving the luminance uniformity of light.

In order to further improve the luminance uniformity of the display apparatus 1, the distance between the plurality of light sources 1100 may be determined as follows.

Referring to FIG. 9, one light source among the plurality of light sources 1100 mounted on one side, which is adjacent to the second board bar 1220A2, among both sides of the first board bar 1220A1 with respect to the first direction (Z direction) may be defined as a first light source LS1. Further, among the plurality of light sources 1100 mounted on the other side, which is opposite to the second board bar 1220A2, among both sides of the first board bar 1220A1 with respect to the first direction (Z direction), one light source that is closest to the first light source LS1 may be defined as a second light source LS2. Further, among the plurality of light sources 1100 mounted on one side, which is adjacent to the first board bar 1220A1, among both sides of the second board bar 1220A2 with respect to the first direction (Z direction), one light source that is closest to the first light source LS1 may be defined as a third light source LS3. The third light source LS3 may be one light source that is closest to the first light source LS1 among the plurality of light sources 1100 mounted on the second board bar 1220A2.

For example, the first light source LS1 may be one of the second side light sources 1120 mounted on the first board bar 1220A1, the second light source LS2 may be one of the first side light sources 1110 mounted on the first board bar 1220A1, and the third light source LS3 may be one of the first side light sources 1110 mounted on the second board bar 1220A2.

For example, a ratio of a distance d2 between the first light source LS1 and the third light source LS3 to a distance d1 between the first light source LS1 and the second light source LS2 may satisfy a range that is greater than or equal to 9/10 but less than or equal to 10/9. When the ratio of the distance d2 between the first light source LS1 and the third light source LS3 to the distance d1 between the first light source LS1 and the second light source LS2 satisfies the above range, the luminance uniformity of the display apparatus 1 may be improved. In contrast, when the ratio of the distance d2 between the first light source LS1 and the third light source LS3 to the distance d1 between the first light source LS1 and the second light source LS2 is out of the above range, the luminance uniformity of the display apparatus 1 may be relatively reduced.

In order to further improve the luminance uniformity of the display apparatus 1, it is appropriate that the distance d1 between the first light source LS1 and the second light source LS2 and the distance d2 between the first light source LS1 and the third light source LS3 are provided to be equal to each other.

Figure 10:
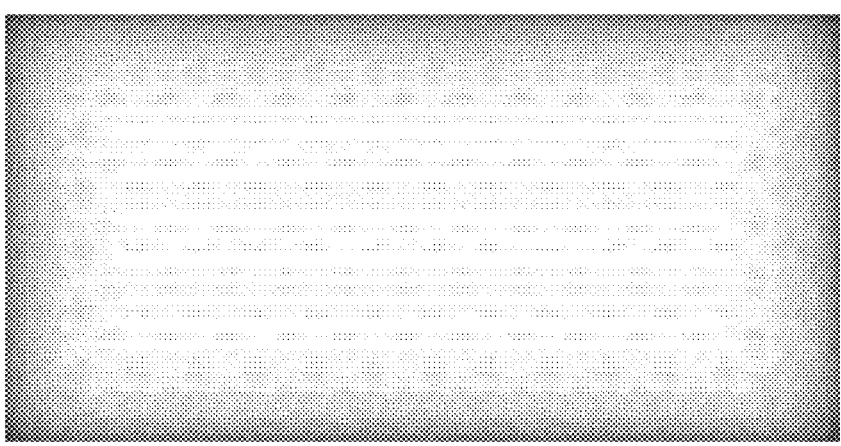
FIG. 10 is a view illustrating a result of an experiment when a pitch ratio between a plurality of light sources in the light source board of the display apparatus is out of a range of an embodiment of the present disclosure.
Figure 11:
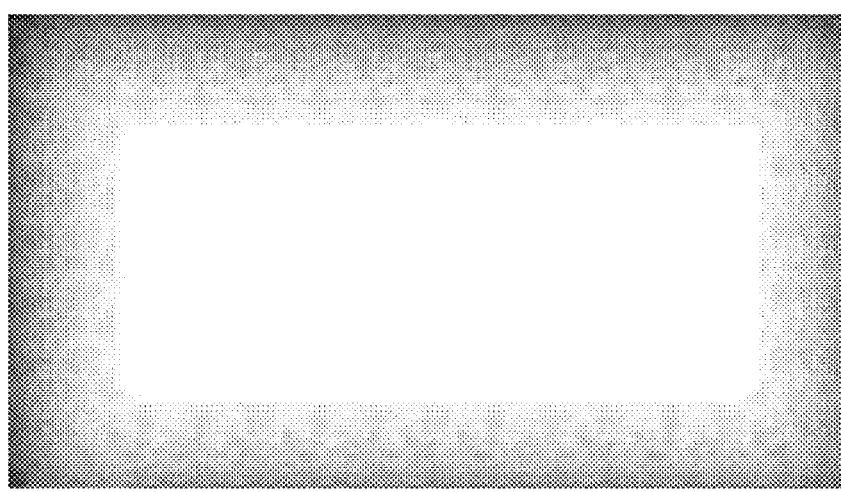
FIG. 11 is a view illustrating a result of an experiment when the pitch ratio between the plurality of light sources in the light source board of the display apparatus is within the range of an embodiment of the present disclosure.

FIG. 10 is a view illustrating a result of an experiment when a pitch ratio between a plurality of light sources in the light source board of the display apparatus is out of a range of an embodiment of the present disclosure. FIG. 11 is a view illustrating a result of an experiment when the pitch ratio between the plurality of light sources in the light source board of the display apparatus is within the range of an embodiment of the present disclosure.

Referring to FIG. 10, as for the first light source LS1, the second light source LS2, and the third light source LS3 among the plurality of light sources 1100 included in the light source module 1000 of the display apparatus 1 (refer to FIG. 9), the ratio of the distance d2 between the first light source LS1 and the third light source LS3 to the distance d1 between the first light source LS1 and the second light source LS2 may be provided as the range that is less than 9/10 or greater than 10/9.

Referring to FIG. 11, as for the first light source LS1, the second light source LS2, and the third light source LS3 among the plurality of light sources 1100 included in the light source module 1000 of the display apparatus 1 (refer to FIG. 9), the ratio of the distance d2 between the first light source LS1 and the third light source LS3 to the distance d1 between the first light source LS1 and the second light source LS2 may be provided as the range that is greater than or equal to 9/10 but less than or equal to 10/9.

The relationship among the first light source LS1, the second light source LS2, and the third light source LS3 corresponds to the relationship shown in FIG. 9.

Referring to FIGS. 10 and 11, when the ratio of the distance d2 between the first light source LS1 and the third light source LS3 to the distance d1 between the first light source LS1 and the second light source LS2 satisfies the range that is greater than or equal to 9/10 but less than or equal to 10/9, it can be seen that the luminance of the display apparatus 1 is viewed uniformly (refer to FIG. 11). However, when the range is out of the range, it can be seen that the luminance uniformity of the display apparatus 1 is reduced (refer to FIG. 10).

When the ratio of the distance d2 between the first light source LS1 and the third light source LS3 to the distance d1 between the first light source LS1 and the second light source LS2 is out of the range that is greater than or equal to 9/10 but less than or equal to 10/9, as illustrated in FIG. 10, the number of light sources 1100 required to improve the luminance uniformity of the display apparatus 1 may be increased, thereby increasing the manufacturing cost of the product in a comparative embodiment. Further, as the number of required light sources 1100 increases in a comparative embodiment, it is required to increase an area of the light source board 1200 for mounting the light sources 1100, thereby further increasing the manufacturing cost of the product.

However, in an embodiment of the present disclosure, when the ratio of the distance d2 between the first light source LS1 and the third light source LS3 to the distance d1 between the first light source LS1 and the second light source LS2 satisfies the range that is greater than or equal to 9/10 but less than or equal to 10/9, it is possible to provide a screen with the uniform brightness as shown in FIG. 11 while reducing the required number of light sources 1100 and the area of the light source board 1200.

In addition, while providing a screen with uniform brightness, the number of light sources 1100 and the area of the light source board 1200 may be reduced, and thus it is possible to design the distance in the first direction (Z direction) between the pair of board bars 1220 adjacent to each other to be greater than the width in the first direction (Z direction) of one board bar 1220. Further, it is possible to manufacture the plurality of light source boards 1200A and 1200B from the one board material 1200M (refer to FIGS. 16 to 19). Accordingly, it is possible to prevent waste of materials and further reduce the manufacturing cost of the product.

Figure 12:
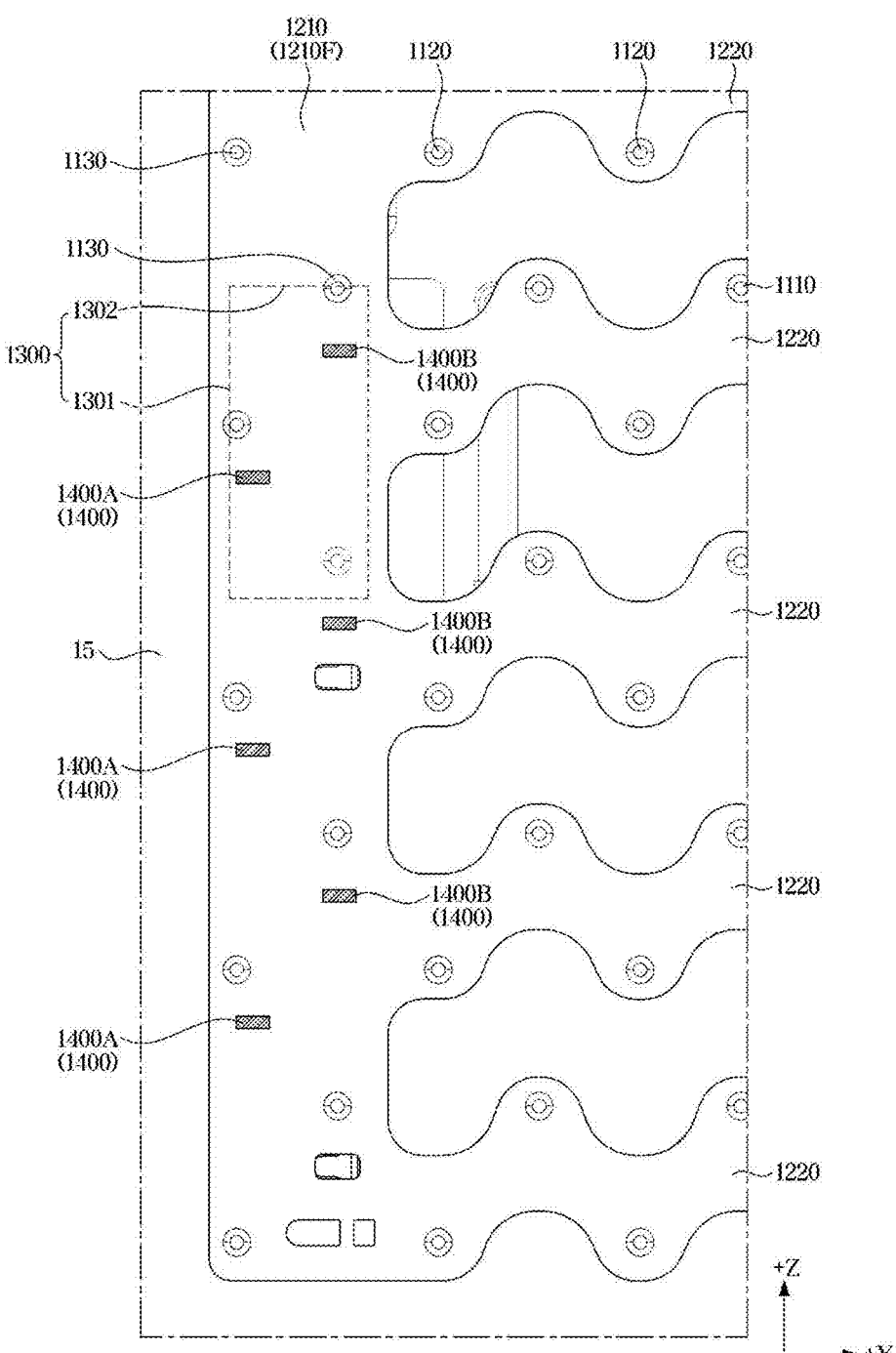
FIG. 12 is an enlarged view of a portion of a light source module of the display apparatus according to an embodiment of the present disclosure.
Figure 13:
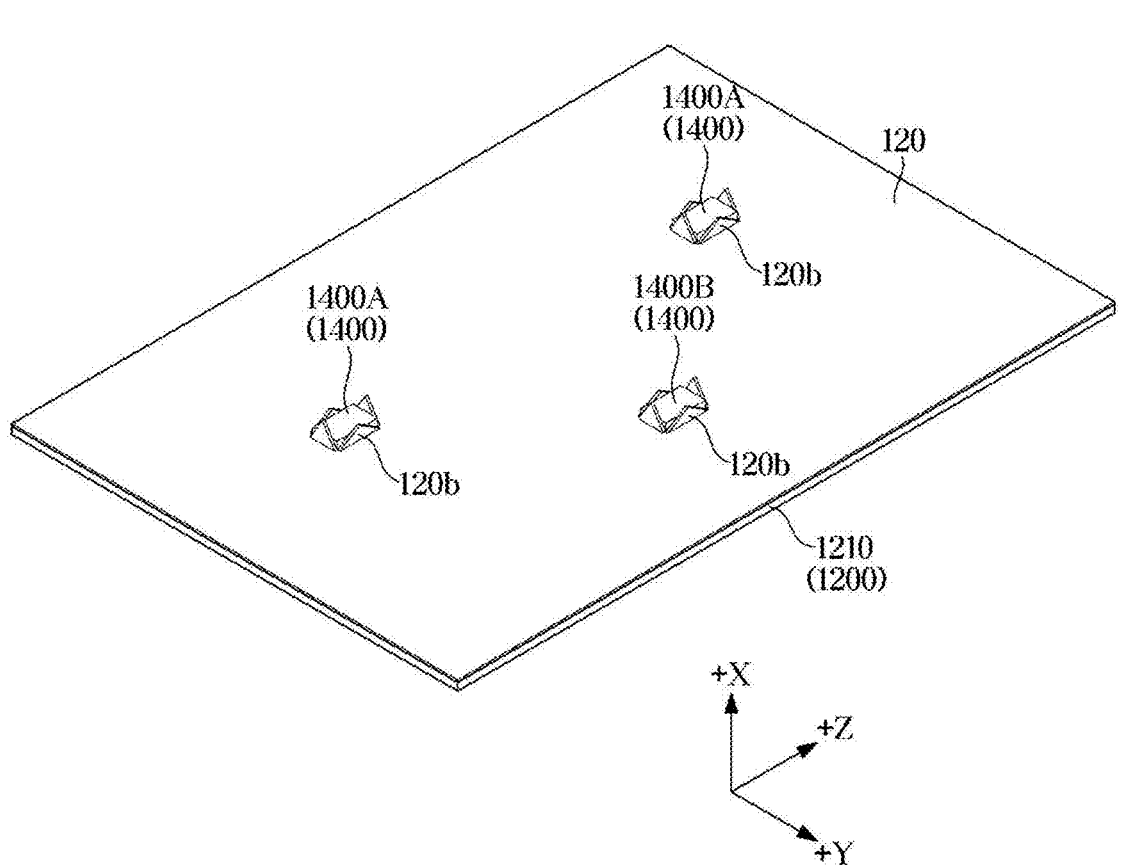
FIG. 13 is a view illustrating a state in which the light source board, on which a driving element is mounted, and a reflective sheet are coupled in the display apparatus according to an embodiment of the present disclosure.

FIG. 12 is an enlarged view of a portion of a light source module of the display apparatus according to an embodiment of the present disclosure. FIG. 13 is a view illustrating a state in which the light source board, on which a driving element is mounted, and a reflective sheet are coupled in the display apparatus according to an embodiment of the present disclosure.

Referring to FIGS. 12 and 13, the display apparatus 1 according to an embodiment of the present disclosure may include the board body 1210 connected to the plurality of board bars 1220 as described above.

As described above, the board body 1210 may extend in the first direction (Z direction).

As described above, some light sources among the plurality of light sources 1100 may be mounted on the board body 1210. Hereinafter for convenience, the light source mounted on the board body 1210 is referred to as a body light source 1130.

For example, a plurality of body light sources 1130 may be mounted on the board body 1210. For example, the plurality of body light sources 1130 may be arranged to be spaced apart from each other at equal intervals.

Some of the plurality of body light sources 1130 may be arranged in parallel with the plurality of light sources (e.g., first side light sources 1110) mounted on the plurality of first protrusions 1222*a* provided on one board bar 1220 of the plurality of board bars 1220, with respect to the second direction (Y direction). At this time, the body light source 1130 and the first side light sources 1110 may be arranged at equal intervals along the second direction (Y direction).

The others of the plurality of body light sources 1130 may be arranged in parallel with the plurality of light sources (e.g., second side light sources 1120) mounted on the plurality of second protrusions 1222*b* provided on one board bar 1220 of the plurality of board bars 1220, with respect to the second direction (Y direction). At this time, the body light source 1130 and the second side light sources 1120 may be arranged at equal intervals along the second direction (Y direction).

With this structure, the luminance uniformity may be improved in the overall region of the screen including the region corresponding to the position of the plurality of board bars 1220 as well as the region corresponding to the position of the board body 1210, on the screen provided by the display apparatus 1.

As described above, the connector 1300 may be mounted on the rear surface of the board body 1210. The rear surface of the board body 1210 refers to one surface of the board body 1210 facing the bottom chassis 15.

For example, the connector 1300 may be formed to include a long side 1301 and a short side 1302. For example, the long side 1301 and the short side 1302 of the connector

1300 may be arranged to be perpendicular to each other, but embodiments of the present disclosure are not limited thereto.

At this time, the long side 1301 of the connector 1300 may be parallel to the first direction (Z direction). That is, the connector 1300 may be arranged to allow the long side 1301 to be parallel to the first direction (Z direction). In other words, the connector 1300 may be arranged in such a way that a length thereof in the first direction (Z direction) is greater than a length thereof in the second direction (Y direction) and the connector 1300 is elongated in the first direction (Z direction). The connector 1300 may be arranged to allow the long side 1301 to be parallel to a longitudinal direction of the board body 1210 corresponding to the first direction (Z direction). The connector 1300 may be arranged to allow the long side 1301 to be approximately perpendicular to the second direction (Y direction), which is the direction in which each board bar 1220 extends. The connector 1300 may be arranged to allow the long side 1301 to be parallel to the first direction (Z direction), which is the direction in which the plurality of board bars 1220 is arranged.

Unlike FIG. 12, in a comparative embodiment, when it is assumed that the short side 1302 of the connector 1300 is parallel to the first direction (Z direction), the long side 1301 of the connector 1300 may be arranged to be parallel to the second direction (Y direction), and thus the board body 1210, on which the connector 1300 is mounted, may be required to be longer in the second direction (Y direction) in comparison with the case shown in FIG. 12. In this case, the amount of material required to manufacture the board body 1210 may increase, and the manufacturing cost of the product of a comparative embodiment may increase.

However, as shown in FIG. 12, as the long side 1301 of the connector 1300 is parallel to the first direction (Z direction), the amount of material required to manufacture the board body 1210 may be reduced, and the manufacturing cost of the product may be reduced.

For example, a wire connected to the control assembly 50 and/or the power assembly 60 (or a separate printed circuit board assembly directly connected thereto) may be provided to be electrically connected to the connector 1300 through a terminal provided on the long side 1301 of the connector 1300. Further, the power supply line 1230 of the light source board 1200 may be electrically connected to the connector 1300 through the terminal provided on the long side 1301 of the connector 1300.

The display apparatus 1 may include a plurality of driving elements 1400 mounted on the light source board 1200. The plurality of driving elements 1400 may be configured to control at least some of the light sources 1100 among the plurality of light sources 1100 mounted on the same light source board 1200.

The plurality of driving elements 1400 may be mounted on the light source board 1200 and electrically connected to the power supply line 1230. The plurality of driving elements 1400 may be electrically connected to the control assembly 50 and/or the power assembly 60 through the power supply line 1230 and the connector 1300.

For example, the plurality of light sources 1100 may be divided into a plurality of dimming blocks including at least one light source 1100, and the plurality of driving elements 1400 may output a dimming signal to control the plurality of dimming blocks.

For example, the plurality of driving elements 1400 may be implemented as a pixel integrated circuit (IC) or an active matrix integrated circuit (AM IC).

For example, as shown in FIG. 12, the plurality of driving elements 1400 may be mounted on a front surface 1210F of the board body 1210. The "front surface 1210F" of the board body 1210 refers to one surface of the board body 1210 facing the display panel 20.

At this time, as described above, the reflective sheet 120 may be attached to the front surface of the board body 1210. Accordingly, as shown in FIG. 13, in the reflective sheet 120, a driving element penetrating portion 120b may be formed in a region corresponding to the position of the plurality of driving elements 1400. Each of the plurality of driving elements 1400 may protrude toward the front side of the reflective sheet 120 by penetrating the corresponding driving element penetrating portion 120b.

At this case, the reflectivity of the reflective sheet 120 may decrease at the locations of the plurality of driving elements 1400 and the corresponding driving element penetrating portions 120b in a comparative embodiment. Accordingly, the luminance uniformity of the display apparatus 1 of a comparative embodiment may be reduced.

To relieve the difficulty, the plurality of driving elements 1400 may be arranged at different positions in the first direction (Z direction) on the front surface 1210F of the board body 1210, and among the plurality of driving elements 1400, some of the driving elements 1400 may be arranged in such a way that positions thereof are different from positions of others of the driving elements 1400 with respect to the second direction (Y direction).

Particularly, as shown in FIG. 12, the plurality of driving elements 1400 may include a first column driving element 1400A and a second column driving element 1400B.

The first column driving element 1400A may be arranged along the first direction (Z direction). Particularly, driving elements 1400A included in the first column driving element 1400A may be arranged to be spaced apart from each other along the first direction (Z direction).

Further, the second column driving element 1400B may be arranged along the first direction (Z direction). Particularly, driving elements 1400B included in the second column driving element 1400B may be arranged to be spaced apart from each other along the first direction (Z direction).

The first column driving element 1400A and the second column driving element 1400B may be arranged to be spaced apart from each other. Particularly, each driving element 1400A included in the first column driving element 1400A and each driving element 1400B included in the second column driving element 1400B may be arranged to allow positions thereof in the second direction (Y direction) to be spaced apart from each other. That is, the plurality of driving elements 1400A may be arranged in a zigzag pattern on the front surface 1210F of the board body 1210.

With this structure, the decrease in luminance caused by the driving element 1400 may be prevented from being concentrated in a specific region, and the luminance uniformity of the display apparatus 1 may be improved.

Figure 14:
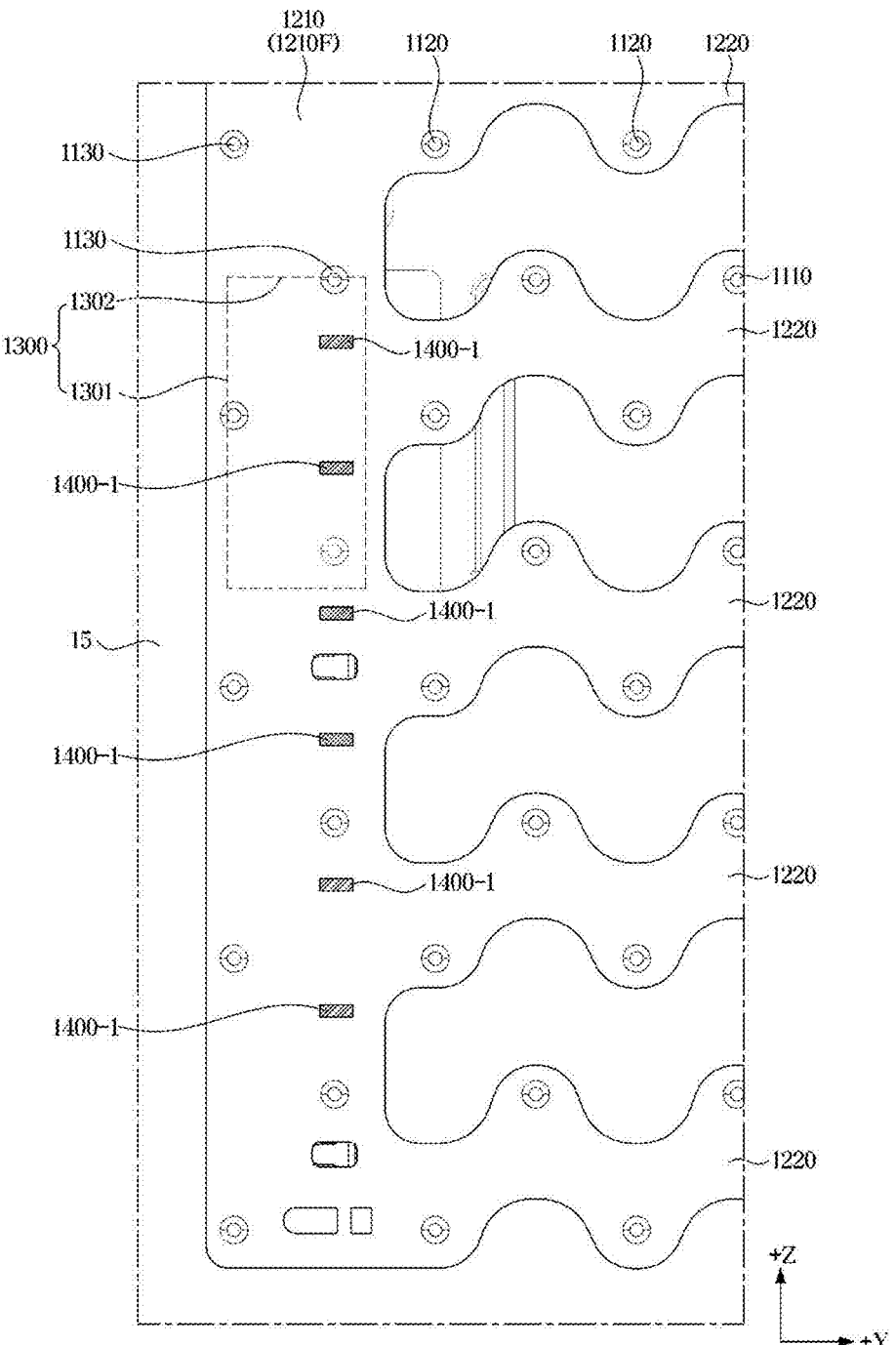
FIG. 14 is an enlarged view of a portion of a light source module of a display apparatus according to an embodiment of the present disclosure.

FIG. 14 is an enlarged view of a portion of a light source module of a display apparatus according to an embodiment of the present disclosure.

In describing the display apparatus 1 according to an embodiment of the present disclosure with reference to FIG. 14, the same reference numerals may be given to components corresponding to the components of the embodiment described with reference to FIGS. 1 to 13 and a repeated description thereof may be omitted.

Referring to FIG. 14, the display apparatus 1 according to an embodiment of the present disclosure may include a plurality of driving elements 1400-1. Each of the plurality of driving elements 1400-1 according to the embodiment of FIG. 14 may include a structure corresponding to each of the plurality of driving elements 1400 according to the embodiment of FIGS. 12 and 13.

The plurality of driving elements 1400-1 may be mounted on the front surface 1210F of the board body 1210. At this time, as shown in FIG. 14, the plurality of driving elements 1400-1 may be arranged along one direction on the front surface 1210F of the board body 1210. For example, the plurality of driving elements 1400-1 may be arranged to be spaced apart from each other along the first direction (Z direction) on the front surface 1210F of the board body 1210.

Figure 15:
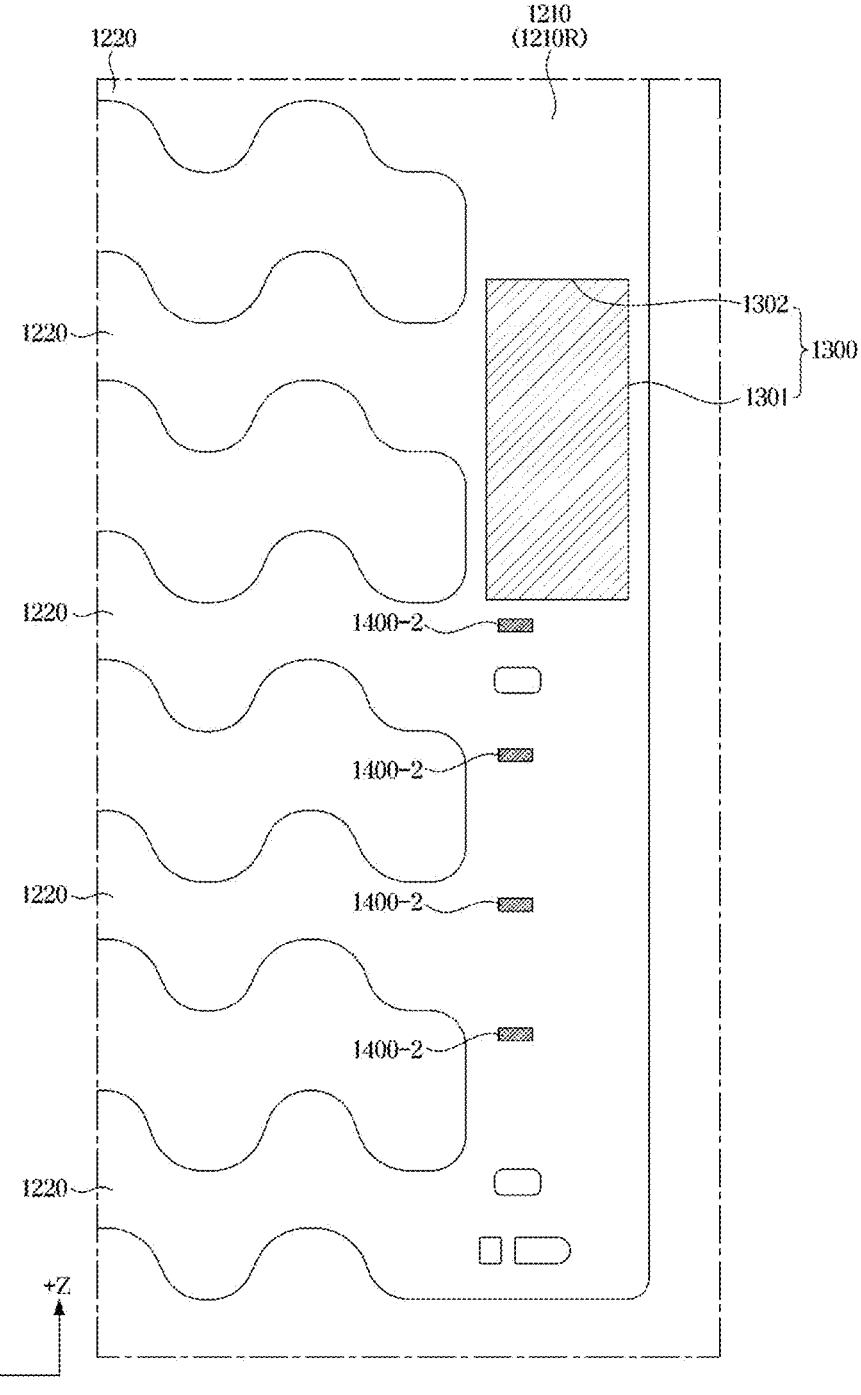
FIG. 15 is an enlarged view of a portion of a rear surface of a light source module of a display apparatus according to an embodiment of the present disclosure.

FIG. 15 is an enlarged view of a portion of a rear surface of a light source module of a display apparatus according to an embodiment of the present disclosure.

In describing the display apparatus 1 according to an embodiment of the present disclosure with reference to FIG. 15, the same reference numerals may be given to components corresponding to the components of the embodiment described with reference to FIGS. 1 to 13 and a repeated description thereof may be omitted.

Referring to FIG. 15, the display apparatus 1 according to an embodiment of the present disclosure may include a plurality of driving elements 1400-2. Each of the plurality of driving elements 1400-2 according to the embodiment of FIG. 15 may include a structure corresponding to each of the plurality of driving elements 1400 according to the embodiment of FIGS. 12 and 13.

The plurality of driving elements 1400-2 may be mounted on a rear surface 1210R of the board body 1210. The "rear surface 1210R" of the board body 1210 refers to one surface opposite to the front surface 1210F (refer to FIGS. 12 and 14) of the board body 1210 facing the display panel 20. In other words, the rear surface 1210R of the board body 1210 refers to one surface of the board body 1210 facing the bottom chassis 15.

With this structure, interference between the reflective sheet 120 and the plurality of driving elements 1400-2 may not occur, and the plurality of driving elements 1400-2 may not affect the luminance of light. Accordingly, it is possible to prevent the uneven luminance of the display apparatus 1.

Figure 16:
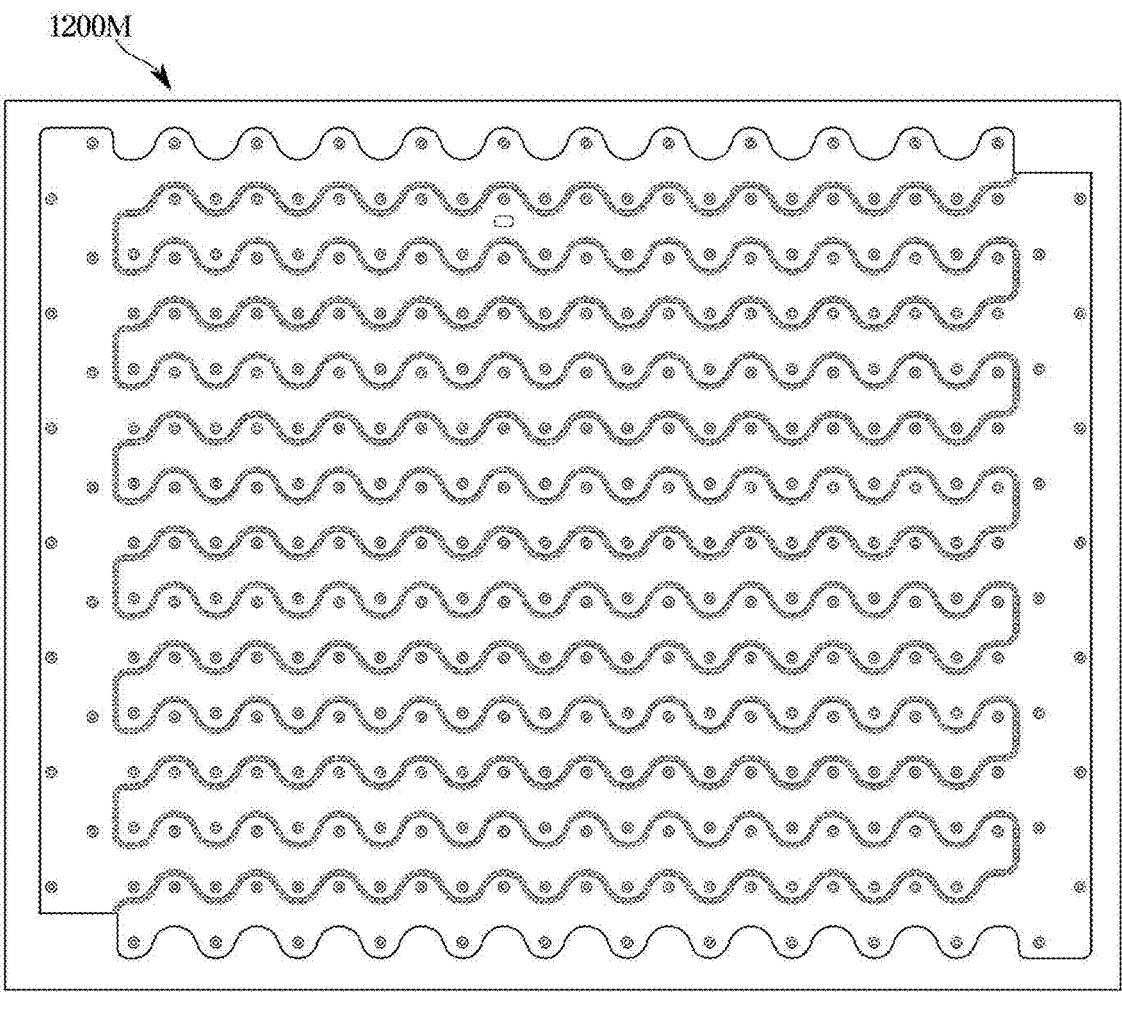
FIG. 16 is a view illustrating an operation for preparing a board material in a method of manufacturing the light source board used in the display apparatus according to an embodiment of the present disclosure.
Figure 17:
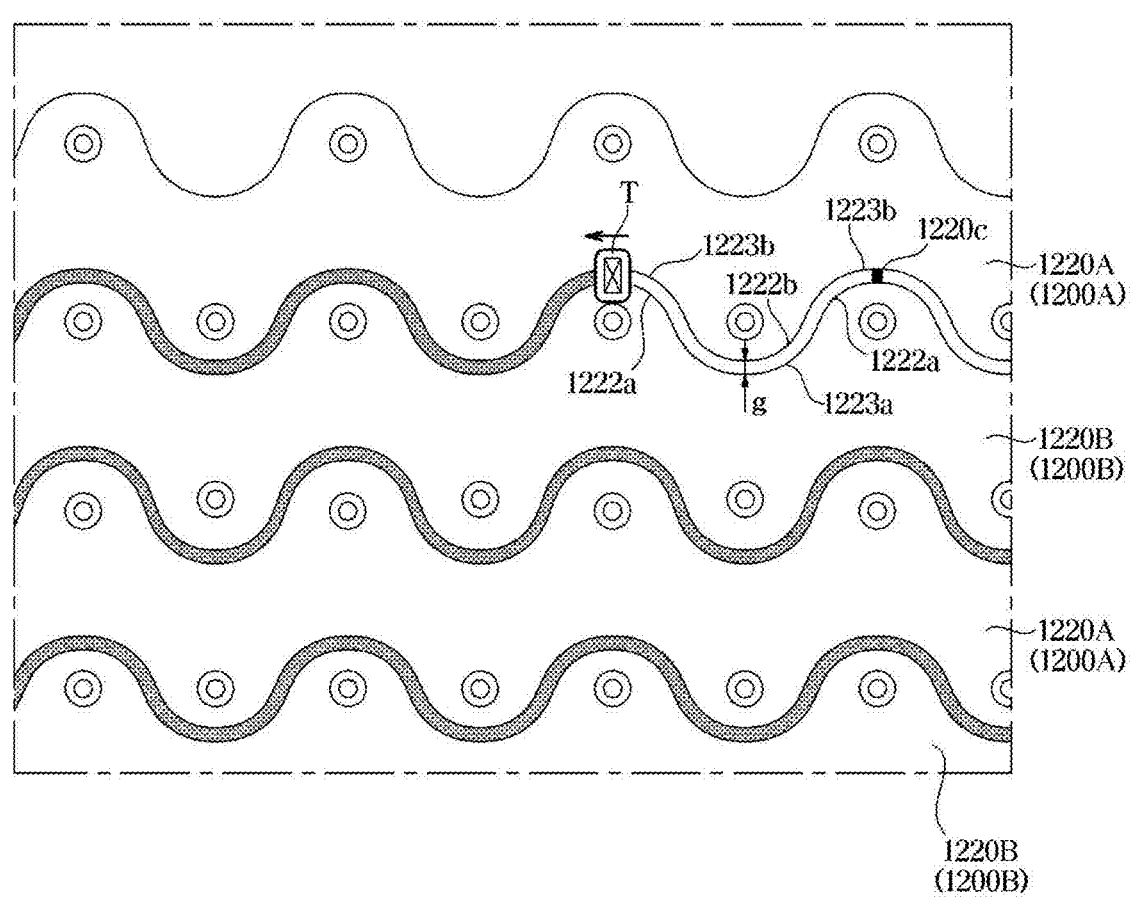
FIG. 17 is a view illustrating an operation for processing the light source board used in the display apparatus according to an embodiment of the present disclosure.
Figure 18:
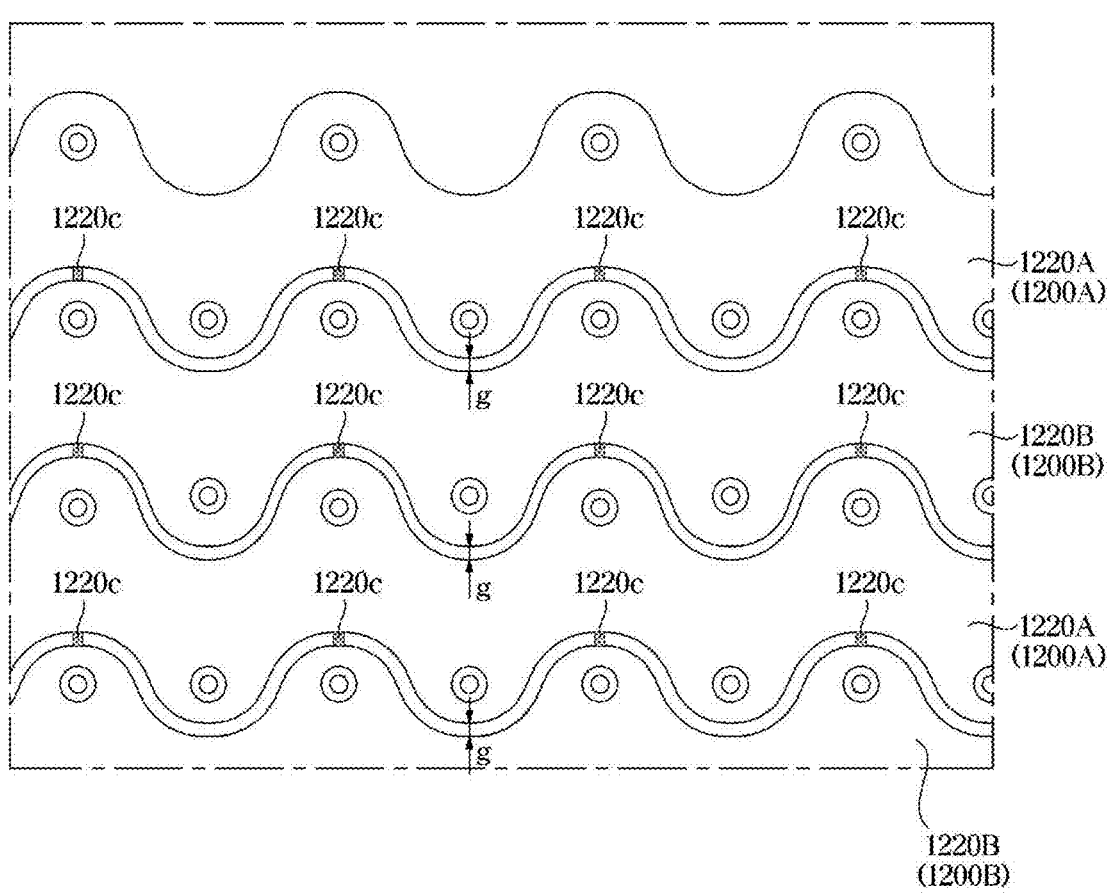
FIG. 18 is a view illustrating an operation before separating the pair of light source boards used in the display apparatus according to an embodiment of the present disclosure.
Figure 19:
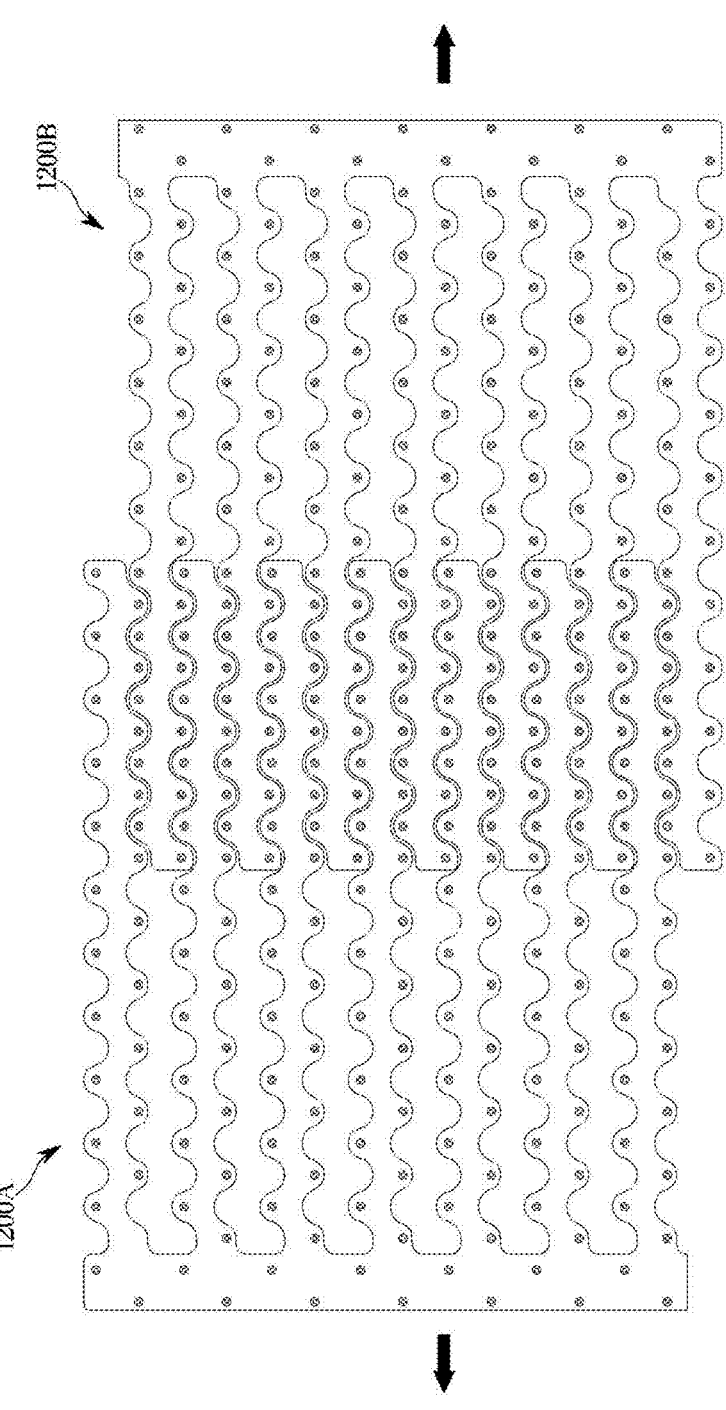
FIG. 19 is a view illustrating a state after separating the pair of light source boards used in the display apparatus according to an embodiment of the present disclosure.

FIG. 16 is a view illustrating an operation for preparing a board material in a method of manufacturing the light source board used in the display apparatus according to an embodiment of the present disclosure. FIG. 17 is a view illustrating an operation for processing the light source board used in the display apparatus according to an embodiment of the present disclosure. FIG. 18 is a view illustrating an operation before separating the pair of light source boards used in the display apparatus according to an embodiment of the present disclosure. FIG. 19 is a view illustrating a state after separating the pair of light source boards used in the display apparatus according to an embodiment of the present disclosure.

Referring to FIGS. 16 to 19, the light source board used in the display apparatus 1 according to an embodiment of the present disclosure may be manufactured by a method of manufacturing the plurality of light source boards 1200A and 1200B from the one board material 1200M.

Referring to FIG. 16, the one board material 1200M on which the plurality of light source boards 1200A and 1200B is designed may be prepared. The one board material 1200M may be provided in the shape of an integrated plate. Particularly, as shown in FIG. 16, the pair of light source boards 1200A and 1200B to be manufactured may be formed from the one board material 1200M.

For example, in the one board material 1200M, the pair of light source boards 1200A and 1200B may be turned over by 180 degrees. The pair of light source boards 1200A and 1200B may be configured to allow each board bar 1220 to overlap each other. One board bar of the board bars 1220, which is provided on the other light source board (e.g., light source board 1200B), is between the pair of board bars 1220 adjacent to each other among the board bars 1220 provided on one light source board (e.g., light source board 1200A) among the pair of light source boards 1200A and 1200B. In other words, the board bar 1220 provided on one of the pair of light source boards 1200A and 1200B and the board bar 1220 provided on the other of the pair of light source boards 1200A and 1200B may be alternately arranged.

Further, the pair of light source boards 1200A and 1200B may be configured to allow each board body 1210 to be positioned on opposite sides of each other.

Referring to FIG. 17, an operation, in which the pair of light source boards 1200A and 1200B are respectively separated, may be performed by a process of cutting the edge of the pair of light source boards 1200A and 1200B shown in the one board material 1200M.

Particularly, as shown in FIG. 17, a tool T penetrating the board material 1200M may move along the edge of the pair of light source boards 1200A and 1200B and perform a cutting process to separate the pair of light source boards 1200A and 1200B.

Various processing devices such as a router may be used as the tool T.

At this time, while the tool T moves along a boundary between the board bars 1220 of each of the pair of light source boards 1200A and 1200B, the tool T may separate the pair of light source boards 1200A and 1200B from each other. As shown in FIG. 17, as the tool T moves along the boundary between the board bars 1220, a gap g may be formed. The gap g may have a width that approximately corresponds to a thickness of the tool T.

When the gap g is formed by the tool T, the first protrusions 1222a and the second protrusions 1222b and the first recess portions 1223a and the second recess portions 1223b may be formed in the pair of board bars 1220A and 1220B adjacent to each other with the gap g interposed therebetween. As shown in FIG. 17, the protrusion 1222b, which is formed on one board bar 1220A, and the recess portion 1223a, which formed on the other board bar 1220B, may face to each other with respect to the width direction of the board bar 1220. Further, the recess portion 1223b, which is formed in one board bar 1220A, and the protrusion 1222a, which is formed in the other board bar 1220B, may face each other with respect to the width direction of the board bar 1220.

A difference in radius of curvature may occur between the first protrusions 1222a and the second protrusions 1222b and the first recess portions 1223a and the second recess portions 1223b that face each other. Particularly, the radius of curvature of the protruding portions (e.g., the first protrusion 1222a and the second protrusion 1222b) may be less than the radius of curvature of the recess portions (e.g., first recess portions 1223a and the second recess portions 1223b). The difference between the respective radius of curvature of the protruding portions (e.g., the first protrusion 1222a and the second protrusion 1222b) and the recess portions (e.g., first recess portions 1223a and the second recess portions 1223b) may substantially correspond to the thickness of the tool T or the thickness of the gap g.

When the radius of curvature of the first protrusions 1222a and the second protrusions 1222b is not less than the radius of curvature of the first recess portions 1223a and the second recess portions 1223b, it may be required to perform additional cutting processes to match the designed curvature even after the tool T performs the cutting process by passing the boundary between the pair of board bars 1220A and 1220B once. However, in an embodiment of the present disclosure, the radius of curvature of the protruding portions (e.g., the first protrusion 1222a and the second protrusion 1222b) is designed to be less than the radius of curvature of the first recess portions 1223a and the second recess portions 1223b, and thus even when the tool T performs the cutting process by passing the boundary between the pair of board bars 1220A and 1220B once, the first protrusions 1222a and the second protrusions 1222b and the first recess portions 1223a and the second recess portions 1223b may be formed to have the designed curvature due to the thickness of the tool T.

The thickness of the tool T used in this operation may be appropriately set in consideration of the difference in the respective radius of curvature of the protruding portions (e.g., the first protrusion 1222a and the second protrusion 1222b) and the recess portions (e.g., first recess portions 1223a and the second recess portions 1223b).

The process of separating the board bars 1220A and 1220B included in the pair of light source boards 1200A and 1200B from the one board material 1200M may be further simplified through this method. In addition, it is possible to reduce a portion that is unnecessarily removed in the process of manufacturing the plurality of light source boards 1200A and 1200B from the one board material 1200M, and it is possible to prevent waste of materials so as to reduce costs. Accordingly, the manufacturing cost of the product may be reduced.

Meanwhile, in an embodiment, the pair of light source boards 1200A and 1200B may be completely separated from each other simply by moving the tool T along the edge of the pair of light source boards 1200A and 1200B, but as shown in FIGS. 17 and 18, the tool T may proceed or end the process while leaving a connecting rib 1220c at the boundary between the board bars 1220 as shown in FIG. 18. The connecting rib 1220c may be provided to connect the pair of light source boards 1200A and 1200B to each other. Particularly, the connecting rib 1220c may be provided to connect the board bars 1220A and 1220B of the pair of light source boards 1200A and 1200B, respectively.

As illustrated in FIG. 18, as the board bars 1220A and 1220B of each of the pair of light source boards 1200A and 1200B are connected by the connecting rib 1220c, it is possible to more easily manage the light source boards 1200A and 1200B when storing or transporting the light source boards 1200A and 1200B.

For example, the connecting rib 1220c may be provided to connect the protruding portions (e.g., the first protrusion 1222a and the second protrusion 1222b) to the recess portions (e.g., first recess portions 1223a and the second recess portions 1223b), which face each other, in the board bars 1220A and 1220B adjacent to each other. For example, the connecting rib 1220c may connect an outermost edge of the protruding portions (e.g., the first protrusion 1222a and the second protrusion 1222b) with respect to the direction protruding from the central extending portion 1221 of the board bar 1220, and an edge of a portion of the first recess portions 1223a and the second recess portions 1223b that is closest to the central extending portion 1221 with respect to the width direction.

The connecting rib 1220c may be provided not to have great rigidity. Accordingly, a manufacturer can easily remove the connecting rib 1220c when necessary, thereby removing the pair of light source boards 1200A and 1200B connected by the connecting rib 1220c.

At this case, a cut surface that is formed when the connecting rib 1220c is removed may be formed at least some of the first protrusions 1222a and the second protrusions 1222b and the first recess portions 1223a and the second recess portions 1223b provided on the board bars 1220A and 1220B provided on the pair of light source boards 1200A and 1200B. The position at which the cut surfaces are formed may vary according to the position of the connecting rib 1220c. For example, the cut surfaces may be formed in the outermost edge of the protruding portions (e.g., the first protrusion 1222a and the second protrusion 1222b) with respect to the direction protruding from the central extending portion 1221 of the board bar 1220, and formed in the edge of a portion of the recess portions (e.g., first recess portions 1223a and the second recess portions 1223b) that is closest to the central extending portion 1221 with respect to the width direction.

When the connecting rib 1220c is removed as mentioned above, the pair of light source boards 1200A and 1200B may be completely separated from each other, as shown in FIG. 19.

Through the above-mentioned process, the plurality of light source boards 1200A and 1200B may be manufactured from the one board material 1200M, and it is possible to prevent material waste and to reduce manufacturing costs.

The method of manufacturing the light source board described with reference to FIGS. 16 to 19 is merely an example of the method of manufacturing the light source board included in the display apparatus according to an embodiment of the present disclosure, and embodiments of the present disclosure are not limited thereto.

Figure 20:
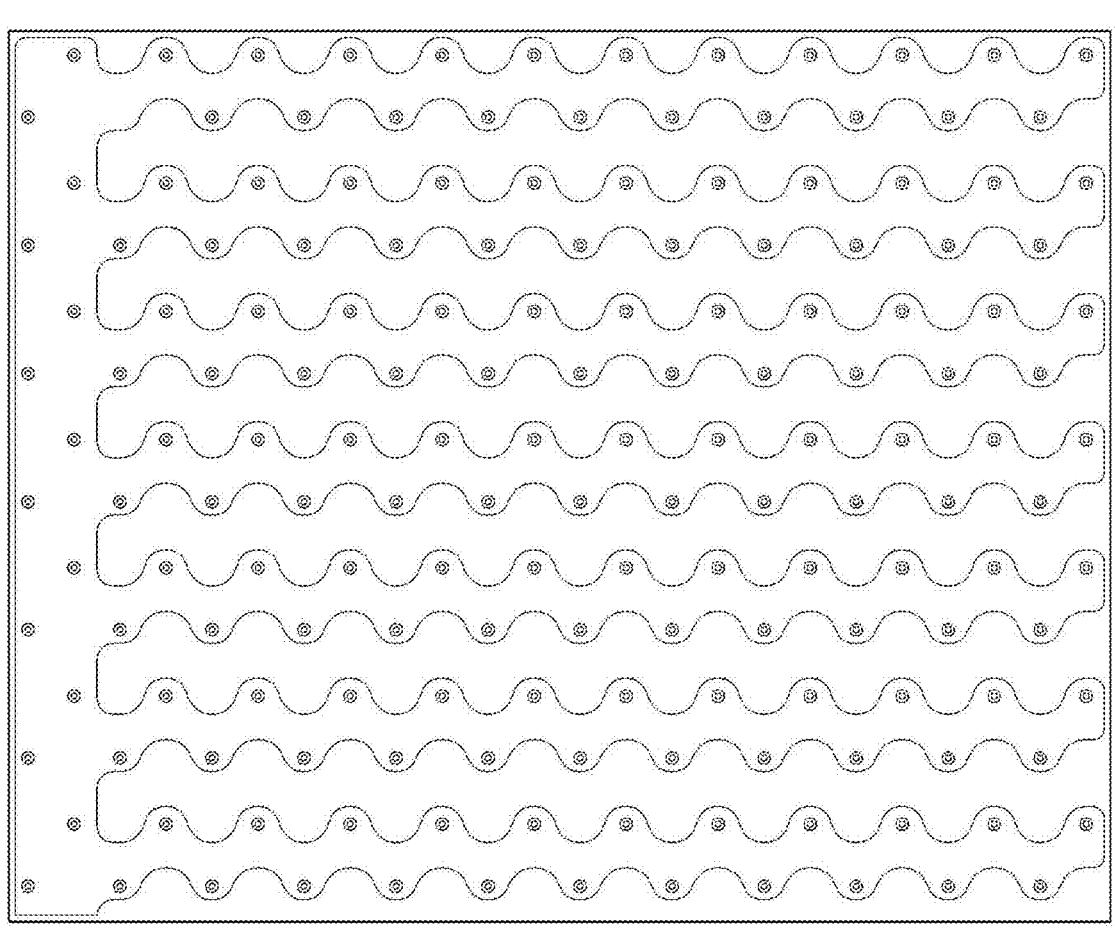
FIG. 20 is a view illustrating an operation for preparing a board material in a method of manufacturing the light source board used in the display apparatus according to an embodiment of the present disclosure.

FIG. 20 is a view illustrating an operation for preparing a board material in a method of manufacturing the light source board used in the display apparatus according to an embodiment of the present disclosure.

Referring to FIG. 20, the light source board used in the display apparatus 1 according to an embodiment of the present disclosure may be manufactured by a method of manufacturing only one light source board from one board material 1200M-1.

As illustrated in FIG. 20, only one light source board may be designed and obtained in one board material 1200M-1. Thereafter, the one light source board may be separated from the board material 1200M-1 through an operation of cutting the edge of the light source board in the one board material 1200M-1 using a tool, and accordingly, a single light source board may be manufactured.

The method of manufacturing the light source board described with reference to FIG. 20 is merely an example of the method of manufacturing the light source board included in the display apparatus according to an embodiment of the present disclosure, and embodiments of the present disclosure are not limited thereto.

Figure 21:
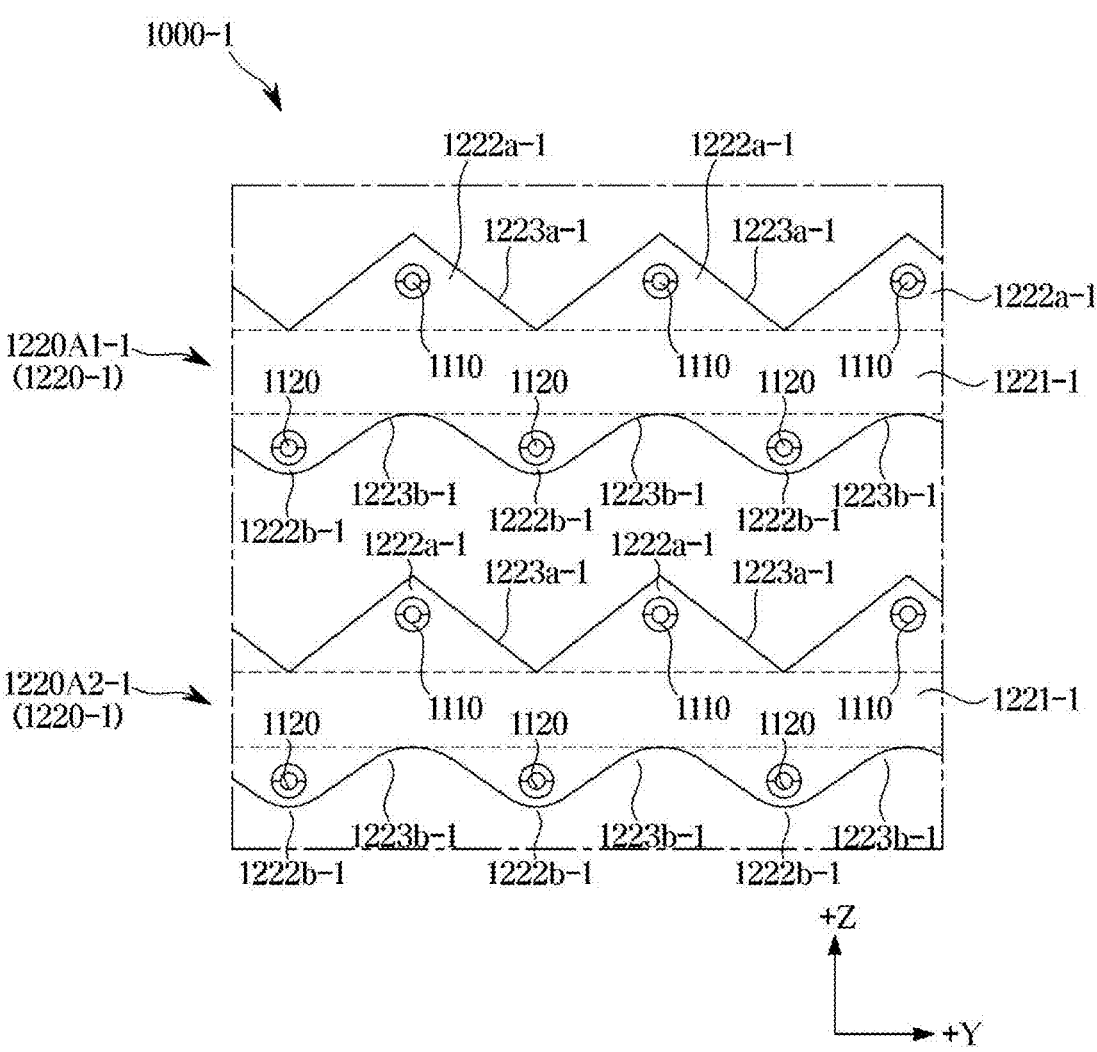
FIG. 21 is an enlarged view of a portion of a light source board of a display apparatus according to an embodiment of the present disclosure.

FIG. 21 is an enlarged view of a portion of a light source board of a display apparatus according to an embodiment of the present disclosure.

In describing the display apparatus 1 according to an embodiment of the present disclosure with reference to FIG. 21, the same reference numerals may be given to components corresponding to the components of the embodiment described with reference to FIGS. 1 to 20, and a repeated description thereof may be omitted.

Referring to FIG. 21, a light source module 1000-1 of the display apparatus 1 according to an embodiment of the present disclosure may include a plurality of board bars 1220-1.

For example, the light source module 1000-1 may include a board body to which the plurality of board bars 1220-1 is respectively connected, and a repeated description thereof may be omitted.

Each of the plurality of board bars 1220-1 may have a width in the first direction (Z direction) and may be elongated in the second direction (Y direction).

The plurality of board bars 1220-1 may be spaced apart from each other in the first direction (Z direction). For example, the plurality of board bars 1220-1 may be arranged to allow a distance, at which the plurality of board bars 1220-1 is spaced apart from each other in the first direction (Z direction), to be equal.

For example, each of the plurality of board bars 1220-1 may be formed to have shapes that correspond to each other. For example, the widths of the plurality of board bars 1220-1 in the first direction (Z direction) may correspond to each other. For example, the lengths of the plurality of board bars 1220-1 extending in the second direction (Y direction) may correspond to each other. For example, the plurality of board bars 1220-1 may be formed in sizes corresponding to each other.

For example, a distance in the first direction (Z direction) between a pair of board bars 1220A1-1 and 1220A2-1 adjacent to each other among the plurality of board bars 1220-1 may be greater than a width of one board bar 1220-1 with respect to the first direction (Z direction).

Each of the plurality of board bars 1220-1 may include a central extending portion 1221-1. The central extending portion 1221-1 may extend in the second direction (Y direction). The central extending portion 1221-1 may be provided to pass through the center of each of the plurality of board bars 1220-1 in the second direction (Y direction).

Each of the plurality of board bars 1220-1 may include a plurality of first protrusions 1222a-1 protruding from the central extending portion 1221-1. Each of the plurality of first protrusions 1222a-1 may protrude from one side of the central extending portion 1221-1 with respect to the first direction (Z direction). Each of the plurality of first protrusions 1222a-1 may protrude from the central extending portion 1221-1 to the first direction (Z direction).

The plurality of first protrusions 1222a-1 may be arranged in the second direction (Y direction). For example, the plurality of first protrusions 1222a-1 may be arranged at equal intervals along the second direction (Y direction).

For example, the plurality of first protrusions 1222a-1 may be formed to have shapes that correspond to each other. For example, the lengths of each of the plurality of first protrusions 1222a-1 protruding from the central extending portion 1221-1 to the first direction (Z direction) may correspond to each other.

A first light source 1110 among the plurality of light sources 1100 mounted on the board bar 1220-1 may be mounted on the plurality of first protrusions 1222a-1.

The plurality of first side light sources 1110 may be arranged along the second direction (Y direction). For example, the plurality of first side light sources 1110 may be arranged at equal intervals along the second direction (Y direction).

Each of the plurality of board bars 1220-1 may include a plurality of second protrusions 1222b-1 protruding from the other side of the central extending portion 1221-1. Each of the plurality of second protrusions 1222b-1 may protrude from the other side of the central extending portion 1221-1 with respect to the first direction (Z direction). Each of the plurality of second protrusions 1222b-1 may protrude from the central extending portion 1221-1 to the first direction (Z direction).

The plurality of second protrusions 1222b-1 may be arranged in the second direction (Y direction). For example, the plurality of second protrusions 1222b-1 may be arranged at equal intervals along the second direction (Y direction).

For example, the plurality of second protrusions 1222b-1 may be formed to have shapes that correspond to each other. For example, the lengths of each of the plurality of second protrusions 1222b-1 protruding from the central extending portion 1221-1 to the first direction (Z direction) may correspond to each other.

A second light source 1120 among the plurality of light sources 1100 mounted on the board bar 1220-1 may be mounted on the plurality of second protrusions 1222b-1.

The plurality of second side light sources 1120 may be arranged along the second direction (Y direction). For example, the plurality of second side light sources 1120 may be arranged at equal intervals along the second direction (Y direction).

With the above-mentioned structure, a distance between the light sources 1100 adjacent to each other in the pair of board bars 1220A1-1 and 1220A2-1 adjacent to each other among the plurality of board bars 1220-1 may be reduced, and the luminance and the luminance uniformity of the display apparatus 1 may be improved.

Each of the plurality of board bars 1220-1 may include a plurality of first recess portions 1223a-1. Each of the plurality of first recess portions 1223a-1 may be formed between a pair of first protrusions 1222a-1 adjacent to each other among the plurality of first protrusions 1222a-1.

The plurality of first recess portions 1223a-1 may be provided on one side of the central extending portion 1221-1 with respect to the first direction (Z direction).

The plurality of first recess portions 1223a-1 may be formed to have a shape that is concavely recessed in the inner direction of the central extending portion 1221-1 in comparison with the plurality of first protrusion portions 1222a-1.

The plurality of first recess portions 1223a-1 may be arranged along the second direction (Y direction). For example, the plurality of first recess portions 1223a-1 may be arranged at equal intervals along the second direction (Y direction).

For example, the plurality of first recess portions 1223a-1 may be formed to have shapes that correspond to each other.

Each of the plurality of board bars 1220-1 may include a plurality of second recess portions 1223b-1. Each of the second recess portions 1223b-1 may be formed between a pair of second protrusions 1222b-1 adjacent to each other among the plurality of second protrusions 1222b-1.

The plurality of second recess portions 1223b-1 may be provided on the other side of the central extending portion 1221-1 with respect to the first direction (Z direction).

The plurality of second recess portions 1223b-1 may formed to have a shape that is concavely recessed in the inner direction of the central extending portion 1221-1 in comparison with the plurality of second protrusions 1222b-1.

The plurality of second recess portions 1223b-1 may be arranged along the second direction (Y direction). For example, the plurality of second recess portions 1223b-1 may be arranged at equal intervals along the second direction (Y direction).

For example, the plurality of second recess portions 1223b-1 may be formed to have shapes that correspond to each other.

For example, each of the plurality of first protrusions 1222a-1 may be arranged in parallel with one second recess portion 1223b-1 that is closest among the plurality of second recess portions 1223b-1, with respect to the first direction (Z direction). That is, the plurality of first protrusions 1222a-1 and the plurality of second recess portions 1223b-1 may be arranged in parallel with each other with respect to the first direction (Z direction).

For example, each of the plurality of second protrusions 1222b-1 may be arranged in parallel with one first recess portion 1223a-1 that is closest among the plurality of first recess portions 1223a-1, with respect to the first direction (Z direction). That is, the plurality of second protrusions 1222b-1 and the plurality of first recess portions 1223a-1 may be arranged in parallel with each other with respect to the first direction (Z direction).

At this time, as shown in FIG. 21, the shape of the edge of each of the plurality of first recess portions 1223a-1 may be different from the shape of the edge of each of the plurality of second protrusions 1222b-1. In other words, the shape of the outer surface of each of the plurality of first recess portions 1223a-1 may be different from the shape of the outer surface of each of the plurality of second protrusions 1222b-1.

The shape of the edge of each the plurality of second recess portions 1223b-1 may be different from the shape of the edge of each of the plurality of first protrusions 1222a-1. In other words, the shape of the outer surface of each of the plurality of second recess portions 1223b-1 may be different from the shape of the outer surface of each of the plurality of first protrusions 1222a-1.

For example, the edge of each of the plurality of first protrusions 1222a-1 and the plurality of first recess portions 1223a-1 may be formed linearly. Further, the edge of each of the plurality of second protrusions 1222b-1 and the plurality of second recess portions 1223b-1 may be formed in a curved shape.

For example, the edge of each of the plurality of first protrusions 1222a-1 and the plurality of first recess portions 1223a-1 provided on one side of one board bar 1220A1-1 with respect to the +Z direction among the pair of board bars 1220A1-1 and 1220A2-1 adjacent to each other may have a shape corresponding to a shape of the edge of each of the plurality of first protrusions 1222a-1 and the plurality of first recess portions 1223a-1 provided on one side of the other board bar 1220A2-1 with respect to the +Z direction among the pair of board bars 1220A1-1 and 1220A2-1.

Further, the edge of each of the plurality of second protrusions 1222b-1 and the plurality of second recess portions 1223b-1 provided on one side of one board bar 1220A1-1 with respect to the −Z direction among the pair of board bars 1220A1-1 and 1220A2-1 adjacent to each other may have a shape corresponding to a shape of the edge of each of the plurality of second protrusions 1222b-1 and the plurality of second recess portions 1223b-1 provided on one side of the other board bar 1220A2-1 with respect to the −Z direction among the pair of board bars 1220A1-1 and 1220A2-1.

When manufacturing the plurality of light source boards including the board bar 1220-1 shown in FIG. 21 from one board material by using the method similar to the manufacturing method of the light source board described with reference to FIGS. 16 to 19, it is possible to easily separate the board bars 1220-1 adjacent to each other from the one board material.

Figure 22:
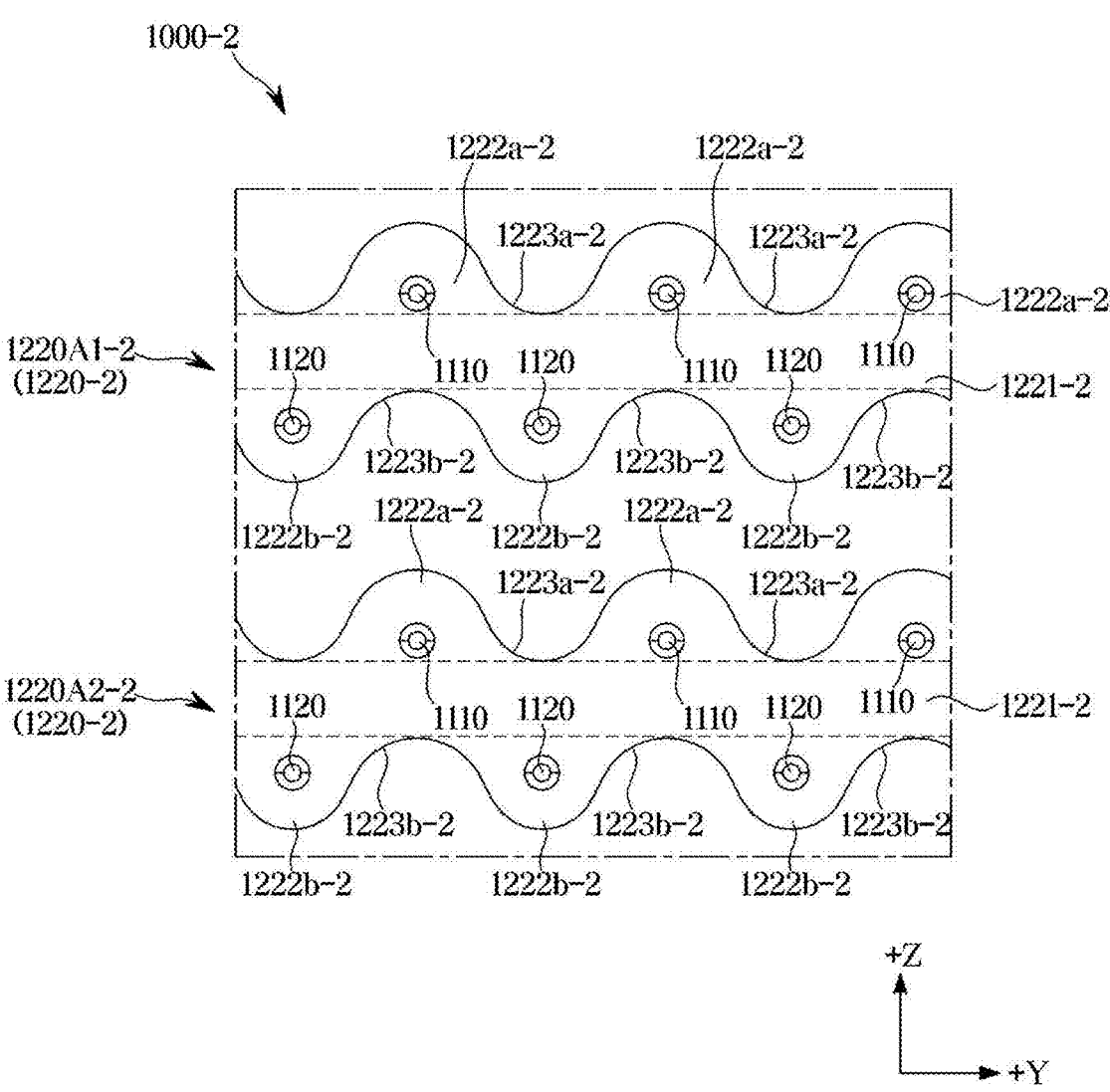
FIG. 22 is an enlarged view of a portion of a light source board of a display apparatus according to an embodiment of the present disclosure.

FIG. 22 is an enlarged view of a portion of a light source board of a display apparatus according to an embodiment of the present disclosure.

In describing the display apparatus 1 according to an embodiment of the present disclosure with reference to FIG. 22, the same reference numerals may be given to components corresponding to the components of the embodiment described with reference to FIGS. 1 to 20, and a repeated description thereof may be omitted.

Referring to FIG. 22, a light source module 1000-2 of the display apparatus 1 according to an embodiment of the present disclosure may include a plurality of board bars 1220-2.

For example, the light source module 1000-2 may include a board body to which the plurality of board bars 1220-2 is respectively connected, and a detailed description thereof will be omitted.

Each of the plurality of board bars 1220-2 may have a width in the first direction (Z direction) and may be elongated in the second direction (Y direction).

The plurality of board bars 1220-2 may be spaced apart from each other in the first direction (Z direction). For example, the plurality of board bars 1220-2 may be arranged to allow a distance, at which the plurality of board bars 1220-2 is spaced apart from each other in the first direction (Z direction), to be equal.

For example, each of the plurality of board bars 1220-2 may be formed to have shapes that correspond to each other. For example, the widths of the plurality of board bars 1220-2 in the first direction (Z direction) may correspond to each other. For example, the lengths of the plurality of board bars 1220-2 extending in the second direction (Y direction) may correspond to each other. For example, the plurality of board bars 1220-2 may be formed in sizes corresponding to each other.

For example, a distance in the first direction (Z direction) between a pair of board bars 1220A1-2 and 1220A2-2 adjacent to each other among the plurality of board bars 1220-2 may be greater than a width of one board bar 1220-2 with respect to the first direction (Z direction), but is not limited thereto.

Each of the plurality of board bars 1220-2 may include a central extending portion 1221-2. The central extending portion 1221-2 may extend in the second direction (Y direction). The central extending portion 1221-2 may be provided to pass through the center of each of the plurality of board bars 1220-2 in the second direction (Y direction).

Each of the plurality of board bars 1220-2 may include a plurality of first protrusions 1222a-2 protruding from the central extending portion 1221-2. Each of the plurality of first protrusions 1222a-2 may protrude from one side of the central extending portion 1221-2 with respect to the first direction (Z direction). Each of the plurality of first protrusions 1222a-2 may protrude from the central extending portion 1221-2 to the first direction (Z direction).

The plurality of first protrusions 1222a-2 may be arranged in the second direction (Y direction). For example, the plurality of first protrusions 1222a-2 may be arranged at equal intervals along the second direction (Y direction).

A first light source 1110 among the plurality of light sources 1100 mounted on the board bar 1220-2 may be mounted on the plurality of first protrusions 1222a-2.

The plurality of first side light sources 1110 may be arranged along the second direction (Y direction). For example, the plurality of first side light sources 1110 may be arranged at equal intervals along the second direction (Y direction).

Each of the plurality of board bars 1220-2 may include a plurality of second protrusions 1222b-2 protruding from the other side of the central extending portion 1221-2. Each of the plurality of second protrusions 1222b-2 may protrude from the other side of the central extending portion 1221-2 with respect to the first direction (Z direction). Each of the plurality of second protrusions 1222b-2 may protrude from the central extending portion 1221-2 to the first direction (Z direction).

The plurality of second protrusions 1222b-2 may be arranged in the second direction (Y direction). For example, the plurality of second protrusions 1222b-2 may be arranged at equal intervals along the second direction (Y direction).

A second light source 1120 among the plurality of light sources 1100 mounted on the board bar 1220-2 may be mounted on the plurality of second protrusions 1222b-2.

The plurality of second side light sources 1120 may be arranged along the second direction (Y direction). For example, the plurality of second side light sources 1120 may be arranged at equal intervals along the second direction (Y direction).

With the above-mentioned structure, a distance between the light sources 1100 adjacent to each other in the pair of board bars 1220A1-2 and 1220A2-2 adjacent to each other among the plurality of board bars 1220-2 may be reduced, and the luminance and the luminance uniformity of the display apparatus 1 may be improved.

Each of the plurality of board bars 1220-2 may include a plurality of first recess portions 1223a-2. Each of the plurality of first recess portions 1223a-2 may be formed between a pair of first protrusions 1222a-2 adjacent to each other among the plurality of first protrusions 1222a-2.

The plurality of first recess portions 1223a-2 may be provided on one side of the central extending portion 1221-2 with respect to the first direction (Z direction).

The plurality of first recess portions 1223a-2 may be formed to have a shape that is concavely recessed in the inner direction of the central extending portion 1221-2 in comparison with the plurality of first protrusion portions 1222a-2.

The plurality of first recess portions 1223a-2 may be arranged along the second direction (Y direction). For example, the plurality of first recess portions 1223a-2 may be arranged at equal intervals along the second direction (Y direction).

Each of the plurality of board bars 1220-2 may include a plurality of second recess portions 1223b-2. Each of the second recess portions 1223b-2 may be formed between a pair of second protrusions 1222b-2 adjacent to each other among the plurality of second protrusions 1222b-2.

The plurality of second recess portions 1223b-2 may be provided on the other side of the central extending portion 1221-2 with respect to the first direction (Z direction).

The plurality of second recess portions 1223b-2 may formed to have a shape that is concavely recessed in the inner direction of the central extending portion 1221-2 in comparison with the plurality of second protrusions 1222b-2.

The plurality of second recess portions 1223b-2 may be arranged along the second direction (Y direction). For example, the plurality of second recess portions 1223b-2 may be arranged at equal intervals along the second direction (Y direction).

For example, each of the plurality of first protrusions 1222a-2 may be arranged in parallel with one second recess portion 1223b-2 that is closest among the plurality of second recess portions 1223b-2, with respect to the first direction (Z direction). That is, the plurality of first protrusions 1222a-2 and the plurality of second recess portions 1223b-2 may be arranged in parallel with each other with respect to the first direction (Z direction).

For example, each of the plurality of second protrusions 1222b-2 may be arranged in parallel with one first recess portion 1223a-2 that is closest among the plurality of first recess portions 1223a-2, with respect to the first direction (Z direction). That is, the plurality of second protrusions 1222b-2 and the plurality of first recess portions 1223a-2 may be arranged in parallel with each other with respect to the first direction (Z direction).

For example, the plurality of first protrusions 1222a-2 and the plurality of second protrusions 1222b-2 may be formed to have shapes corresponding to each other. For example, a length, at which each of the plurality of first protrusions 1222a-2 protrudes to the first direction (Z direction) from the central extending portion 1221-2, may correspond to a length, at which each of the plurality of second protrusions 1222b-2 protrudes to the first direction (Z direction) from the central extending portion 1221-2.

For example, the plurality of first recess portions 1223a-2 and the plurality of second recess portions 1223b-2 may be formed to have shapes corresponding to each other. For example, a length, at which each of the plurality of first recess portions 1223a-2 is recessed toward the inner direction of the central extending portion 1221-2, may correspond to a length at which each of the plurality of second recess portions 1223b-2 is recessed toward the inner direction of the central extending portion 1221-2.

At this time, as shown in FIG. 22, curvatures of edge of each of the plurality of first protrusions 1222a-2, the plurality of second protrusions 1222b-2, the plurality of first recess portions 1223a-2, and the plurality of second recess portion 1223b-2 may be formed to be the same.

When it is desired to manufacture the light source board including the board bar 1220-2 shown in FIG. 22, it may be more appropriate to manufacture one light source board from one board material using a method similar to the manufacturing method of the light source board described with reference to FIG. 20. However, embodiments of the present disclosure are not limited thereto, and even when it is desired to manufacture the light source board including the board bar 1220-2 shown in FIG. 22, it is possible to manufacture the plurality of light source boards from one board material by performing a method similar to the manufacturing method of the light source board described with reference to FIGS. 16 to 19 and then by performing an operation such as an additional cutting process.

Figure 23:
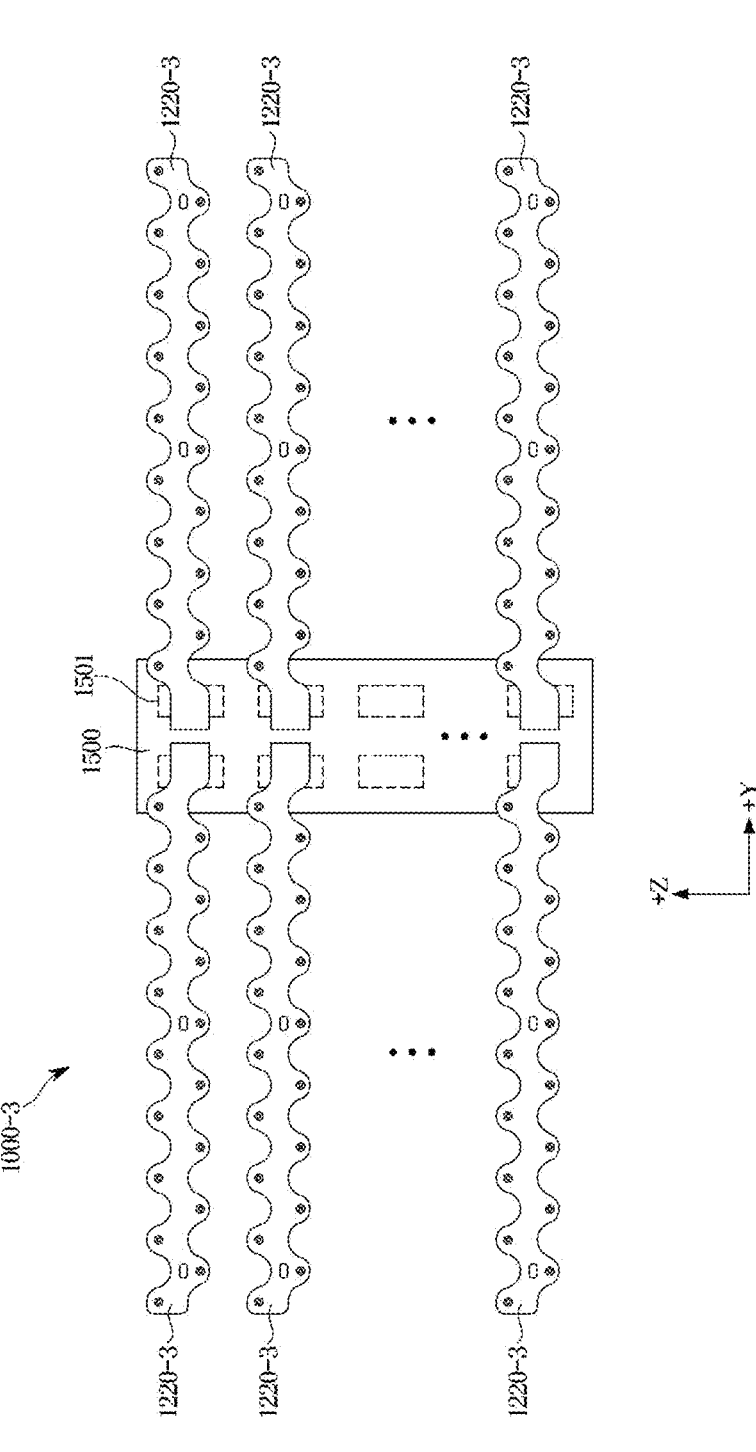
FIG. 23 is a view of a partial configuration of a display apparatus according to an embodiment of the present disclosure.

FIG. 23 is a view of a partial configuration of a display apparatus according to an embodiment of the present disclosure.

In describing the display apparatus 1 according to an embodiment of the present disclosure with reference to FIG. 23, the same reference numerals may be given to components corresponding to the components of the embodiment described with reference to FIGS. 1 to 22, and a repeated description thereof may be omitted.

Referring to FIG. 23, a light source module 1000-3 of the display apparatus 1 according to an embodiment of the present disclosure may include a plurality of board bars 1220-3 and an interface board 1500 to which the plurality of board bars 1220-3 is connected.

Each of the plurality of board bars 1220-3 may have a structure or feature corresponding to at least a portion of the board bar 1220 in the embodiment described with reference to FIGS. 1 to 20, the board bar 1220-1 in the embodiment described with reference to FIG. 21, and the board bar 1220-2 in the embodiment described with reference to FIG. 22, and a repeated description thereof may be omitted.

The interface board 1500 may be composed of a printed circuit board (PCB). For example, the interface board 1500 may be electrically connected to the control assembly 50 and/or the power assembly 60.

For example, the interface board 1500 may be disposed at the front of the bottom chassis 15. For example, the interface board 1500 may be mounted on the bottom chassis 15.

For example, the interface board 1500 may extend in the first direction (Z direction).

For example, each of the plurality of board bars 1220-3 may be mounted on the interface board 1500. Unlike the embodiments described in FIGS. 1 to 23, each of the plurality of board bars 1220-3 in the embodiment of FIG. 23 may be not formed integrally with the interface board 1500. However, each of the plurality of board bars 1220-3 may be mounted on and electrically connected to the interface board 1500, and supported by the interface board 1500. Accordingly, the interface board 1500 may be referred to as "board body."

The interface board 1500 may include a terminal 1501 to which each of the plurality of board bars 1220-3 is coupled.

The terminal 1501 may include a plurality of pins for transmitting a signal and/or data among the plurality of board bars 1220-3, the plurality of light sources mounted on the plurality of board bars 1220-3, and the interface board 1500.

Each of the plurality of board bars 1220-3 may include a bar connector to be coupled to the terminal 1501 of the interface board 1500. As the bar connector of each of the plurality of board bars 1220-3 is coupled to the terminal 1501 of the interface board 1500, each of the plurality of board bars 1220-3 may be connected to the interface board 1500.

For example, the bar connectors of the plurality of board bars 1220-3 may be provided at each end portion.

With this structure, it is possible to separate each of the plurality of board bars 1220-3 from the interface board 1500, and thus when it is required to replace or repair the plurality of board bars 1220-3 and some of the electronic components mounted thereon, it may be easy to replace or repair only the corresponding portion.

The display apparatus 1 according to an embodiment of the present disclosure may include the display panel 20, the plurality of light sources 1100 configured to emit light to the display panel, and the plurality of board bars 1220 on which at least some of the plurality of light sources is mounted, the plurality of board bars arranged to be spaced apart from each other along the first direction (Z direction) corresponding to the width direction thereof. Each of the plurality of board bars may include the central extending portion 1221 extending in the second direction (Y direction) different from the first direction, the plurality of first protrusions 1222a protruding from one side of the central extending portion with respect to the first direction toward the outside of the central extending portion, and arranged along the second direction, the plurality of first protrusions on which some of the plurality of light sources is mounted, the plurality of first recess portions 1223a formed between the pair of first protrusions adjacent to each other among the plurality of first protrusions, the plurality of second protrusions 1222b protruding from the other side of the central extending portion with respect to the first direction toward the outside of the central extending portion, and arranged along the second direction, the plurality of second protrusions on which others of the plurality of light sources is mounted, and the plurality of second recess portions 1223b formed between the pair of second protrusions adjacent to each other among the plurality of second protrusions. The shape of the edge of each of the plurality of first recess portions 1223a may be different from the shape of the edge of each of the plurality of second protrusions 1222b. The shape of the edge of each of the plurality of second recess portions 1223b may be different from the shape of the edge of each of the plurality of first protrusions 1222a.

The edge of each of the plurality of first protrusions 1222a and the edge of each of the plurality of second recess portions 1223b may have different curvatures at points corresponding to each other in the first direction (Z direction). The edge of each of the plurality of second protrusions 1222b and the edge of each of the plurality of first recess portions 1223a may have different curvatures at points corresponding to each other in the first direction (Z direction).

As for the first point on one first protrusion 1222a among the plurality of first protrusions 1222a and the second point on one second recess portion 1223b among the plurality of second recess portions 1223b, the first point and the second point may be positioned to correspond to each other with respect to the first direction (Z direction), and the curvature at the first point may be greater than the curvature at the second point. As for the third point on one second protrusion 1222b among the plurality of second protrusions 1222b and the fourth point on one first recess portion 1223a among the plurality of first recess portions 1223a, the third point and the fourth point may be positioned to correspond to each other with respect to the first direction (Z direction), and the curvature at the third point may be greater than the curvature at the fourth point.

When the first recess region 1223a1 is defined by one first recess portion among the plurality of first recess portions and the pair of first protrusions adjacent to the one first recess portion among the plurality of first protrusions, and when the second recess region 1223b1 is defined by one second recess portion among the plurality of second recess portions and the pair of second protrusions adjacent to the one second recess portion among the plurality of second protrusions, the size A3 of the first recess region may be larger than the size A2 of one second protrusion among the plurality of second protrusions. The size A4 of the second recess region may be larger than the size A1 of one first protrusion among the plurality of first protrusions.

The each of the plurality of first protrusions 1222a may be arranged in parallel with one second recess portion 1223b, which is closest among the plurality of second recess portions, with respect to the first direction. The each of the plurality of second protrusions 1222b may be arranged in parallel with one first recess portion 1223a, which is closest among the plurality of first recess portions, with respect to the first direction.

The separation distance in the first direction between the pair of board bars adjacent to each other among the plurality of board bars may be greater than the width, which is in the first direction, of one board bar among the plurality of board bars.

The display apparatus 1 may further include the board body 1210 to which the plurality of board bars is connected.

Each of the plurality of board bars may extend from the board body to the second direction.

Some of the body light sources 1130 of the plurality of light sources may be mounted on the board body.

The some of the light sources mounted on the board body may be arranged in parallel with the plurality of light sources mounted on the plurality of first protrusions, with respect to the second direction. Others of the light sources mounted on the board body may be arranged in parallel with the plurality of light sources mounted on the plurality of second protrusions, with respect to the second direction.

The board body may extend along the first direction. Each of the plurality of board bars may extend from one side of the board body with respect to the second direction.

The display apparatus 1 may further include the connector 1300 mounted on the board body and electrically connected to the plurality of light sources. The connector may include the long side 1301 parallel to the first direction.

The display apparatus 1 may further include the plurality of driving elements 1400 mounted on the front surface 1210F of the board body facing the display panel and configured to control at least some light sources among the plurality of light sources. The plurality of driving elements may be arranged to allow positions thereof in the first direction to be different from each other. Some driving elements among the plurality of driving elements may be arranged to allow positions thereof in the second direction to be different from others driving elements among the plurality of driving elements.

The plurality of driving elements may include the first column driving element 1400A arranged along the first direction, and the second column driving element 1400B spaced apart from the first column driving element and arranged along the first direction. Each driving element included in the first column driving element 1400A and each driving element included in the second column driving element 1400B may be arranged to be spaced apart from each other with respect to the second direction.

The display apparatus 1 may further include the plurality of driving elements 1400-2 configured to control at least some light sources among the plurality of light sources. The plurality of driving elements may be disposed on the rear surface 1210R of the board body opposite to the front surface facing the display panel.

The plurality of board bars may include the first board bar 1220A1 and the second board bar 1220A2 adjacent to each other. When one light source among the plurality of light sources mounted on one side, which is adjacent to the second board bar, among both sides of the first board bar with respect to the first direction is defined as the first light source LS1, when, among the plurality of light sources mounted on the other side, which is opposite to the second board bar, among both sides of the first board bar with respect to the first direction, one light source closest to the first light source is defined as the second light source LS2, and when, among the plurality of light sources mounted on one side, which is adjacent to the first board bar, among both sides of the second board bar with respect to the first direction, one light source closest to the first light source is defined as the third light source LS3, the ratio of the distance d2 between the first light source and the third light source to the distance d1 between the first light source and the second light source may be greater than or equal to 9/10 but less than or equal to 10/9.

The display apparatus 1 according to an embodiment of the present disclosure may include the plurality of light sources 1100, and the plurality of board bars 1220 on which the plurality of light sources is mounted, the plurality of board bars arranged to be spaced apart from each other along the first direction (Z direction), the plurality of board bars extending along the second direction (Y direction) different from the first direction. Each of the plurality of board bars may include the central extending portion 1221 extending in the second direction, the plurality of first protrusions 1222a protruding from one side of the central extending portion with respect to the first direction toward the outside of the central extending portion, and arranged along the second direction, the plurality of second protrusions 1222b protruding from the other side of the central extending portion with respect to the first direction toward the outside of the central extending portion, and arranged along the second direction, the plurality of first recess portions 1223a formed between the pair of first protrusions 1222a adjacent to each other among the plurality of first protrusions 1222a, and including an edge having a different curvature at a point corresponding to an edge of each of the plurality of second protrusions 1222b, with respect to the first direction (Z direction), and the plurality of second recess portions 1223b formed between the pair of second protrusions 1222b adjacent to each other among the plurality of second protrusions 1222b, and including an edge having a different curvature at a point corresponding to an edge of each of the plurality of first protrusions 1222a, with respect to the first direction (Z direction).

As for the first point on one first protrusion 1222a among the plurality of first protrusions 1222a and the second point on one second recess portion 1223b among the plurality of second recess portions 1223b, the first point and the second point may be positioned to correspond to each other with respect to the first direction (Z direction), and the curvature at the first point may be greater than the curvature at the second point. As for the third point on one second protrusion 1222b among the plurality of second protrusions 1222b and the fourth point on one first recess portion 1223a among the plurality of first recess portions 1223a, the third point and the fourth point may be positioned to correspond to each other with respect to the first direction (Z direction), and the curvature at the third point may be greater than the curvature at the fourth point.

The display apparatus 1 may further include the board body 1210 to which the plurality of board bars is connected, and the connector 1300 mounted on the board body and electrically connected to the plurality of light sources. The connector may include the long side 1301 parallel to the first direction.

The display apparatus 1 may further include the board body 1210 to which the plurality of board bars is connected, and the plurality of driving elements 1400 mounted on the front surface 1210F of the board body facing the display panel and configured to control at least some light sources among the plurality of light sources. The plurality of driving elements may be arranged to allow positions thereof in the first direction to be different from each other. Some driving elements among the plurality of driving elements may be arranged to allow positions thereof in the second direction to be different from others driving elements among the plurality of driving elements.

The display apparatus 1 according to an embodiment of the present disclosure may include the plurality of light sources 1100, and the plurality of board bars 1220 on which at least some of the plurality of light sources is mounted, the plurality of board bars arranged to be spaced apart from each other along the first direction (Z direction) corresponding to the width direction thereof, the plurality of board bars extending in the second direction (Y direction) different from the first direction. Each of the plurality of board bars may include the plurality of first protrusions 1222a formed on one side of each of the plurality of board bars with respect to the first direction and arranged along the second direction, the plurality of first protrusions on which some of the plurality of light sources is mounted, the plurality of first recess portions 1223a formed between the pair of first protrusions adjacent to each other among the plurality of first protrusions, the plurality of second protrusions 1222b formed on the other side of each of the plurality of board bars with respect to the first direction and arranged along the second direction, the plurality of second protrusions on which others of the plurality of light sources is mounted, and the plurality of second recess portions 1223b formed between the pair of second protrusions adjacent to each other among the plurality of second protrusions. When the first recess region 1223a1 is defined by one first recess portion 1223a among the plurality of first recess portions and the pair of first protrusions 1222a adjacent to the one first recess portion among the plurality of first protrusions, and when the second recess region 1223b1 is defined by one second recess portion 1223b among the plurality of second recess portions and the pair of second protrusions 1222b adjacent to the one second recess portion among the plurality of second protrusions, the size A3 of the first recess region and the size A1 of one first protrusion among the plurality of first protrusions may be different from each other. The size A2 of the second recess portion and the size A4 of one second protrusion among the plurality of second protrusions may be different from each other.

As is apparent from the above description, a board bar of a display apparatus may include a plurality of protrusions, on which a light source is mounted, and thus the luminance uniformity may be improved.

Further, a plurality of light sources mounted on a board bar of a display apparatus may be arranged to allow a distance ratio between the light sources to satisfy a predetermined range, and thus the luminance uniformity may be improved.

Further, a connector mounted on a board body of a display apparatus may be arranged in a direction parallel to a longitudinal direction of the board body, and thus an amount of material used may be reduced and manufacturing costs may be reduced.

Further, a plurality of driving elements mounted on a board body of a display apparatus may be distributed and mounted on a front surface of the board body and thus the luminance uniformity may be improved.

Further, a board bar of a display apparatus may include a plurality of protrusions and a plurality of recess portions, respectively, and thus an amount of material used may be reduced and the luminance uniformity may be improved.

Further, a plurality of protrusions and a plurality of recess portions provided on a board bar of a display apparatus may include edges of different shapes. Accordingly, an amount of material used may be reduced, a manufacturing process may be simplified, and manufacturing costs may be reduced.

While non-limiting example embodiments of present disclosure have been particularly described with reference to the drawings, it should be understood by those of skilled in the art that various changes in form and details may be made without departing from the spirit and scope of the present disclosure.

What is claimed is:

1. A display apparatus comprising:
a display panel;
a plurality of light sources configured to emit light to the display panel; and
a light source board on which the plurality of light sources are mounted, the light source board comprising:
a board body extending in a first direction; and
a plurality of board bars connected to a side of the board body that is in a second direction different from the first direction, the plurality of board bars spaced apart from each other along the first direction,
wherein each of the plurality of board bars comprises:
a central extending portion extending in the second direction;
a plurality of first protrusions protruding from a first side of the central extending portion with respect to the first direction toward an outside of the central extending portion, and arranged along the second direction, wherein first side light sources from among the plurality of light sources are on the plurality of first protrusions; and
a plurality of second protrusions protruding from a second side of the central extending portion, opposite to the first side, with respect to the first direction toward the outside of the central extending portion, and arranged along the second direction, wherein second side light sources from among the plurality of light sources are on the plurality of second protrusions.

2. The display apparatus of claim 1, wherein the plurality of light sources mounted on each of the plurality of board bars are spaced apart in the first direction from the central extending portion.

3. The display apparatus of claim 1, wherein each of the plurality of board bars further comprises:
a plurality of first recess portions between adjacent pairs of the plurality of first protrusions, respectively; and
a plurality of second recess portions between adjacent pairs of the plurality of second protrusions, respectively.

4. The display apparatus of claim 3, wherein each of the plurality of first protrusions is arranged in parallel with one second recess portion, which is closest among the plurality of second recess portions, with respect to the first direction.

5. The display apparatus of claim 3, wherein each of the plurality of second protrusions is arranged in parallel with one first recess portion, which is closest among the plurality of first recess portions, with respect to the first direction.

6. The display apparatus of claim 1, wherein a separation distance in the first direction between a pair of board bars adjacent to each other among the plurality of board bars is greater than a width, in the first direction, of one board bar among the plurality of board bars.

7. The display apparatus of claim 1, wherein some of the plurality of light sources are arranged on the board body, in parallel with the first side light sources or the second side light sources, with respect to the second direction.

8. The display apparatus of claim 1, wherein the plurality of board bars and the board body are integrally formed.

9. The display apparatus of claim 1, further comprising:
a connector on the board body and electrically connected to the plurality of light sources,
wherein the connector is elongated in the first direction.

10. The display apparatus of claim 1, further comprising:
a plurality of driving elements on one surface of the board body facing the display panel and configured to control at least some of the plurality of light sources,
wherein positions of the plurality of driving elements are different from each other in the first direction, wherein positions of some driving elements among the plurality of driving elements are different from positions of other driving elements among the plurality of driving elements in the second direction.

11. The display apparatus of claim 10, wherein the plurality of driving elements comprises:

a first column of driving elements arranged along the first direction; and a second column of driving elements arranged along the first direction and spaced apart from the first column of driving elements wherein positions of each driving element included in the first column of driving elements and positions of each driving element included in the second column of driving elements are different from each other in the second direction.

12. The display apparatus of claim 1, further comprising:

a plurality of driving elements configured to control at least some of the plurality of light sources, wherein the plurality of driving elements is on a rear surface of the board body that faces away from the display panel.

13. The display apparatus of claim 1, wherein the plurality of board bars comprises a first board bar and a second board bar that are adjacent to each other, a first light source, from among the plurality of light sources, is on a first side of the first board bar that is adjacent to the second board bar in the first direction, a second light source is on a second side of the first board bar, opposite of the first side, and is a closest light source on the second side, from among the plurality of light sources, to the first light source, a third light source is on a first side of the second board bar that is adjacent to the first side of the first board bar in the first direction, and the third light source is a closest light source on the first side of the second board bar, from among the plurality of light sources, to the first light source, and a ratio of a distance between the first light source and the third light source to a distance between the first light source and the second light source is greater than or equal to 9/10 and less than or equal to 10/9.

* * * * *